US008050334B2

(12) United States Patent
Harada et al.

(10) Patent No.: US 8,050,334 B2
(45) Date of Patent: Nov. 1, 2011

(54) SIGNAL ENCODER, SIGNAL DECODER, SIGNAL ENCODING METHOD, SIGNAL DECODING METHOD, PROGRAM, RECORDING MEDIUM AND SIGNAL CODEC METHOD

(75) Inventors: Noboru Harada, Nerima-ku (JP); Takehiro Moriya, Nerima-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 981 days.

(21) Appl. No.: 11/666,493

(22) PCT Filed: Jul. 7, 2006

(86) PCT No.: PCT/JP2006/013581

§ 371 (c)(1), (2), (4) Date: Apr. 27, 2007

(87) PCT Pub. No.: WO2007/007672

PCT Pub. Date: Jan. 18, 2007

(65) Prior Publication Data

US 2008/0089438 A1 Apr. 17, 2008

(30) Foreign Application Priority Data

Jul. 7, 2005 (JP) ................................ 2005-198676

(51) Int. Cl.
*H04L 27/00* (2006.01)

(52) U.S. Cl. ........ 375/259; 375/243; 375/253; 375/260; 375/240.13; 375/240.12

(58) Field of Classification Search .................. 375/259, 375/243, 253, 260, 240.13, 240.12
See application file for complete search history.

(56) References Cited

U.S. PATENT DOCUMENTS

| | | | | |
|---|---|---|---|---|
| 5,960,388 | A * | 9/1999 | Nishiguchi et al. | 704/208 |
| 2003/0072374 | A1 * | 4/2003 | Sohm | 375/240.16 |
| 2005/0228651 | A1 * | 10/2005 | Wang et al. | 704/207 |

FOREIGN PATENT DOCUMENTS

| | | |
|---|---|---|
| JP | 2005 18606 | 1/2005 |
| JP | 2007-13642 | 1/2007 |

(Continued)

OTHER PUBLICATIONS

Yang D., et al.,"A Lossless Audio Compression Scheme with Random Access Property", Acoustics, Speech, and Signal Processing, 2004, Proceedings. (ICASSP' 04). IEEE International Conference on, vol. 3, pp. III-1016-1019, 2004.

(Continued)

*Primary Examiner* — Kabir A Timory
(74) *Attorney, Agent, or Firm* — Oblon, Spivak, McClelland, Maier & Neustadt, L.L.P.

(57) ABSTRACT

According to the present invention, a shift amount $S_{j-1}$ of the previous frame is held in a shift amount buffer of an integer signal coder. At least as many last sample values in the previous frame as the number of an order P used in linear predictive analysis are held in a sample buffer of the integer signal coder. The last P sample values in the previous frame held in the sample buffer of the integer signal coder are corrected in an interframe correction section by $S_j$-$S_{j-1}$ on the basis of the shift amount $S_j$ of the current frame and the shift amount $S_{j-1}$ of the previous frame determined by a shift amount determining section.

37 Claims, 49 Drawing Sheets

FOREIGN PATENT DOCUMENTS

| | | |
|---|---|---|
| WO | 2004 098066 | 11/2004 |
| WO | 2004 114527 | 12/2004 |

OTHER PUBLICATIONS

Ghido F., "An Efficient Algorithm for Lossless Compression of IEEE Float Audio", Data Compression Conference, 2004, Proceedings. DCC 2004, pp. 429-438, 2004.

Harada, N. et al.,"Lossless Compression of IEEE754 Floating-Point Signal in ISO/IEC MPEG-4 Audio Lossless Coding (ALS)", Transaction of IEOCE, vol. J89-B, No. 2, pp. 204-213, 2006. (With English Translation).

Yang, D. et al.,"Lossless Compression for Audio Data in the IEEE Floating-Point Format", AES Convention Paper 5987, AES 115$^{th}$ Convention, pp. 1-5, 2003.

Liebchen, T. et al.,"MPEG-4 ALS: an Emerging Standard for Lossless Audio Coding", proceedings of the Data Compression Conference (DCC'04), pp. 1068-0314/04, 2004.

Noboru Harada, et al., "Proposal of CE for improved floating-point compression using ACFC (Approximate-Common-Factor Coding) in ALS (Audio Lossless Coding)", Joint Video Team (JVT) of ISO/IEC MPEG & ITU-T VCEG(ISO/IEC JTC1/SC29/WG11 and ITU-T SG16 Q6), International Organization for Standardization Organisation Internationale Normalisation ISO/IEC JTC 1/SC 29/WG 11 Coding of Moving Pictures and Audio, XX, XX, No. WG 11M11314, XP030040088, Oct. 13, 2004, 35 pages.

* cited by examiner

SIGNAL ENCODER, SIGNAL DECODER, SIGNAL ENCODING METHOD, SIGNAL DECODING METHOD, PROGRAM, RECORDING MEDIUM AND SIGNAL CODEC METHOD

TECHNICAL FIELD

The present invention relates to a coding apparatus, method, program, and recording medium for coding multiple sample values.

BACKGROUND ART

Compressive coding art are used in transmitting audio signal data or image information data over communication lines or recording such data on recording media in these years. Lossless compression of floating-point data which can be readily edited and processed is also important and such coding techniques are disclosed in Non-patent literature 1 and patent literature 1, for example. In these coding methods a sequence of multiple floating-point data samples are grouped for every plural samples into a frame. A bit shift amount is determined for each individual frame so that the largest amplitude value in the frame is the maximum value in a range of amplitudes that can be represented in an integer format of a given number of bits. The bit shift amount thus determined is used to separate each sample into an integer signal and an error signal, each of which is then coded, frame by frame.

Although not shown in patent literature 1, a functional configuration for coding that can be implemented according to the art disclosed therein is shown in FIG. 1. A coding apparatus 800 includes a frame buffer 810, a sift amount calculating section 820, an integer signal/error signal separator 830, an integer signal coder 840, an error signal coder 850, and a multiplexer 860.

The concept of the coding is shown in FIG. 2. Each frame includes multiple sample values, each being formed by a bit stream containing a finite number of significant digits. FIG. 2 shows floating-point notation in which a mantissa is represented by a predetermined number of quantized bits, for example 32 bits, excluding the sign bit. Each string of bits running horizontally represents one sample. Each of the shaded bits in the representation in FIG. 2, which are significant digits in floating-point form that correspond to the predetermined most significant digits in floating-point notation and the digits represented by the mantissa in floating-point notation, contains a 0 or 1; the other bits which do not correspond to significant digits contain 0s. To encode sample values frame by frame, the sample values in the frame are separated into an integer part and an error part (all or part of an input signal excluding the integer part). The dashed-line boxes in FIG. 2 indicate integer parts. An integer part is determined by shifting all samples in a frame by the same number of bits in the same direction so that the largest amplitude value in the frame is the maximum value that can be represented by the integer part. The separated integer part and error part are separately coded and are then combined into coded data.

The concept shown in FIG. 2 can be applied to integer representations as well as floating-point representations. The same method can be applied to any representation in which only a bit string starting from the most significant bit (MSB), which represents the amplitude, to the least significant bit (LSB) a finite number of bits away from the MSB can contain 0s or 1s and the other bits are all 0s. For example, a 32-bit or 64-bit integer representation of each sample may include particular 24 bits each containing a 0 or 1 and the other bits containing 0s.

A typical floating-point representation is the IEEE 754 32-bit floating-point format. The floating-point is represented as

[Equation 1]

$$(-1)^S \times 1.M \times 2^{E-E_0} \quad (1)$$

where S denotes a sign part, M denotes a mantissa, and E denotes an exponent. According to IEEE 754, the sign part S is represented by 1 bit, the mantissa M by 23 bits, and the exponent E by 8 bits. Any value is represented by a total of 32 bits of the floating-point format represents, where $E_0=2^7-1=127$. Accordingly, $E-E_0$ in Equation 1 can take any integer value in the range $-127 \leqq E-E_0 \leqq 128$. If $E-E_0=-127$, the binary representation of the sample value is all 0s; if $E-E_0=128$, the binary representation of the sample value is all 1s. That is, in this floating-point notation, a sample value is normalized so that that decimal place is between the most significant bit of the binary representation of the sample value that contains 1 and the next significant bit and the 23 bits after the decimal place excluding the MSB containing 1 are represented by the M. The number of digits of the integer part of the binary representation of the sample value is equal to $E-E_0$ plus 1.

The sample with the largest amplitude in a frame can be made the maximum value that can be represented by an integer part consisting of Q quantized bits through bit shift by normalizing the sample value by shifting the sample value $\Delta E_{max}$ bits toward the LSB so that the MSB is in the one's place and then shifting Q−1 bits toward the MSB, where $\Delta E_{max}$ is the exponent of the sample with the largest amplitude and $\Delta E_{max}=E-E_0$. The result is that the sample value is bit-shifted by $Q-1-\Delta E_{max}$. Since the number of quantized bits Q is a predetermined fixed value, $\Delta E_{max}=S_j$ is referred to as the bit-shift amount of a frame j for convenience. In the following description, an example will be described in which the number of quantized bits Q of the signal of an integer part is 24, including the sign bit, all sample values in a frame are shifted by the same number of bits, and the signal of the integer part (hereinafter referred to as the "integer signal") and the signal of the error part (hereinafter referred to as the "error signal") are separately coded.

FIG. 3 shows a possible processing flow in the coding apparatus 800 shown in FIG. 1. The frame buffer 810 temporarily stores digital input signal sample values and forms a frame with $N_F$ sample values $X_i$ ($i=1, \ldots, N_F$) (S810). The shift amount calculating section 820 determines a shift amount $S_j$ for each frame by using the method described with reference to FIG. 2 (S820). The integer signal/error signal separator 830 uses the shift amount $S_j$ to separate each of the $N_F$ samples in the frame input signal into an integer part and an error part (S830). The integer signal coder 840 encodes the integer signal separated in the integer signal/error signal separator 830 by using linear predictive coding (S840). The error signal coder 850 encodes the error signal separated in the integer signal/error signal separator 830 (S850). The multiplexer 860 combines the code representing the coded integer signal, the code representing the error signal, and the shift amount to provide coded data (S860). Because the number of quantized bits Q of the integer part is predetermined, $(Q-1-S_j)$ can be obtained from the shift amount $S_j$ received at a decoding end.

FIG. 4 shows details of a possible exemplary processing flow (step S820 of FIG. 3) in the shift amount calculating section 820 in FIG. 1. In the exemplary processing, a sample value is represented in the IEEE 754 32-bit floating-point format. A similar processing flow is described in patent literature 1. The shift amount calculating section 820 first reads all samples ($N_F$ samples) in a frame input signal (S8201). Then, an initial value of 1 is set in a variable i and −127 (=$E_0$) is set in $\Delta E_{max}$ (S8202). The exponent $E-E_0$, that is, $E_i-127$, of the i-th sample in the current frame is calculated and assigned to variable $\Delta E_i$ (S8203). Decision is made as to whether $\Delta E_i>\Delta E_{max}$ (S8204). If this is true, $\Delta E_i$ is set as $\Delta E_{max}$ (S8205).

Then decision is made as to whether $i<N_F$ (S8206). If $i<N_F$, then i+1 is assigned to i (S8207) and the process returns to step S8203; otherwise, decision is made as to whether $\Delta E_{max}>-127$ (S8208). If $\Delta E_{max}>-127$, then $\Delta E_{max}$ is obtained as the shift amount $S_j$ (S8209) and the process will end. If $\Delta E_{max}\leqq-127$, all samples in the frame are 0 and therefore the shift amount $S_j$ is set to 0(S8210). This processing is equivalent to determining the bit shift amount $S_j$, specifically $(Q-1-S_j)$, such that the largest amplitude of the sample in the frame is assigned to the largest amplitude in the range between the maximum value and the minimum value that can be represented by the integer part by bit-shifting the sample values.

FIG. 5 shows a variation (step S820') of the possible processing flow at the shift amount calculation step (step S820) of FIG. 3. A sample represented in the 32-bit floating-point format of the IEEE 754 contains a special value such as a NaN (Not a Number) or an unnormalized number if $E-E_0$ is 128 or −127. This variation differs from the processing shown in FIG. 4 in that only the values within the range $-127<E-E_0<128$ among the samples in a frame are used to calculate the shift amount in determining the largest amplitude. Furthermore, in analysis of the i-th sample, the decimal point of the i-th sample is moved by using $\Delta E_{max}$ obtained so far and decision is made as to whether the value after the place shift is in the range that can be represented by a given number of quantized bits Q. If the value exceeds the range that can be represented by the given number of quantized bits Q as a result of the place shift, then 1 is added to $\Delta E_{max}$ so that the value does not exceed the range, which is another difference from the processing of FIG. 4.

Specifically, the processing flow differs as follows. Step S8221 is added between steps S8202 and S8203, where decision is made as to whether $-127<E_i-127<128$ (S8221). If this is true, the process proceeds to step S8203; otherwise the step proceeds to step S8206. Furthermore, step 8220 is added between steps S8205 and S8206. At step S8220, first $X_i$ multiplied by 2 to the power of $(Q-1-\Delta E_{max})$ (that is, the value of $X_i$ shifted by $Q-1-\Delta E_{max}$ bits) is assigned to $X'_i$ (S8222). Decision is made as to whether $X'_i>2^{Q-1}-1$ or whether $X'_i<-2^{Q-1}$ (S8223). If step S8223 is true, 1 is added to $\Delta E_{max}$ (S8224); otherwise the process proceeds to step S8206.

FIG. 6 shows a detailed possible procedure for separating an input signal $X_i$ into an integer signal $Y_i$ and an error signal $Z_i$ using the shift amount $S_j$ obtained at step S830 of FIG. 3. The following process is sequentially performed for each of $N_F$ samples $X_i$. $N_F$ samples are taken from the frame buffer into the inside memory (S8301). An initial value of 1 is assigned to i which indicates the number of a sample (S8302). Decision is made as to whether the exponent $(E_i-127)$ of the input sample $X_i$ is greater than −127 and less than 128 (S8303). If it is determined at step S8303 that the exponent is out of the range given above, the i-th sample has the value 0 or a special value such as an unnormalized value or NaN. Therefore, 0 is assigned to the integer part $Y_i$ of the sample after digit alignment and $X_i$ is assigned to the error part $Z_i$ (S8309).

On the other hand, if it is determined at step S8303 that the exponent value is within the range, $X_i$ is multiplied by 2 to the power of $(Q-1-S_j)$ to obtain $X'_i$ (S8304). This means that if $(Q-1-S_j)$ is positive, $X_i$ is shifted by $(Q-1-S_j)$ bits to the left and if $(Q-1-S_j)$ is negative, $X_i$ is shifted by $(Q-1-S_j)$ bits toward the LSB. Alternatively, $E'_i$ in the exponent value $(E'_i-127)$ of $X'_i$ is obtained from the exponent part $E_i$ of sample $X_i$ as $E'_i=E_i+(Q-1-S_j)$. This processing is equivalent to shifting all samples by $(Q-1-S_j)$ bits to align decimal points so that the sample with the largest amplitude in the frame does not exceed the maximum amplitude that can be represented by the number of quantized bits Q of the integer part, by multiplying each of the samples in the frame by 2 to the power of $(Q-1-S_j)$ which is common to all the samples.

Decision is made as to whether the obtained exponent value of $X'_i$; $(E'_i-127)$ is greater than −127 and less than 128 (S8305). If the exponent part is out of the range, 0 is assigned to the integer part $Y_i$ (S8309). If the exponent value is within the range, decision is made as to whether $X'_i$ is positive (S8306). If $X'_i$ is positive, the digits after the decimal point of $X'_i$ is discarded and the rounded value is set as the integer part $Y_i$ (S8307). If $X'_i$ is negative, the digits after the decimal point of $X'_i$ are rounded up and the rounded value is set as the integer part $Y_i$ (S8308). If $Y_i$ is not zero, the decimal portion of $X'_i$ is set as the error part $Z_i$ (S8307 and S8308). Decision is made as to whether i is less than $N_F$ (S8310). If i is less than $N_F$, i+1 is assigned to i (S8311). If i is greater than or equal to $N_F$, the process will end. Separation between the integer signal and the error signal is not limited to the procedure described above, a number of separation methods are described in patent literature 1.

FIG. 7 shows a possible functional configuration of the integer signal coder 840 shown in FIG. 1. The integer signal coder 840 includes a segmentation section 8401, a linear prediction analyzing section 8402, a linear prediction coefficient coder 8403, a linear prediction coefficient decoder 8404, an inverse filter 8407, a sample buffer 8408, a residue signal coder 8409, and a multiplexer 8410. The segmentation section 8401 subdivides a frame of digital sampling value strings of an input integer signal into subframes. If frames are not to be subdivided, the segmentation section 8401 can be omitted. Hereinafter, division into frames and division into subframes are collectively referred to as framing.

The linear prediction analyzing section 8402 performs linear prediction analysis of a framed input integer signal (hereinafter referred to as an "input integer signal") and outputs linear prediction coefficients. The order of the linear prediction coefficient is denoted by P. The linear prediction coefficient coder 8403 encodes the linear prediction coefficients provided by the linear prediction analyzing section 8402 and outputs a linear prediction coefficient code. The linear prediction coefficient decoder 8404 decodes the output from the linear prediction coefficient coder 8403 and outputs P-order quantized linear prediction coefficients. In this example, the output from the linear prediction coefficient coder 8403 is decoded by the linear prediction coefficient decoder 8403 to obtain quantized linear prediction coefficients. However, the linear prediction coefficient decoder 8404 may be omitted and a linear prediction coefficient code and its corresponding quantized linear prediction coefficients may be obtained from the linear prediction coefficient coder 8403.

The inverse filter 8407 restores a signal transmitted as a linear prediction coefficient code by using the P-order quantized linear prediction coefficients outputted from the linear prediction coefficient decoder 8404 and sample values in the previous frame held in the sample buffer 8408 and sample values in the current frame. The inverse filter 8407 also subtracts the signal transmitted as the linear prediction coefficient code restored from the input integer signal to output a residue signal. At least last P samples of the sample values in the current frame are held in the sample buffer 8408. The residue signal coder 8409 codes the residue signal outputted from the inverse filter 8407 and outputs a residue code. A multiplexer 8410 combines the linear prediction coefficient code outputted from the linear prediction coefficient coder 8403 with the residue code outputted from the residue signal coder 8409 and outputs the combined result as an integer signal code. The linear prediction analyzing section 8402 may also use the last P samples in the previous frame for linear prediction analysis. In this case, the linear prediction analyzing section 8402 receives the last P samples of the previous frame from the sample buffer 8408 as indicated by the dashed line and box in FIG. 7.

FIG. 8 shows a possible functional configuration of a decoding apparatus corresponding to the coding apparatus 800 shown in FIG. 1. FIG. 9 shows a processing flow in the decoding apparatus 900. The decoding apparatus 900 includes a demultiplexer 910, an integer signal decoder 920, an error signal decoder 930, an integer/error signal combiner 940. The integer/error signal combiner 940 includes a reverse shifter 950 and an error component adder 960. The demultiplexer 910 stores and demultiplexes coded data (S910). The integer signal decoder 920 decodes the integer signal (S920). The error signal decoder 930 decodes an error signal (S930). The reverse shifter 950 of the integer/error signal combiner 940 reversely shifts (shifting opposite in direction to the shift in coding) the decoded integer signal in accordance with a shift amount outputted from the demultiplexer (S950). The error component adder 960 of the integer/error signal combiner 940 combines the reversely shifted integer signal with the error signal (S960).

FIG. 10 shows a possible exemplary functional configuration of the integer signal decoder 920 in FIG. 8. The integer signal decoder 920 includes a demultiplexer 9201, a linear prediction coefficient decoder 9202, a residue signal decoder 9203, a sample buffer 9206, and a synthesis filter 9207. Coded data is received and stored at the demultiplexer 9201, where it is demultiplexed into a linear prediction coefficient code and a residue code. The linear prediction coefficient decoder 9202 decodes the linear prediction coefficient code and outputs linear prediction coefficients. The residue signal decoder 9203 decodes the residue code and outputs a residue signal. The synthesis filter 9207 uses the linear prediction coefficients outputted from the linear prediction coefficient decoder 9202 and the sample vales in the previous frame held in the sample buffer 9206 and the sample values in the current frame to synthesize a signal. The synthesis filter 9207 also adds the restored signal and the residue signal together to obtain an integer signal.

An input signal in integer form can be losslessly coded by performing linear prediction, for example, and applying lossless coding to linear prediction coefficients and linear prediction residues separately as described in Non-patent literature 2. In the coding method described in Non-patent literature 2, linear prediction coefficients are obtained for each frame of input data sample value strings in integer form, then the linear prediction coefficients are coded, an inverse filter (also called an analysis filter) is formed by using the linear prediction coefficients quantified in the coding process, a linear prediction residue signal is obtained, and the linear prediction residue signal is coded.

Non-patent literature 1: Dai Yang and Takehiro Moriya, "Lossless Compression for Audio Data in the IEEE Floating-Point Format," AES Convention Paper 5987, AES115th Convention, New York, N.Y., USA, 2003 Oct. 10-13

Non-patent literature 2: Tilman Liebchen and Yuriy A. Reznik, "MPEG-4 ALS: An Emerging Standard for Lossless Audio Coding," Proceedings of the Data Compression Conference (DCC '04), pp. 1068-0314/04, 2004

Patent literature 1: Brochure of WO2004/114527

DISCLOSURE OF THE INVENTION

Problem to be Solved by the Invention

Referring to FIG. 2, problems with a method conceivable according to Non-patent literature 1 will be described. According to the method described in Non-patent document 1, mapping of a signal is performed so that the largest amplitude in a frame is the maximum value in the range of amplitudes that can be represented by an integer part by bit shifting and the signal is separated into an integer part and an error part, which are then separately coded. However, if contiguous frames differ in the largest amplitude, the signal assigned to the integer part can be discontinuous because of difference in shift amount between the contiguous frames. In such a case, the compression ratio of compressive coding using interframe prediction applied to the integer part can decrease or the efficiency of compression of the error part can decrease due to variations in statistical characteristics of the error part from frame to frame. Therefore, the method has a problem that the separation between the integer part and the error part based on the largest amplitude does not provide an optimum compression efficiency.

In the method described in Non-patent document 2, if the number of quantized bits of an input signal is the same as the number of bits that can be processed by the integer signal coder, the coder normally performs coding without bit shifting. However, bit positions in which all samples in the frame contain 0 contiguously appear on the LSB side, the compression ratio of the frame can be improved by shifting the contiguous bits before coding. In particular, the compression ratio can be often increased by making determination for each frame containing multiple sample value strings in integer form as to whether there are contiguous positions in which all bits contain 0 on the LSB side of the frame contain 0 and if so, shifting the signal by the number of the positions and coding the shifted signal as the signal of the frame together with the information indicating the number of positions. If contiguous two frames differ in shift amount, the frames of the signal to be coded become discontinuous. Thus, there is a problem that if linear prediction is used for compressing the signal to be coded, shifting makes frames of the signal to be coded discontinuous and consequently interframe prediction cannot be properly performed and the compression efficiency decreases.

An object of the present invention is to provide a coding apparatus, a coding method, a decoding apparatus, a decoding method, and a codec method that enable linear predictive coding without causing discontinuity between frames of a digital signal even if the amplitude of the digital signal is adjusted frame by frame.

Means to Solve Issues

According to the present invention, the amount of adjustment of the amplitude of the previous frame is held in an adjustment amount buffer of an integer signal coder. At least as many last sample values in the previous frame as the number equal to an order P used in linear prediction analysis are held in a sample buffer of an integer signal coder. At least the last P sample values of the previous frame held in the sample buffer of the integer signal coder are corrected in an interframe correction section on the basis of an amplitude adjustment amount of the current frame and an amplitude adjustment amount of the previous frame that are determined by an amplitude adjustment amount determining section.

EFFECTS OF THE INVENTION

According to the present invention, interframe prediction of linear predictive coding is performed by taking into consideration an amplitude adjustment amount of the previous frame and an amplitude adjustment amount of the current frame to be coded. Therefore, the interframe prediction can be precisely performed and a residue signal can be reduced in size. The residue signal accordingly can be coded with a reduced amount of codes. This method can be combined with other methods for reducing the amount of codes, thereby further reducing the code amount.

If the number of quantized bits of an input signal is equal to the number of bits that can be processed by the integer signal coder and there are contiguous bit positions in which all bits are 0 on the LSB side, the compression ratio of the input signal per frame can be improved by shifting the signal by the number of bit positions before coding. By combining this method with the present invention, the signal of frames to be coded that have become discontinuous can be made contiguous before performing interframe prediction (linear prediction). Thus, the method for increasing the efficiency of intraframe coding can be made compatible with the method for improving the efficiency of coding using interframe prediction.

BEST MODES FOR CARRYING OUT THE INVENTION

Figure 1:
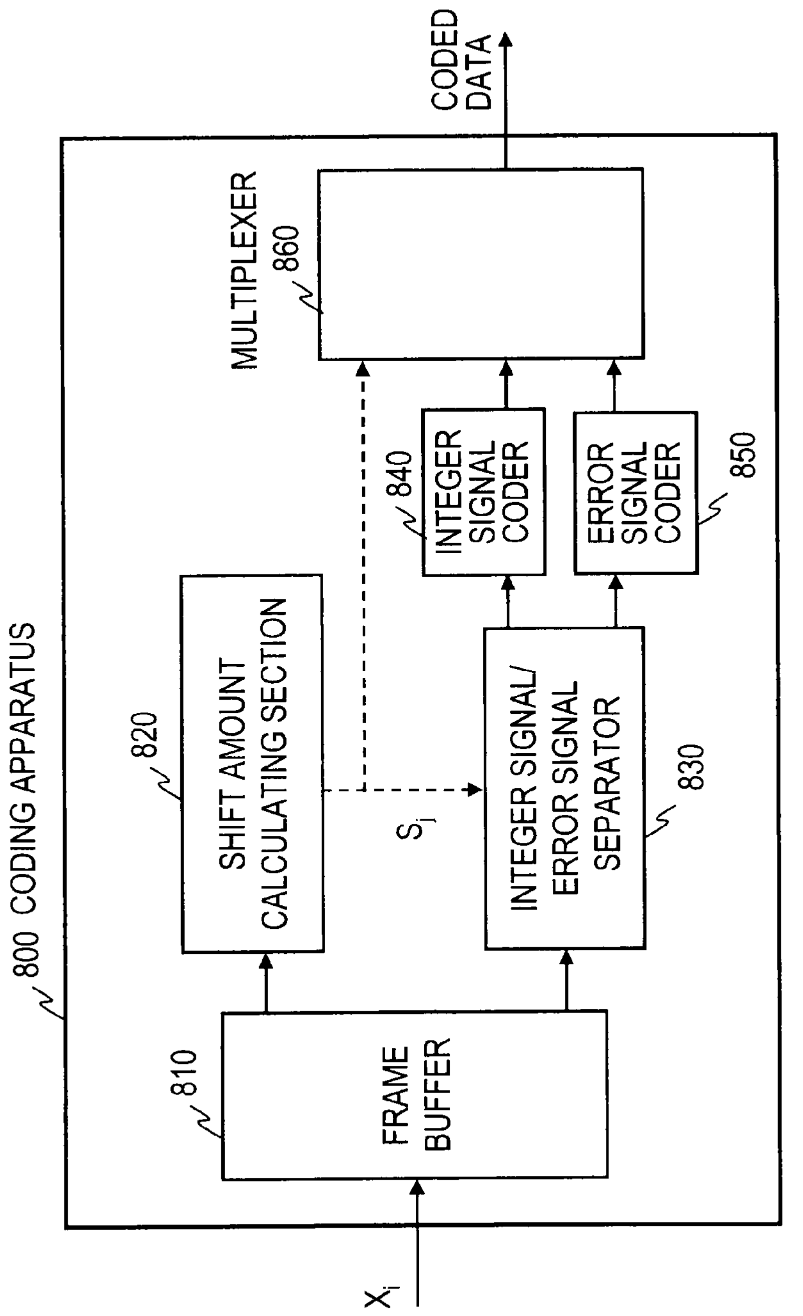
FIG. 1 BACKGROUND ART
FIG. 1 shows a functional configuration of a coding apparatus that can be implemented according to patent literature 1.
Figure 2:
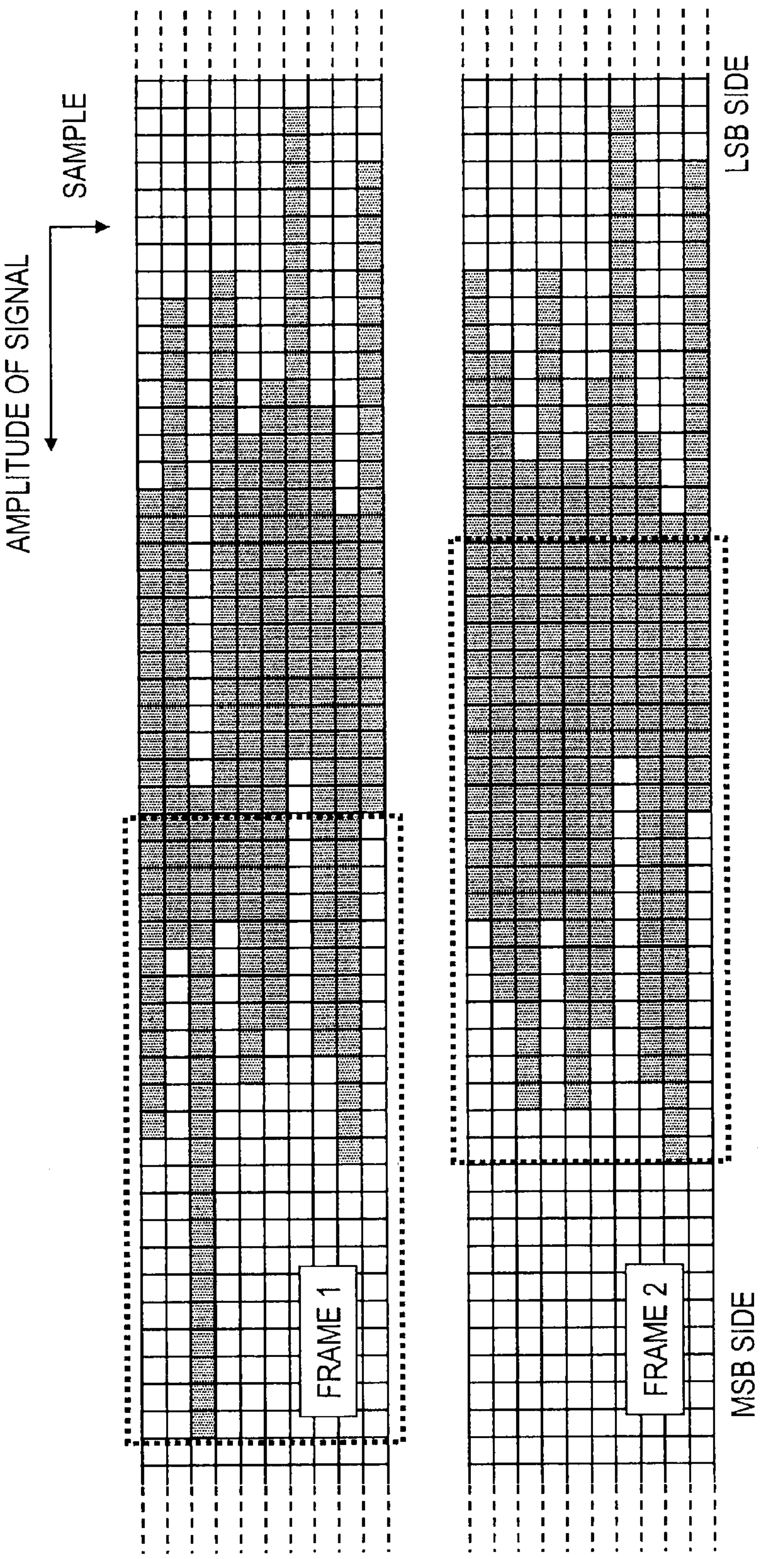
FIG. 2 BACKGROUND ART
FIG. 2 shows a concept of coding in the coding apparatus in FIG. 1.

In the following description, components having like functions and process steps performing like processing are labeled with the same reference numerals to avoid overlapping descriptions.

First Embodiment

Figure 11:
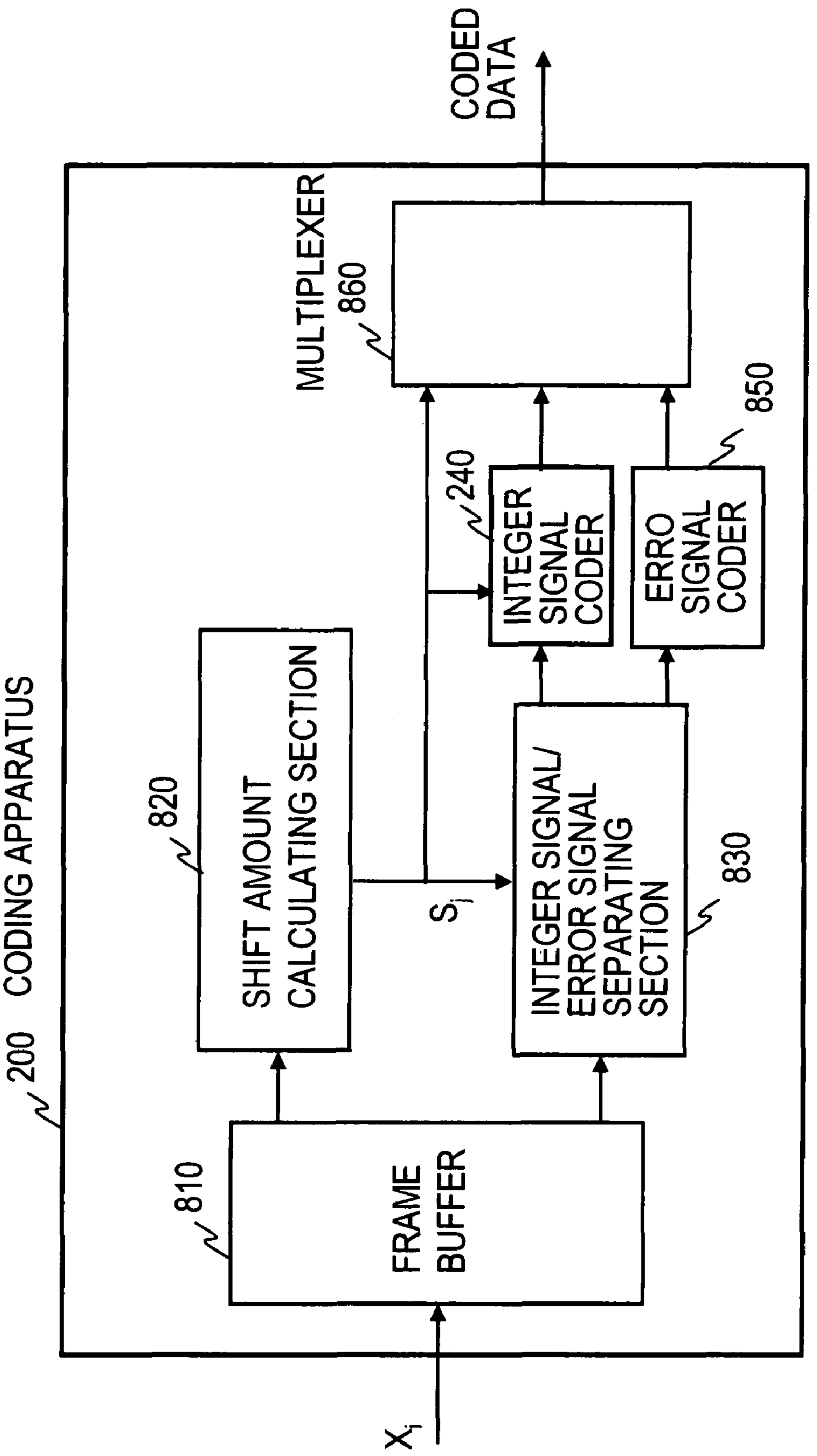
FIG. 11 shows an exemplary functional configuration of a coding apparatus according to a first embodiment.

FIG. 11 shows a functional configuration of a coding apparatus according to the present invention. The coding apparatus 200 includes a frame buffer 810, a shift amount calculating section 820, an integer signal/error signal separator 830, an integer signal coder 240, an error signal coder 850, and a multiplexer 860. The coding apparatus 200 differs from the coding apparatus shown in FIG. 1 in the integer signal coder 240. The integer signal coder 240 performs linear predictive coding that takes into consideration a shift amount and as such it receives a shift amount as one input.

Figure 7:
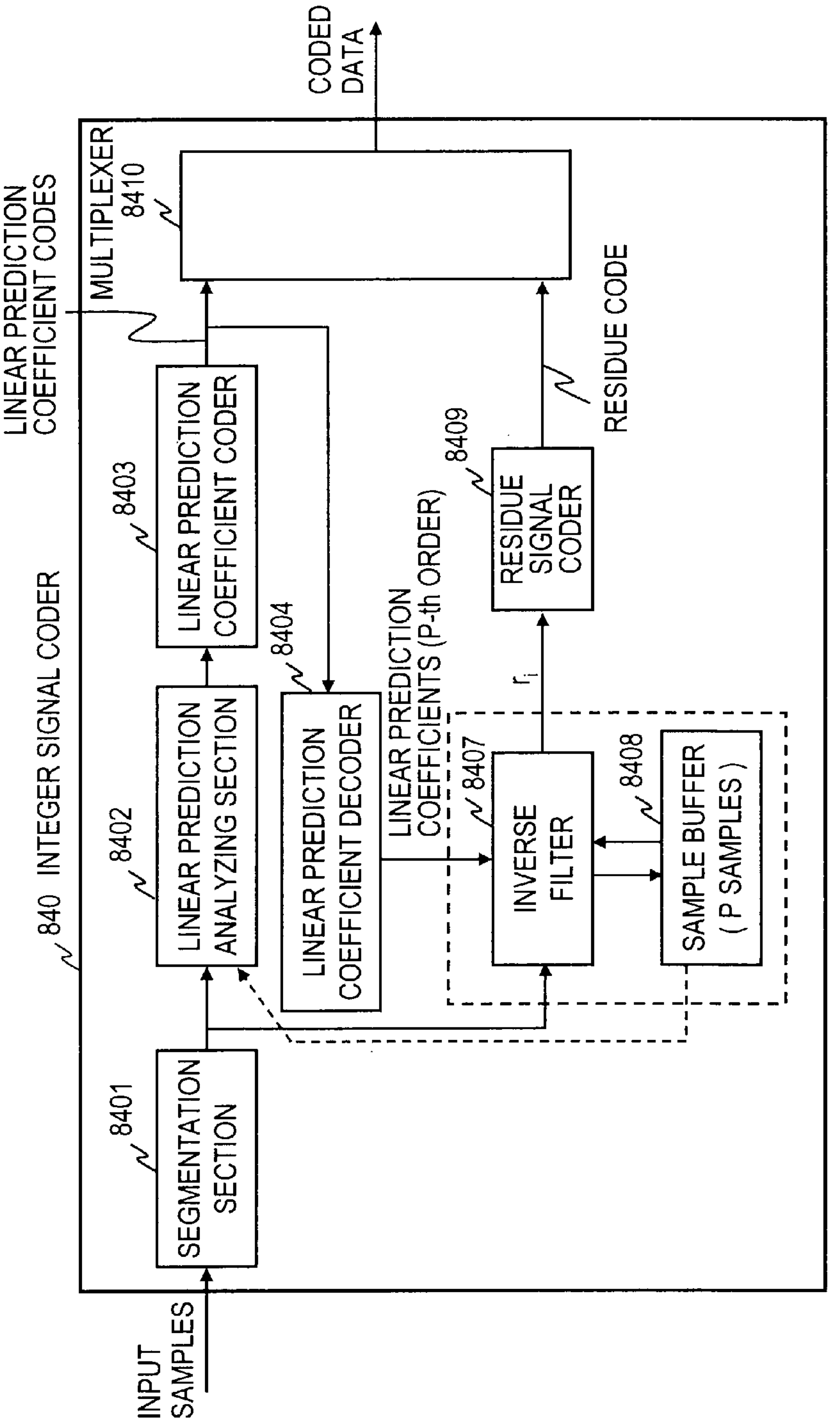
FIG. 7 BACKGROUND ART
FIG. 7 shows an exemplary functional configuration of an integer signal coder that can be implemented in the coding apparatus in FIG. 1.
Figure 12:
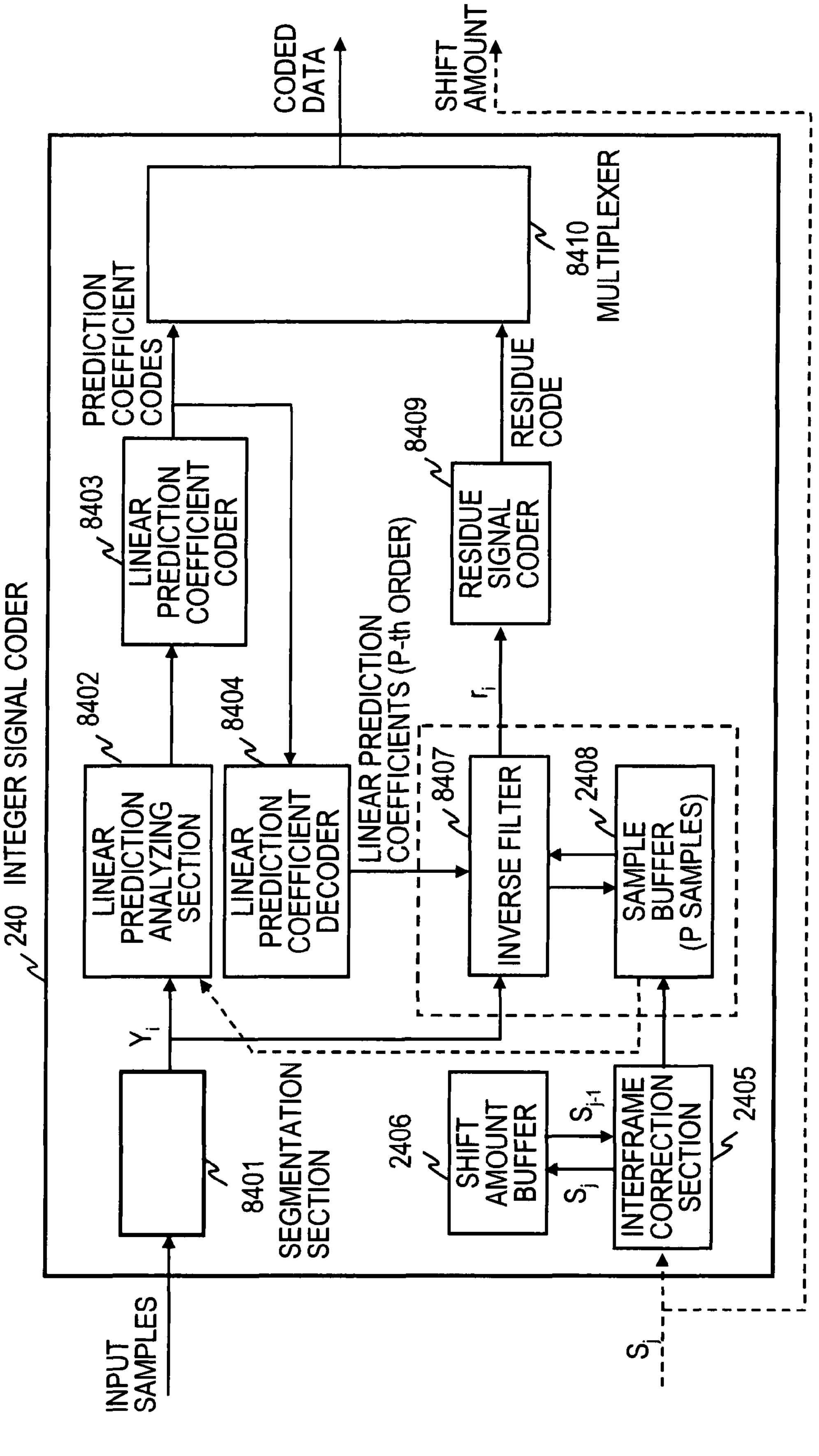
FIG. 12 shows an exemplary functional configuration of an integer signal coder according to the first embodiment.

FIG. 12 shows an exemplary functional configuration of the integer signal coder 240 for performing linear predictive coding in FIG. 11. The integer signal coder 240 includes a segmentation section 8401, a linear prediction analyzing section 8402, a linear prediction coefficient coder 8403, a linear prediction coefficient decoder 8404, an interframe correction section 2405, a shift amount buffer 2406, an inverse filter 8407, a sample buffer 2408, a residue signal coder 8409, and a multiplexer 8410. The integer signal coder 240 differs from the integer signal coder 840 in FIG. 7 in that in order to correct differences in interframe shift amounts the interframe correction section 2405 and the shift amount buffer 2406 are added and the sample buffer 2408 is capable of shifting sample values. The linear prediction analyzing section 8402 may also use the last P samples in the previous frame to perform linear prediction analysis. In that case, the linear prediction analyzing section 8402 receives last P sample values of the previous frame from the sample buffer 2408 in accordance with the shift amount of the current frame, which will be described later, as shown in the dashed line in FIG. 12.

Figure 13:
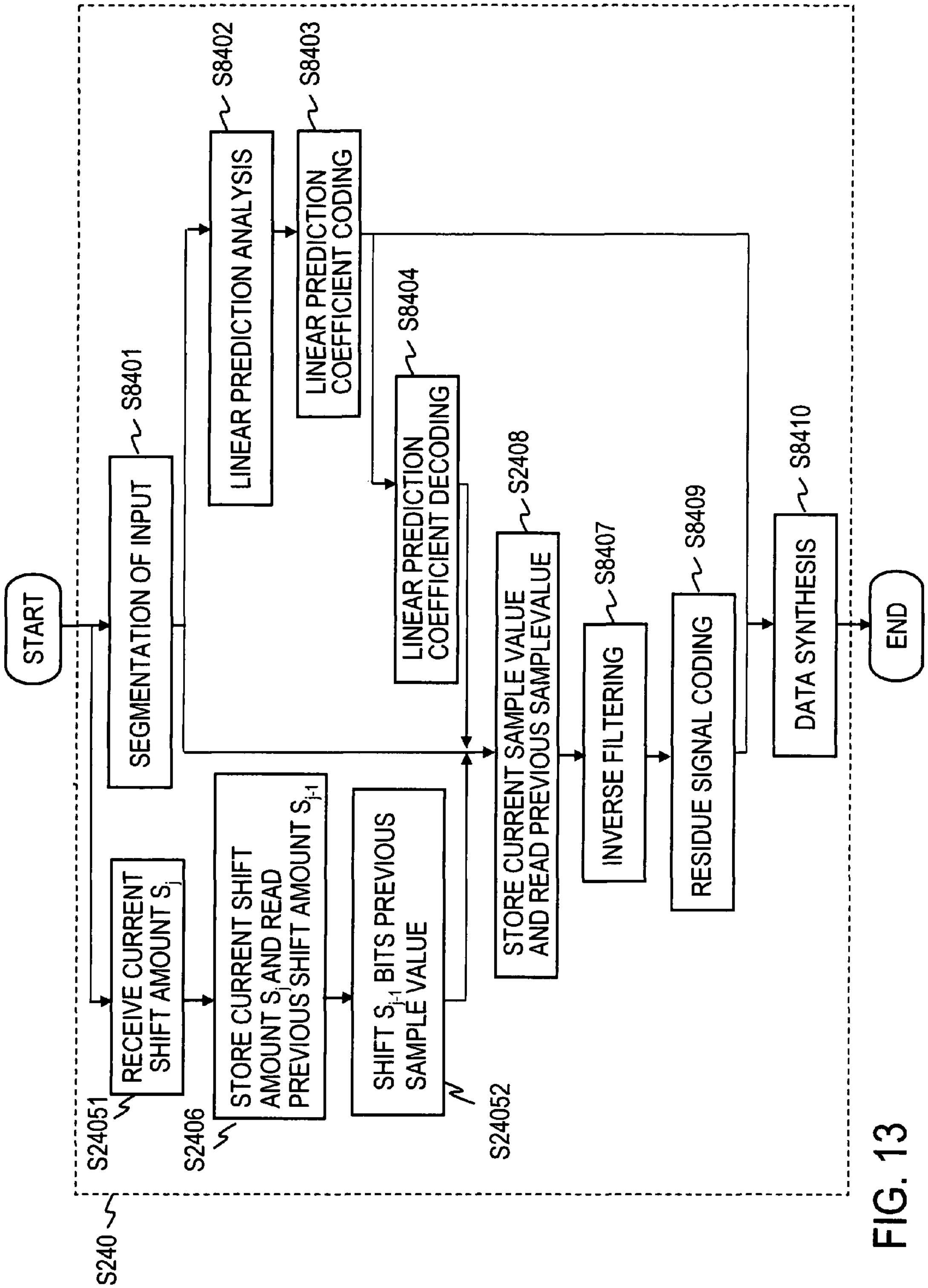
FIG. 13 shows a processing flow in an integer signal coder 240.

FIG. 13 shows a processing flow in the integer signal coder 240. The shift amount buffer 2406 and the sample buffer 2408 are initialized beforehand (to a state in which they do not contain the previous frame information). The segmentation section 8401 subdivides each frame of digital sample values $Y_i$ of an input integer signal Y into subframes (S8401). If frames are not to be divided into subframes, the segmentation section 8401 can be omitted as mentioned with respect to FIG. 7. In the following description, division into frames and division into subframes are collectively referred to as framing. The linear prediction analyzing section 8402 performs linear prediction analysis of the framed input integer signal $Y_i$ and outputs P linear prediction coefficients ($a_1, \ldots, a_P$) (S8402). The order of the linear prediction coefficients is denoted by P.

The linear prediction coefficient coder 8403 codes the linear prediction coefficients provided by the linear prediction analyzing section 8402 and outputs linear prediction coefficient codes (S8403). The linear prediction coefficient decoder 8404 decodes the outputs from the linear prediction coefficient coder 8403 and outputs P-order quantized linear prediction coefficients ($a_1\hat{}, \ldots, a_P\hat{}$) (S8404). While the linear prediction coefficient decoder 8404 decodes the outputs from the linear prediction coefficient coder 8403 to provide quantized linear prediction coefficients in this example, the linear prediction coefficient decoder 8404 may be omitted and linear prediction coefficient codes and their corresponding quantized linear prediction coefficients may be obtained from the linear prediction coefficient coder 8403.

The interframe correction section 2405 receives the shift amount $S_j$ of the current frame from the shift amount calculating section 820 (S24051). The interframe correction section 2405 records the shift amount $S_j$ of the current frame in the shift amount buffer 2406 and reads the shift amount $S_{j-1}$ of the previous frame from the shift amount buffer 2406 (S2406). The interframe correction section 2405 calculates the difference $S_j-S_{j-1}$ between the shift amounts and shifts (corrects) the last P samples of the previous frame held in the sample buffer 2408 to the right or left by $S_j-S_{j-1}$ bits (S24052). Whether they are to be shifted to the left or right is decided by whether right or left shift is defined as a positive direction in the shift amount calculation method used.

As a result of the correction, the last P sample values ($Y_{-1}, \ldots, Y_{-P}$) of the previous frame that are used for linear prediction of the first sample of the current frame become sample values ($Y'_{-1}, \ldots, Y'_{-P}$) shifted by the same amount as the current frame even if the shift amount $S_{j-1}$ of the previous frame is different from the shift amount $S_j$ of the current frame. If the current frame is the first frame or a random access frame (RA frame: a frame in which prediction from a past frame is not used), there are no shift amount and sample values of the previous frame. To cope with this problem, 0 may be assigned as the last P samples ($Y_{-1}, \ldots, Y_{-P}$) of the previous frame during initialization. Alternatively, the process for changing the shift amount may be omitted when the frame is the first frame or a random access frame. The lack of the previous shift amount and sample values can be solved by other methods.

The inverse filter 8407 stores at least the last P samples out of the sample values in the current frame in the sample buffer 2408. The inverse filter 8407 also reads the last P sample values of the previous frame from the sample buffer 2408 (S2408). The inverse filter 8407 calculates a signal transmitted by a linear prediction coefficient code by using the P-order quantized linear prediction coefficients ($a_1\hat{}, \ldots, a_P\hat{}$), the last P samples in the previous frame read out from the sample buffer 2408 and the sample values in the current frame. In particular, because the predictive value $Y''_i$ of the i-th sample of the current frame of the signal is obtained from the previous P sample values, i−1 sample values in the current frame and P−i+1 sample values of the previous frame must be used to perform linear prediction in the range of $1 \leqq i \leqq P$. That is, a quantized linear prediction coefficients ($a_1\hat{}, \ldots, a_P\hat{}$) of the current frame, the sample values ($Y'_{-1}, \ldots, Y'_{-P}$) of the previous frame, and the sample values ($Y_1, \ldots, Y_{i-1}$) of the current frame are used to perform calculation as follows.

[Equation 2]

$$Y_i'' = \begin{cases} \left(\sum_{k=1}^{P-i+1} \hat{a}_{k+i-1} \cdot Y'_{-k} + \sum_{k=1}^{i-1} \hat{a}_k \cdot Y_{i-k}\right) & (1 \le i \le P) \\ \sum_{k=1}^{P} \hat{a}_k \cdot Y_{i-k} & (P < i) \end{cases} \tag{1}$$

The inverse filter 8407 subtracts the signal transmitted by the restored linear prediction coefficient code from the input integer signal $Y_i$ and outputs a residue signal $r_i$ (S8407). The residue signal $r_i$ will be as follows.

[Equation 3]

$$r_i = \begin{cases} Y_i - \left(\sum_{k=1}^{P-i+1} \hat{a}_{k+i-1} \cdot Y'_{-k} + \sum_{k=1}^{i-1} \hat{a}_k \cdot Y_{i-k}\right) & (1 \le i \le P) \\ Y_i - \sum_{k=1}^{P} \hat{a}_k \cdot Y_{i-k} & (P < i) \end{cases} \tag{3}$$

The residue signal coder 8409 encodes the residue signal $r_i$ outputted from the inverse filter 8407 and outputs a residue code (S8409). The multiplexer 8410 combines the linear prediction coefficient code outputted from the linear prediction coefficient coder 8403 with the residue code outputted from the residue signal coder 8409 and outputs the combined result as an integer signal code (S8410).

Figure 8:
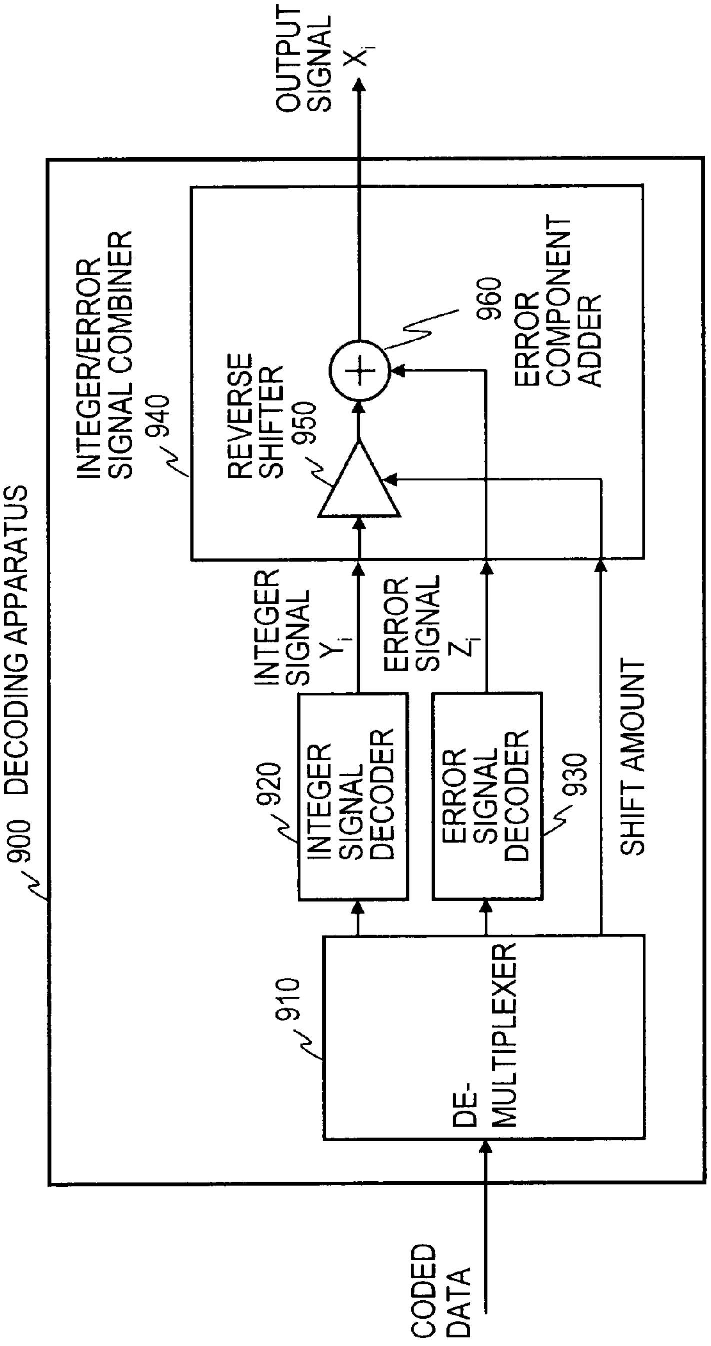
FIG. 8 BACKGROUND ART
FIG. 8 shows a functional configuration of a decoding apparatus that can be implemented according to patent literature 1.
Figure 9:
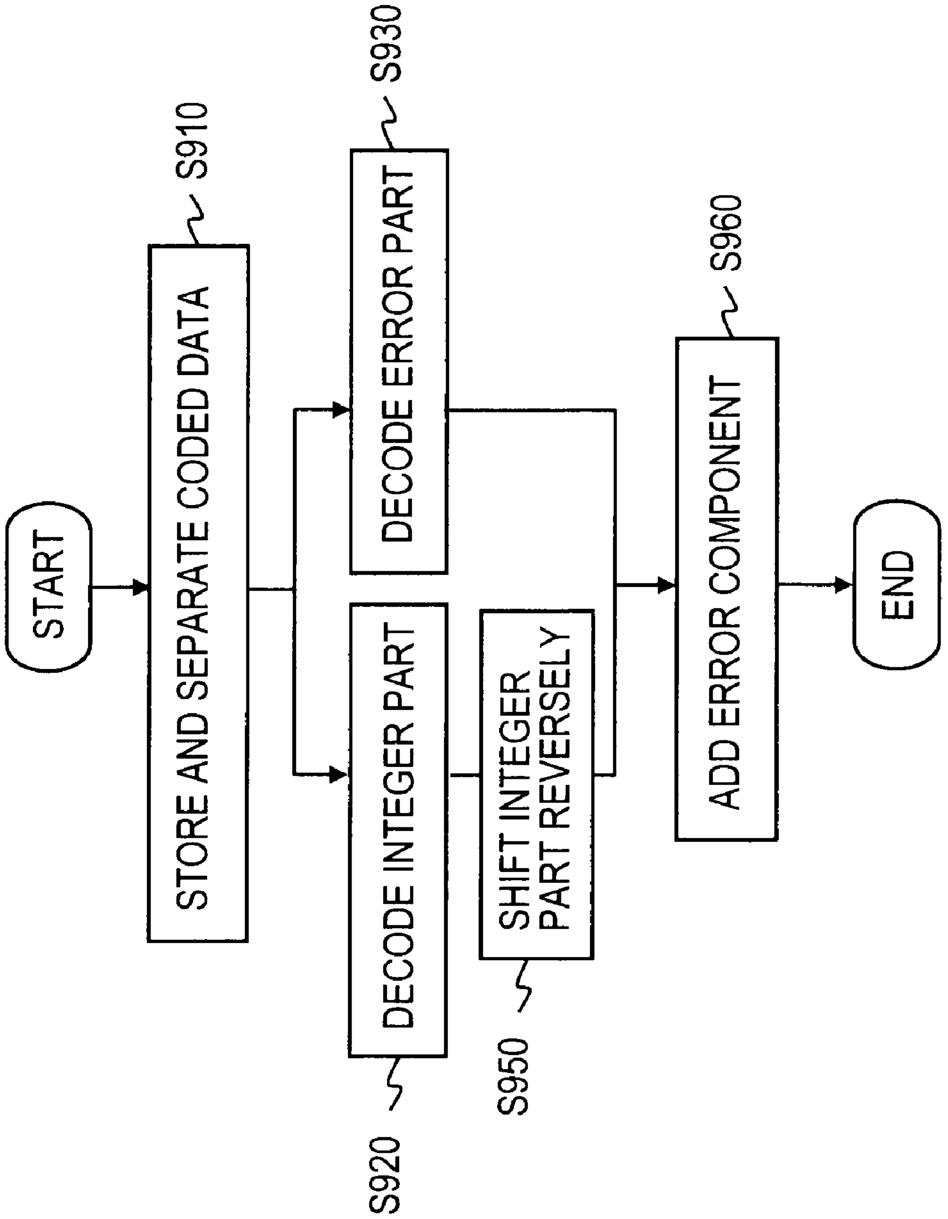
FIG. 9 BACKGROUND ART
FIG. 9 shows a processing flow in the decoding apparatus in FIG. 8.
Figure 14:
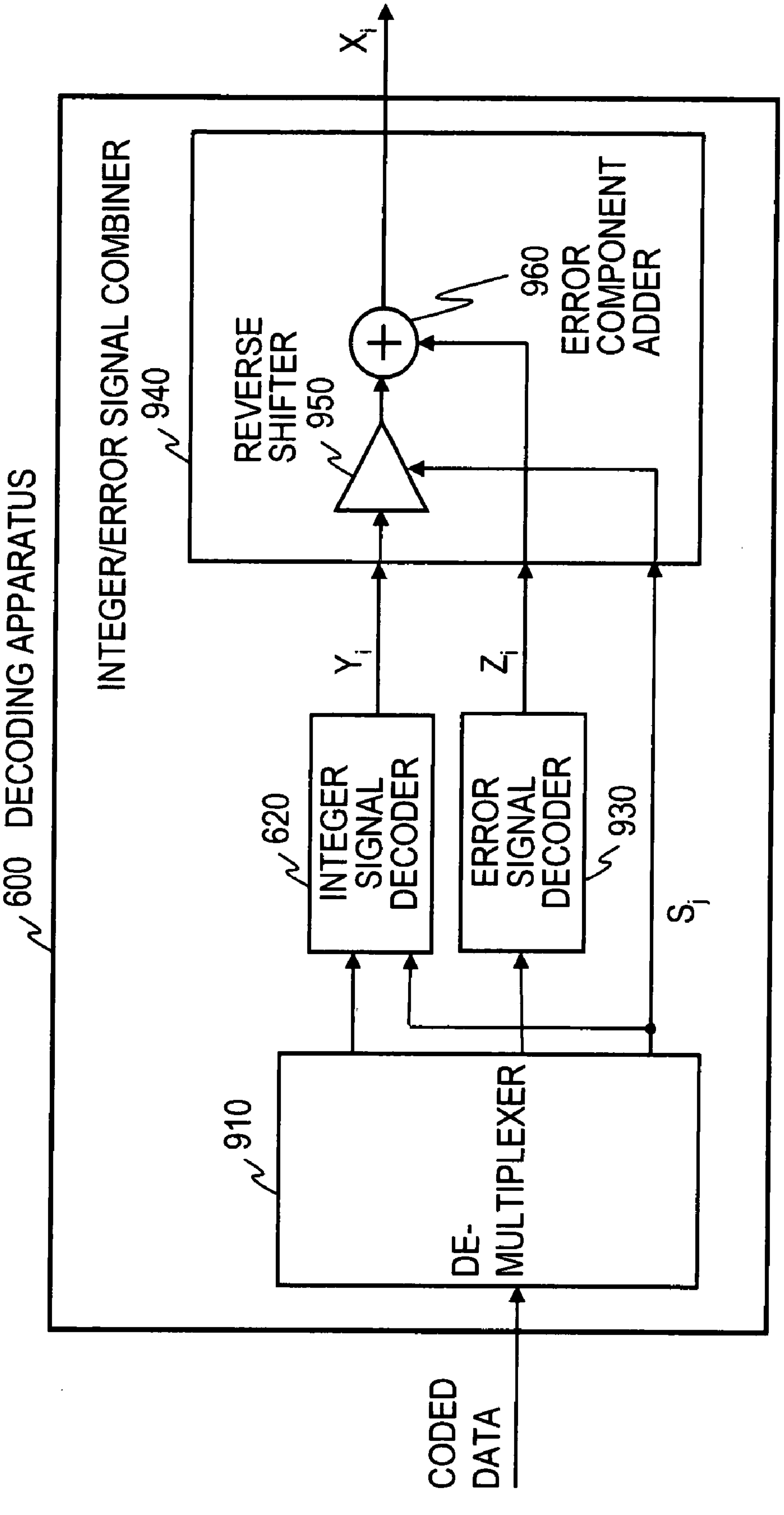
FIG. 14 shows a functional configuration of a decoding apparatus according to the first embodiment.

FIG. 14 shows a functional configuration of a decoding apparatus according to the present invention. The decoding apparatus 600 includes a demultiplexer 910, an integer signal decoder 620, and an integer/error signal combiner 940 having an error signal decoder 930, a reverse shifter 950 and an error component adder 960. The decoding apparatus 600 differs from the decoding apparatus 900 shown in FIG. 8 in that the integer signal decoder 620 performs linear predictive decoding by taking into consideration shift amounts. The decoding apparatus 600 performs the same process of FIG. 9, except that step S920 is replaced with step S620 shown in FIG. 16.

Figure 10:
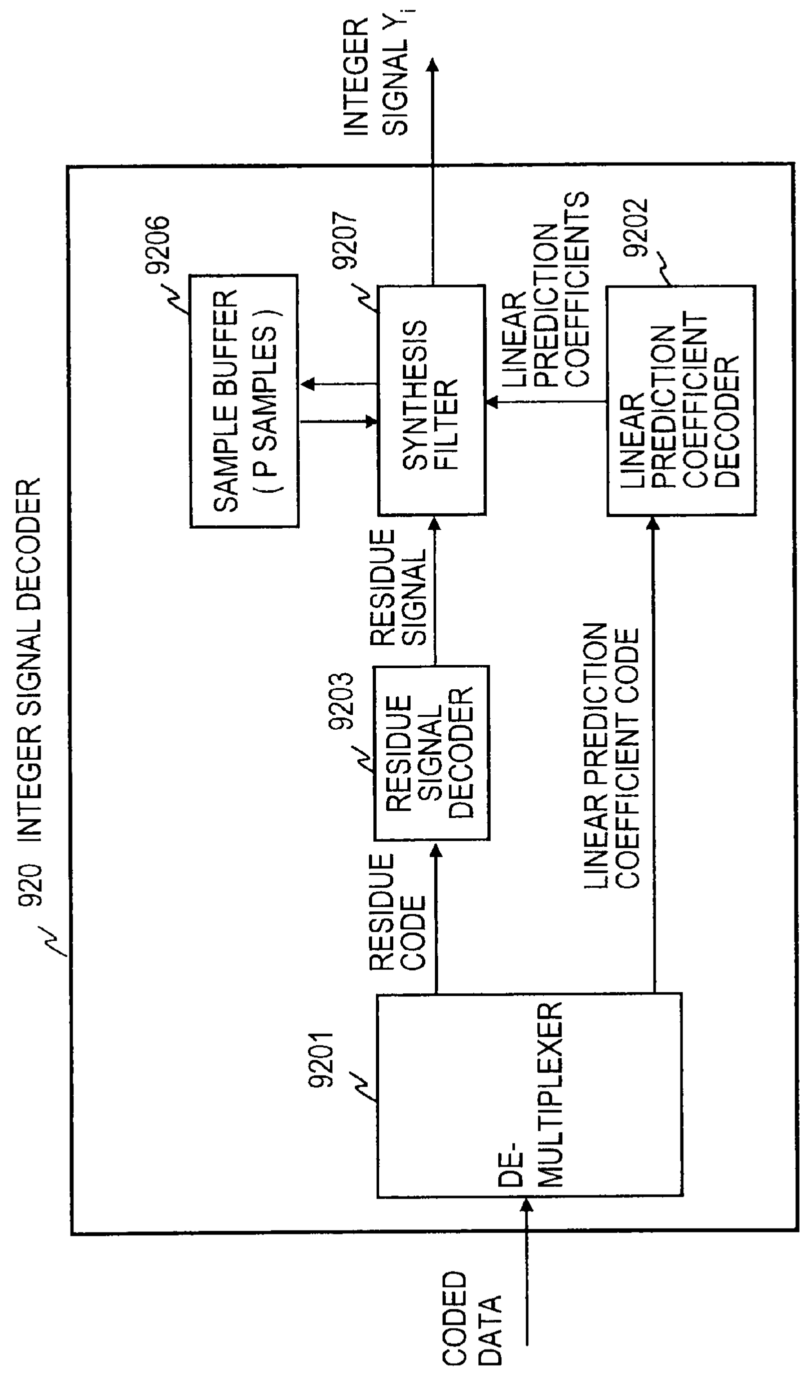
FIG. 10 BACKGROUND ART
FIG. 10 shows an exemplary functional configuration of an integer signal decoder that can be implemented in the decoding apparatus in FIG. 8.
Figure 15:
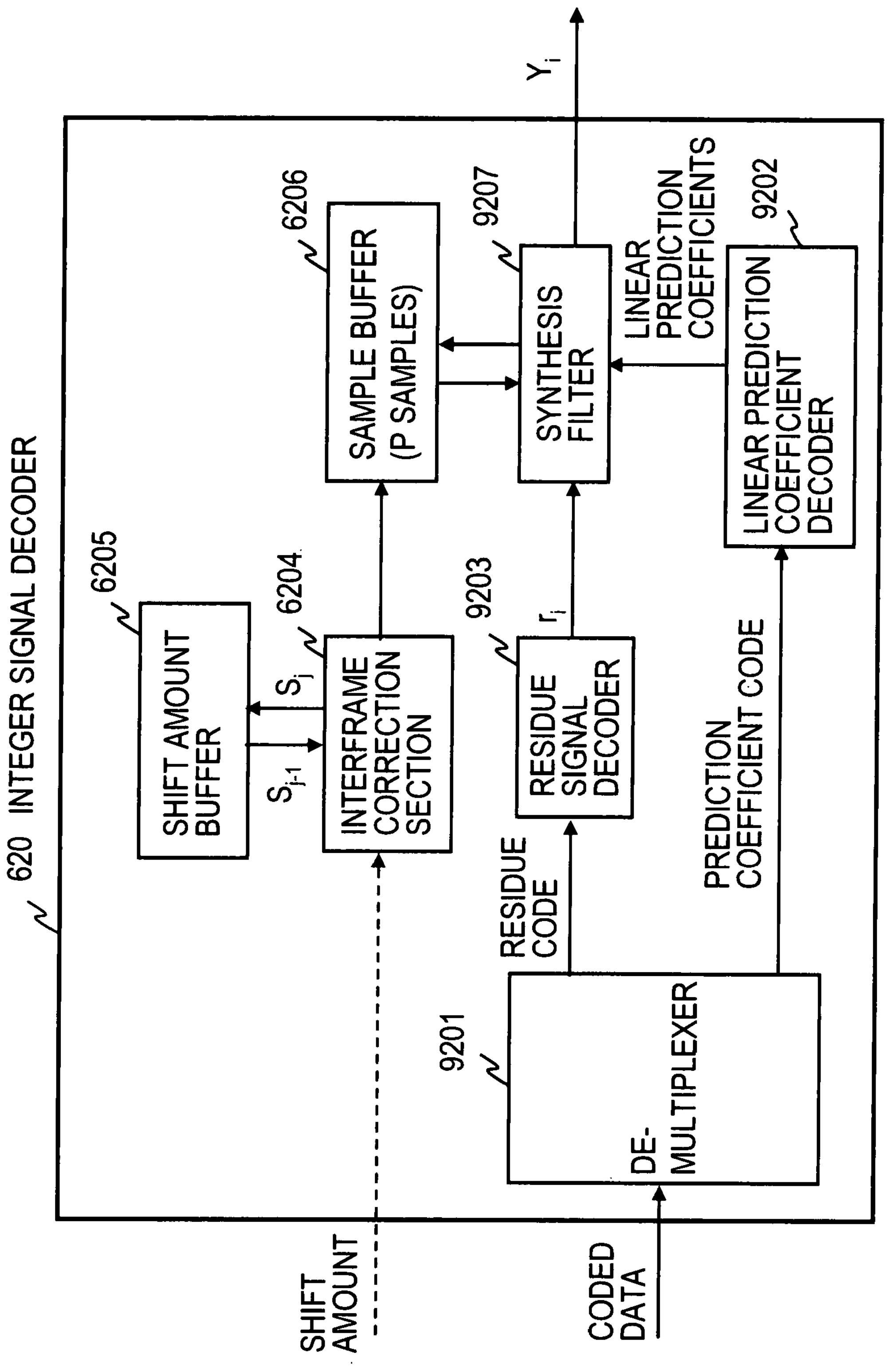
FIG. 15 shows an exemplary functional configuration of an integer signal decoder according to the first embodiment.
Figure 16:
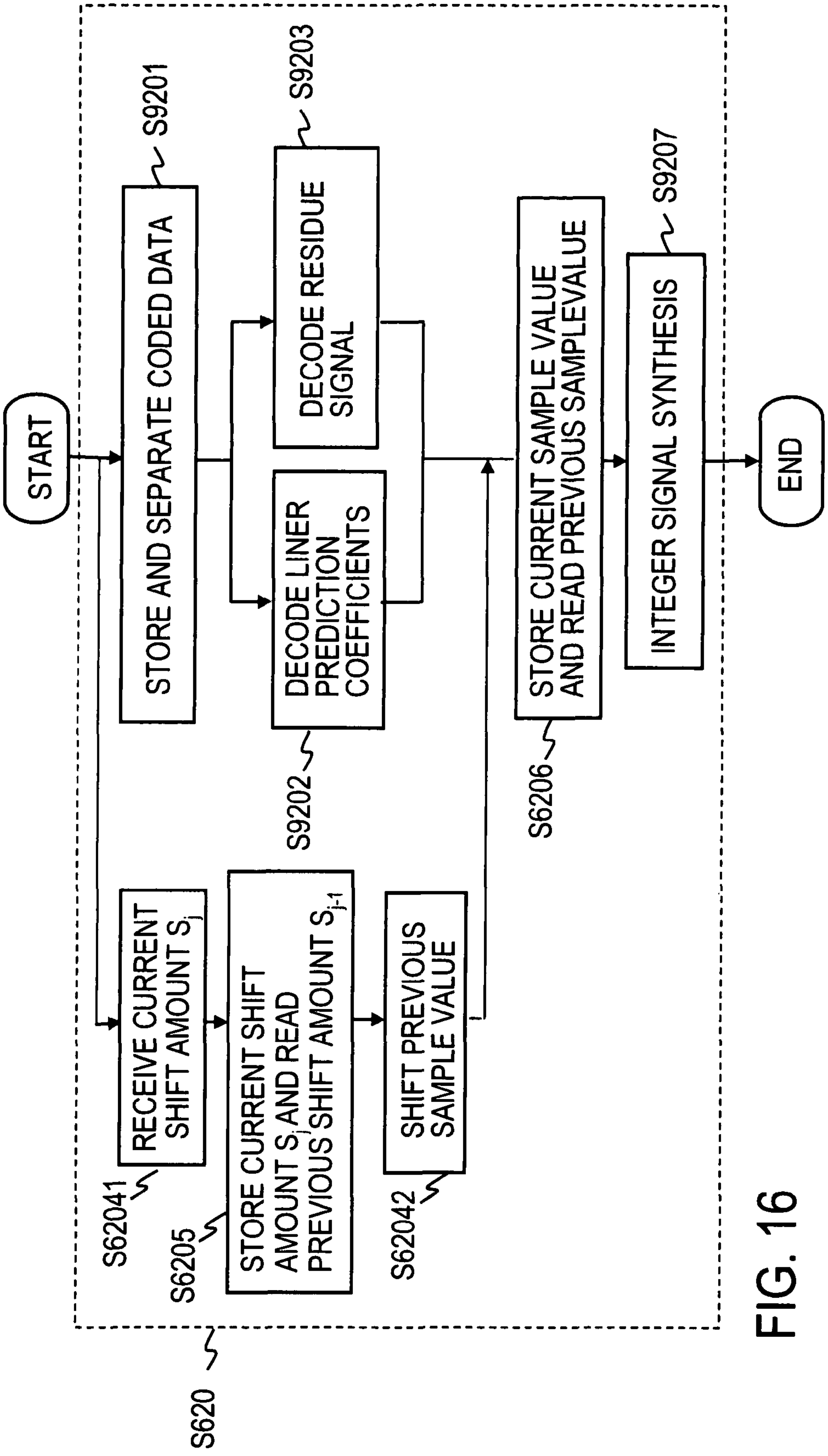
FIG. 16 shows a processing flow in the integer signal decoder 620.

FIG. 15 shows an exemplary functional configuration of the integer signal decoder 620 which performs linear predictive decoding according to the present invention. FIG. 16 shows a linear prediction decoding process flow performed by the integer signal decoder 620. The integer signal decoder 620 includes a demultiplexer 9201, a linear prediction coefficient decoder 9202, a residue signal decoder 9203, an interframe correction section 6204, a shift amount buffer 6205, a sample buffer 6206, and a synthesis filter 9207. The integer signal decoder 620 differs from the integer signal decoder 920 in FIG. 10 in that the interframe correction section 6204 and the shift amount buffer 6205 are added and the sample buffer 6206 is capable of changing the shift amount of the sample value.

In the integer signal decoder 620, the shift amount buffer 6205 and the sample buffer 6206 are initialized (to a state in which they contain no previous frame information) beforehand. The demultiplexer 9201 receives and stores coded data and separates it into a linear prediction coefficient code and a residue code (S9201). The linear prediction coefficient decoder 9202 decodes the linear prediction coefficient code and outputs P linear prediction coefficients ($a'_1, \ldots, a'_P$) (S9202). The residue signal decoder 9203 decodes the residue code and outputs a residue signal $r_i$ (S9203). On the other hand, the interframe correction section 6204 receives the shift amount $S_j$ of the current frame from the demultiplexer 9201 (S62041). The interframe correction section 6204 stores the shift amount $S_j$ of the current frame in the shift amount buffer 6205 and reads the shift amount $S_{j-1}$ of the previous frame from the shift amount buffer 6205 (S6205). The interframe correction section 6204 calculates the difference between the shift amounts $S_j - S_{j-1}$ and shifts (corrects) the last P sample values ($Y_{-1}, \ldots, Y_{-P}$) of the previous frame stored in the sample buffer 6202 by $S_j - S_{j-1}$ (S62042). Whether to shift to the right or left depends on the direction of shift performed in the corresponding coding apparatus.

Even if the shift amount $S_{j-1}$ of the previous frame differs from the shift amount $S_j$ of the current frame, the values of the last P samples ($Y_{-1}, \ldots, Y_{-P}$) of the previous frame, which are used in linear prediction of the first samples of the current frame will be sample values ($Y'_{-1}, \ldots, Y'_{-P}$) shifted by the same amount as that of the current frame as a result of the correction. If the current frame is the first frame or a random access frame, there is not a shift amount or sample values of the previous frame. To cope with this, 0 may be assigned as the last P sample values ($Y_{-1}, \ldots, Y_{-P}$) of the previous frame. Alternatively, shift amount changing processing may be omitted if the frame is the first frame or a random access frame. The lack of the previous shift amount and sample values may be addressed by other methods.

The synthesis filter 9207 stores at least the last P sample values of the current frame in the sample buffer 6206 and also reads the last P sample values of the previous frame from the sample buffer 6206 (S6206). The synthesis filter 9207 uses quantized linear prediction coefficients ($a_1\hat{}, \ldots, a_P\hat{}$) outputted by the linear prediction coefficient decoder 9202, the sample values ($Y'_{-1}, \ldots, Y'_{-P}$) of the previous frame held in the sample buffer 9206 and the sample values ($Y_1, \ldots, Y_{i-1}$) of the current frame and corrected by the interframe correcting section 6204, and a residue signal $r_i$ to synthesize an integer signal $Y_i$ by using linear prediction as follows (S9207).

[Equation 4]

$$Y_i = \begin{cases} \left(\sum_{k=1}^{P-i+1} \hat{a}_{k+i-1} \cdot Y'_{-k} + \sum_{k=1}^{i-1} \hat{a}_k \cdot Y_{i-k}\right) + r_i & (1 \le i \le P) \\ \left(\sum_{k=1}^{P} \hat{a}_k \cdot Y_{i-k}\right) + r_i & (P < i) \end{cases} \tag{4}$$

In this way, interframe prediction of linear predictive coding is performed by taking into consideration the shift amounts of the previous frame and the current frames to be coded. Therefore, efficient coding can be performed and the amount of codes can be reduced.

Second Embodiment

Figure 17:
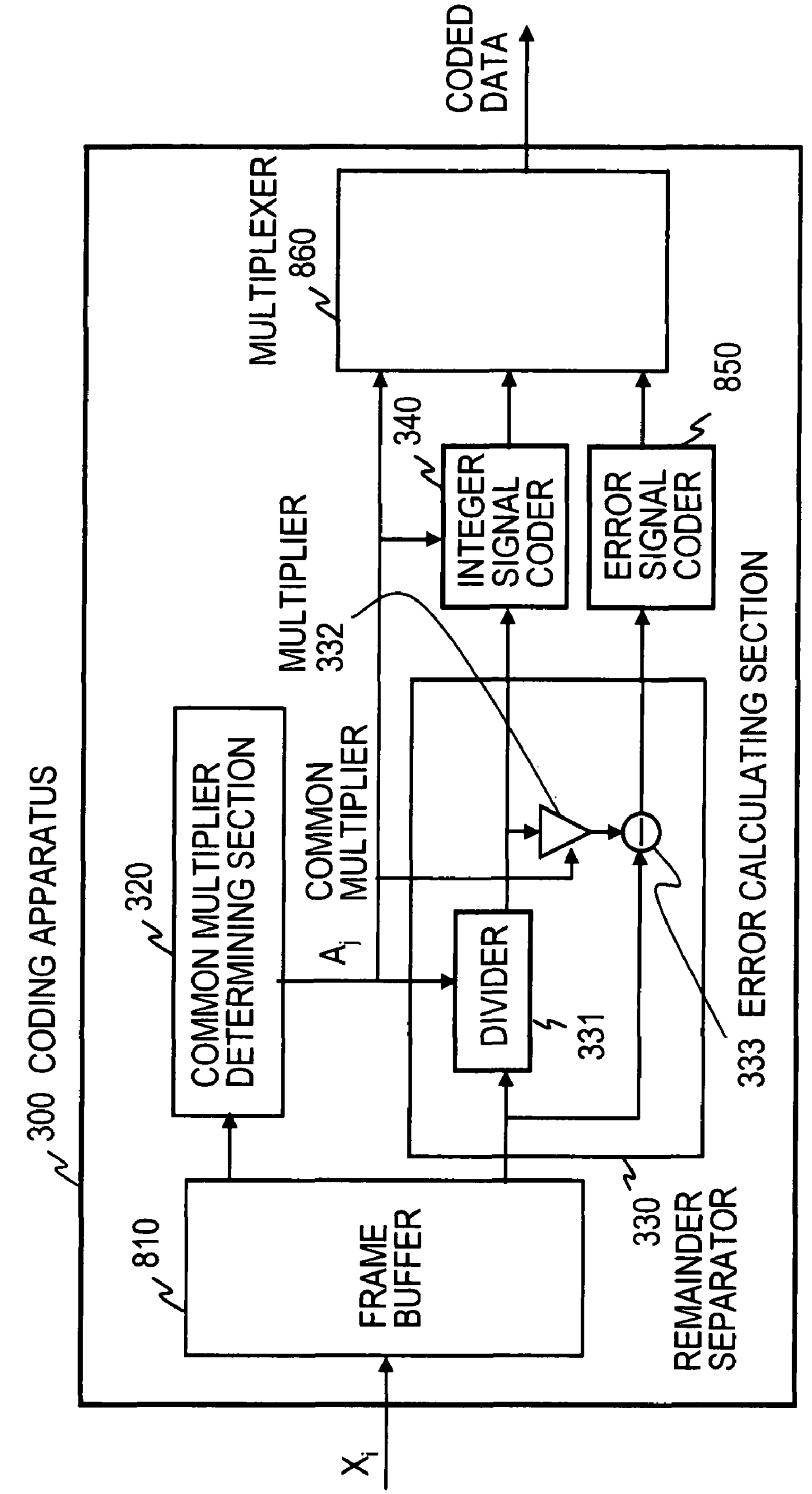
FIG. 17 shows a functional configuration of a coding apparatus according to a second embodiment.

FIG. 17 shows a functional configuration of a coding apparatus according to a second embodiment. Whereas the amplitudes of samples are adjusted by bit shifting in the first embodiment, the number of amplitude bits of samples is reduced by dividing the sample values $X_i$ in a frame by the greatest common divisor in the second embodiment, thereby accomplishing amplitude adjustment similar to the above-described bit shifting. The coding apparatus 300 includes a frame buffer 810, a remainder separator 330 having a common multiplier determining section 320, a divider 331, a multiplier 332, and an error calculating section 333, and an integer signal coder 340, an error signal coder 850, and a multiplexer 860. The coding apparatus 300 differs from the coding apparatus 800 of FIG. 1 in the provision of the common multiplier determining section 320, the remainder separator 330 which has the error calculating section 333, and the integer signal coder 340.

Figure 18:
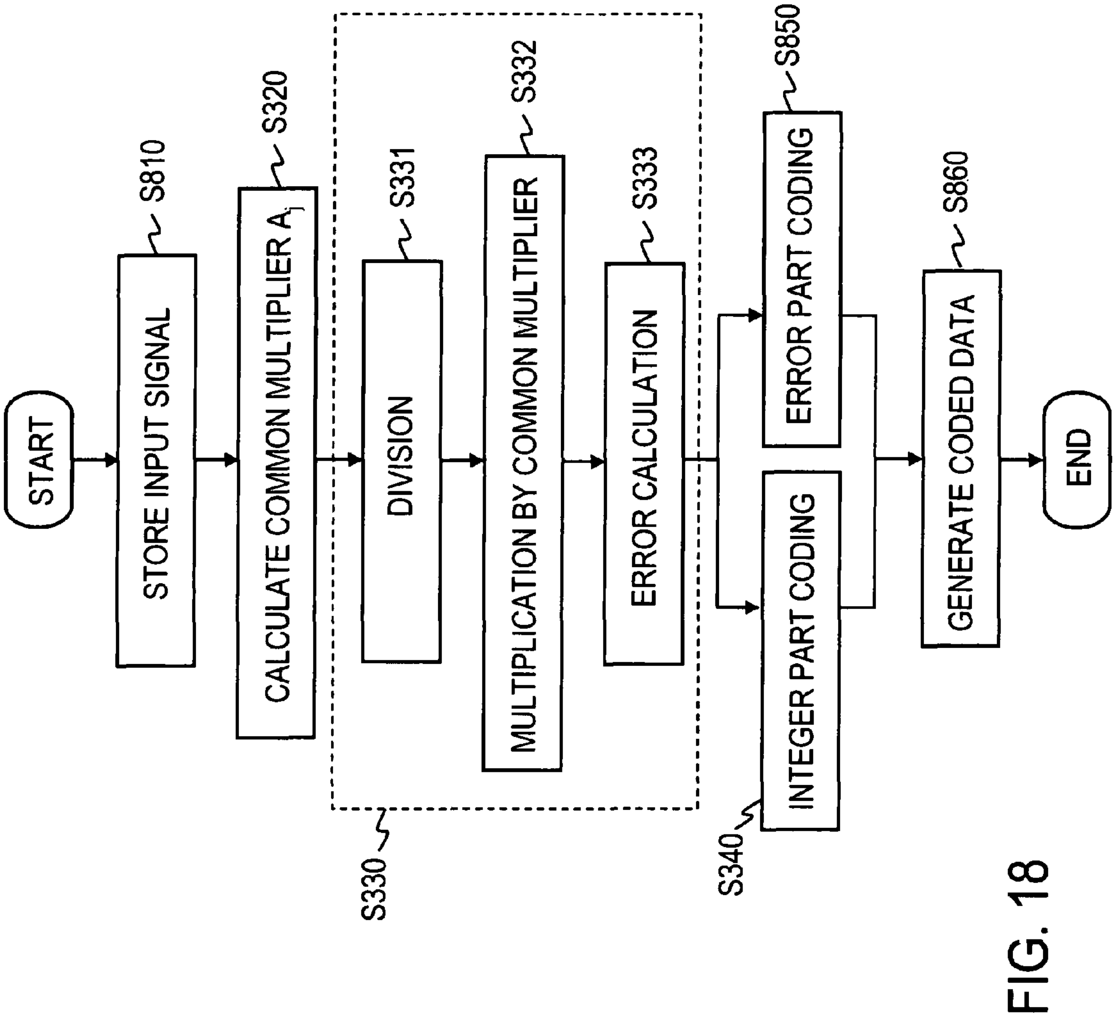
FIG. 18 shows a processing flow in the coding apparatus 300.

FIG. 18 shows a processing flow in the coding apparatus 300. The frame buffer 810 temporarily stores a digital input signal $X_i$ and constructs a frame with $N_F$ sample values $X_i$ (i=1, . . . , $N_F$) (S810). The common multiplier determining section 320 determines, for each frame, the greatest common divisor of the input signal $X_i$ as the common multiplier $A_j$ (S320). The common multiplier $A_j$ can be decomposed into a multiplier $m_j$ and a shift amount $S_j$ as a Equation shown below, where the multiplier $m_j$ can be expressed as $m_j$=1.$M_j$ and 1.0<$m_j$<2.0.

[Equation 5]

$$A_j=1\cdot M_j\times 2^{S_j} \tag{5}$$

Figure 4:
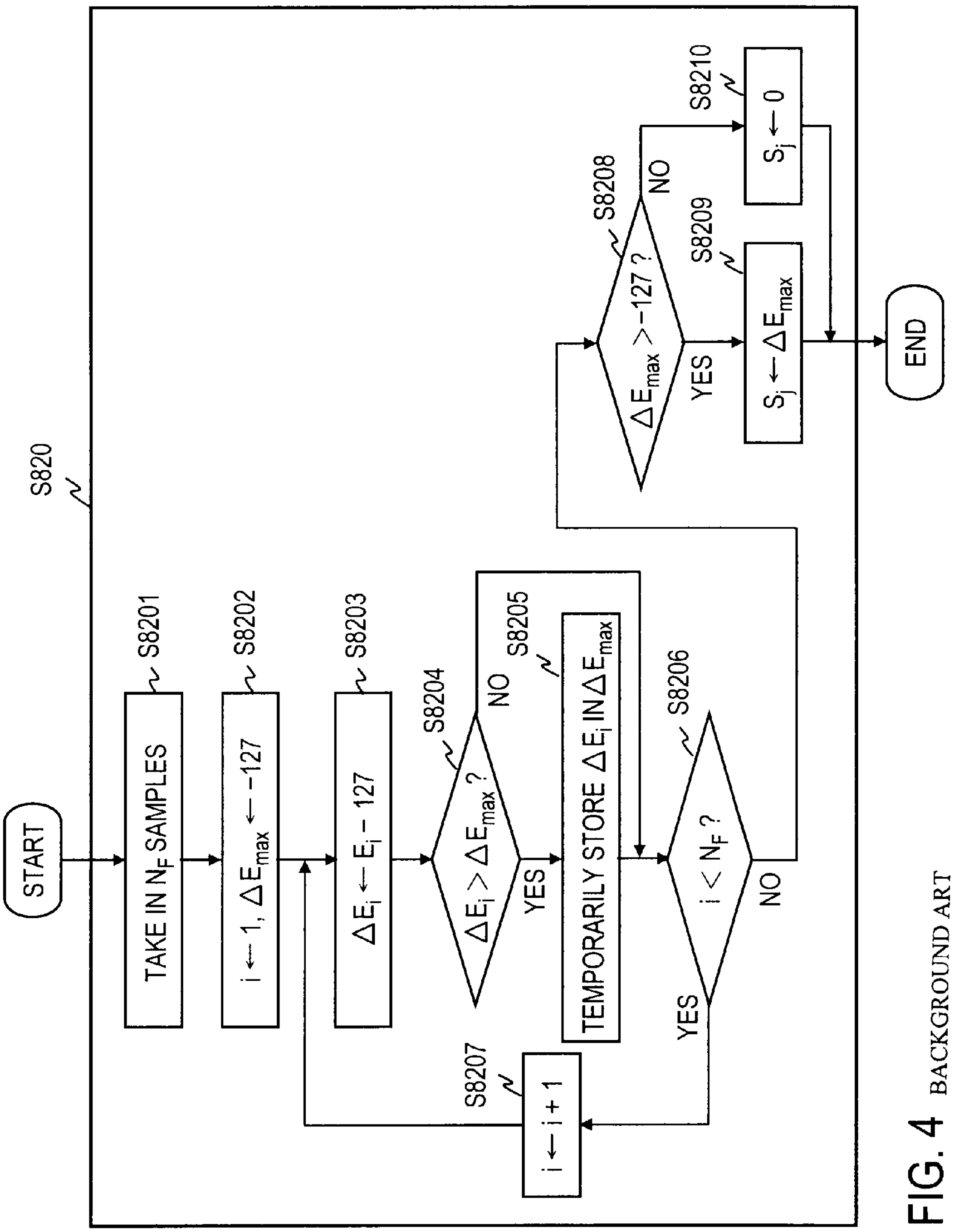
FIG. 4 BACKGROUND ART
FIG. 4 shows a detailed processing flow in a shift amount calculating section.

If $m_j$=1.0, $A_j$ is equal to the shift amount $S_j$ and therefore shifting is performed simply. Because the common multiplier $A_j$ can be decomposed as shown above, the shift amount $S_j$ may be obtained by using the method for obtaining the shift amount $S_j$ illustrated in FIGS. 4 and 5 and a multiplier $m_j$ may be obtained that is less than or equal to the value that maximizes the amplitude of the integer part.

Inputted into the divider 331 of the remainder separator 330 are the input signal $X_i$ and the common multiplier $A_j$. The divider 331 calculates an integer signal $Y_i$ (S331) as follows.

[Equation 6]

If $X_i \geqq 0$, $$Y_i=\left\lfloor\frac{2^{Q-1}}{A_j}X_i\right\rfloor=\left\lfloor\frac{1}{1\cdot M}\times X_i\times 2^{Q-1-S_j}\right\rfloor \tag{6}$$

If $X_i<0$, $$Y_i=-\left\lfloor\left|\frac{2^{Q-1}}{A_j}X_i\right|\right\rfloor=-\left\lfloor\left|\frac{1}{1\cdot M}\times X_i\times 2^{Q-1-S_j}\right|\right\rfloor \tag{7}$$

The multiplier 332 multiplies the output from the divider 331 by the common multiplier $A_j$ (S332) and the error calculating section 333 calculates an error signal $Z_i=X_i-Y_i\times A_j$ (S333). The integer signal coder 340 applies linear predictive coding to the integer signal separated at the remainder separator 330, by taking into consideration a common multiplier $A_j$ (S340). The error signal coder 850 encodes the error signal separated at the remainder separator 330 (S850). The multiplexer 860 combines the coded integer signal, error signal and shift amount and outputs coded data (S860).

Figure 19:
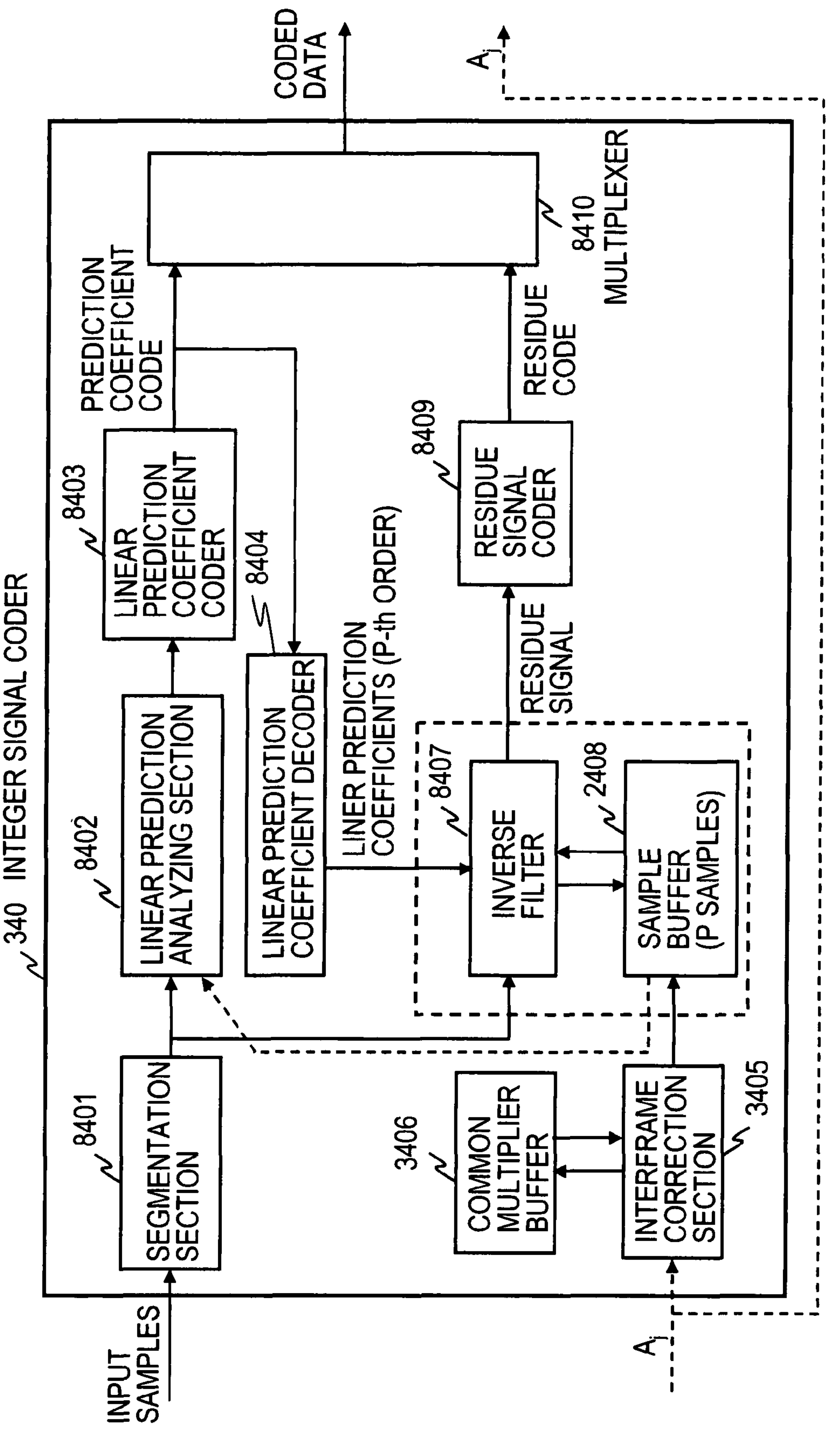
FIG. 19 shows a functional configuration of an integer signal coder according to the second embodiment.
Figure 20:
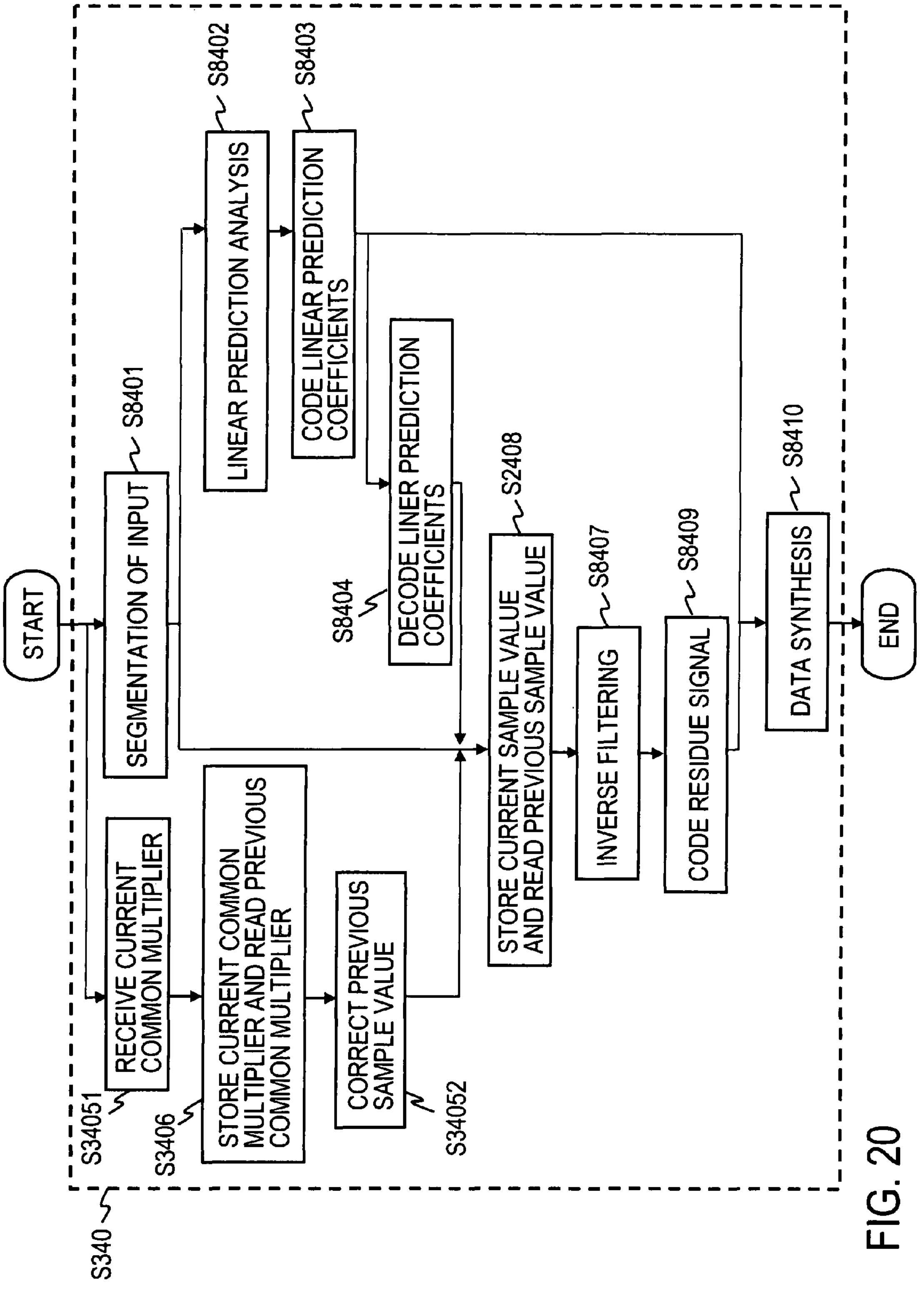
FIG. 20 shows a processing flow in the integer signal coder 340.

FIG. 19 shows an exemplary functional configuration of the integer signal coder 340 according to the second embodiment. The integer signal coder 340 differs from the integer signal coder 240 of the first embodiment shown in FIG. 12 in that it includes a common multiplier buffer 3406 and an interframe correction section 3405 that uses a common multiplier to correct samples. FIG. 20 shows a processing flow in the integer signal coder 340. The differences between Step S340 and step S240 of FIG. 13 are in steps S34051, S3406, and S34052. At step S34051, the intraframe correction section 3405 receives a common multiplier $A_j$ determined at the common multiplier determining section 320 (FIG. 17). At step S3406, the interframe correction section 3405 stores the common multiplier $A_j$ of the current frame in the common multiplier buffer 3406 and reads the common multiplier $A_{j-1}$ of the previous frame from the common multiplier buffer 3406. At step S34052, the interframe correction section 3405 calculates the ratio between the common multipliers, $A_{j-1}/A_j$, multiplies (corrects) the last P sample values ($Y_{-1}$, . . . , $Y_{-P}$) of the previous frame that are held in the sample buffer 2408 by $A_{j-1}/A_j$, and stores the corrected sample values ($Y'_{-1}$, . . . , $Y'_{-P}$). The remaining part of the processing flow are the same as those in FIG. 13.

In this way, the integer signal coder 340 corrects the integer signal of the previous frame whose amplitude has been adjusted using the remainder separator 330 using a common multiplier $A_{j-1}$ so that it becomes an integer signal whose amplitude has been adjusted by the common multiplier $A_j$ of the current frame and then uses the corrected integer signal of the previous frame to perform linear predictive coding of the amplitude-adjusted integer signal of the current frame in the process of performing linear predictive coding based on the integer signal of the previous frame and the integer signal of the current frame.

Figure 21:
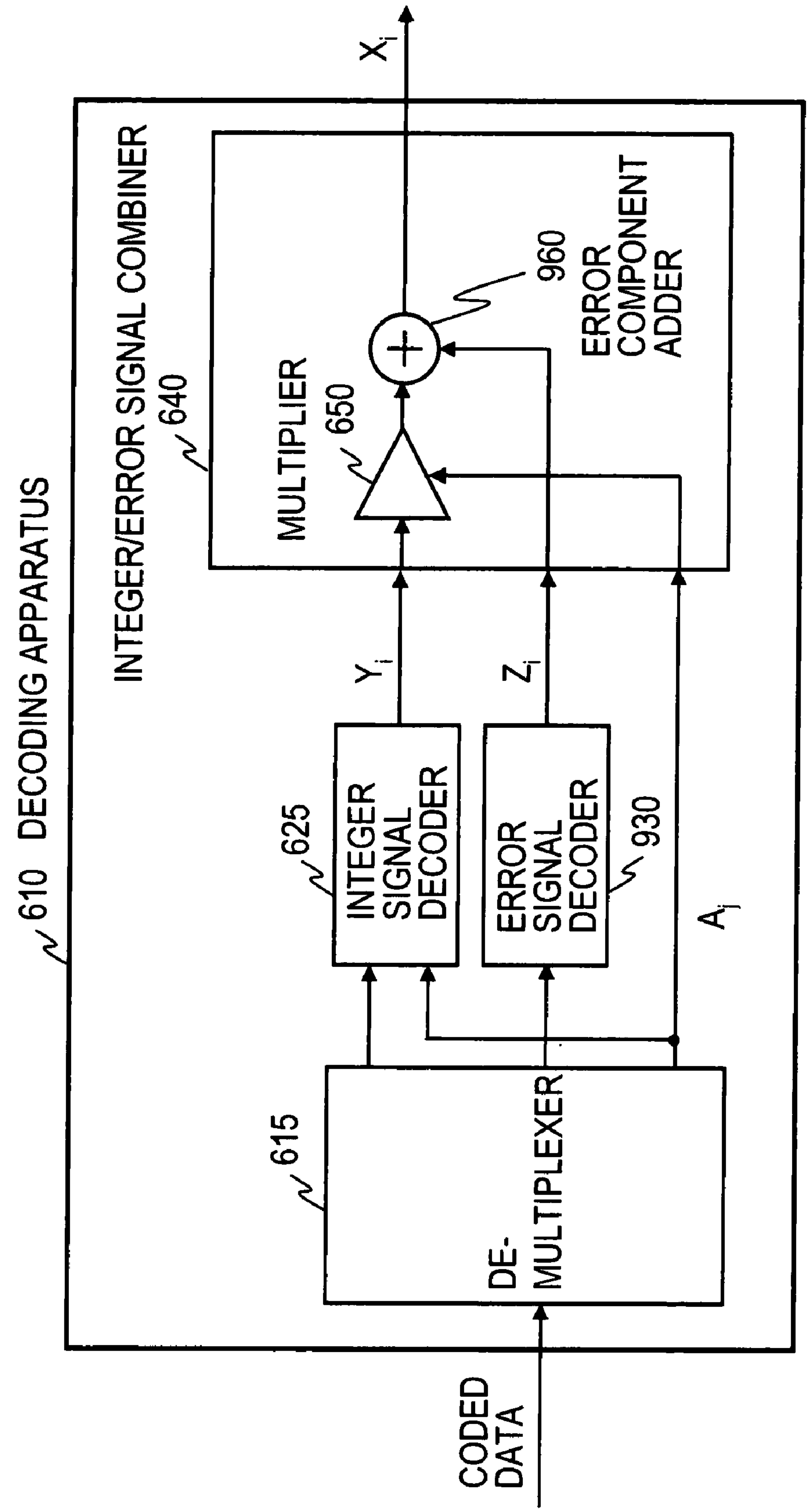
FIG. 21 shows a functional configuration of a decoding apparatus according to the second embodiment.
Figure 22:
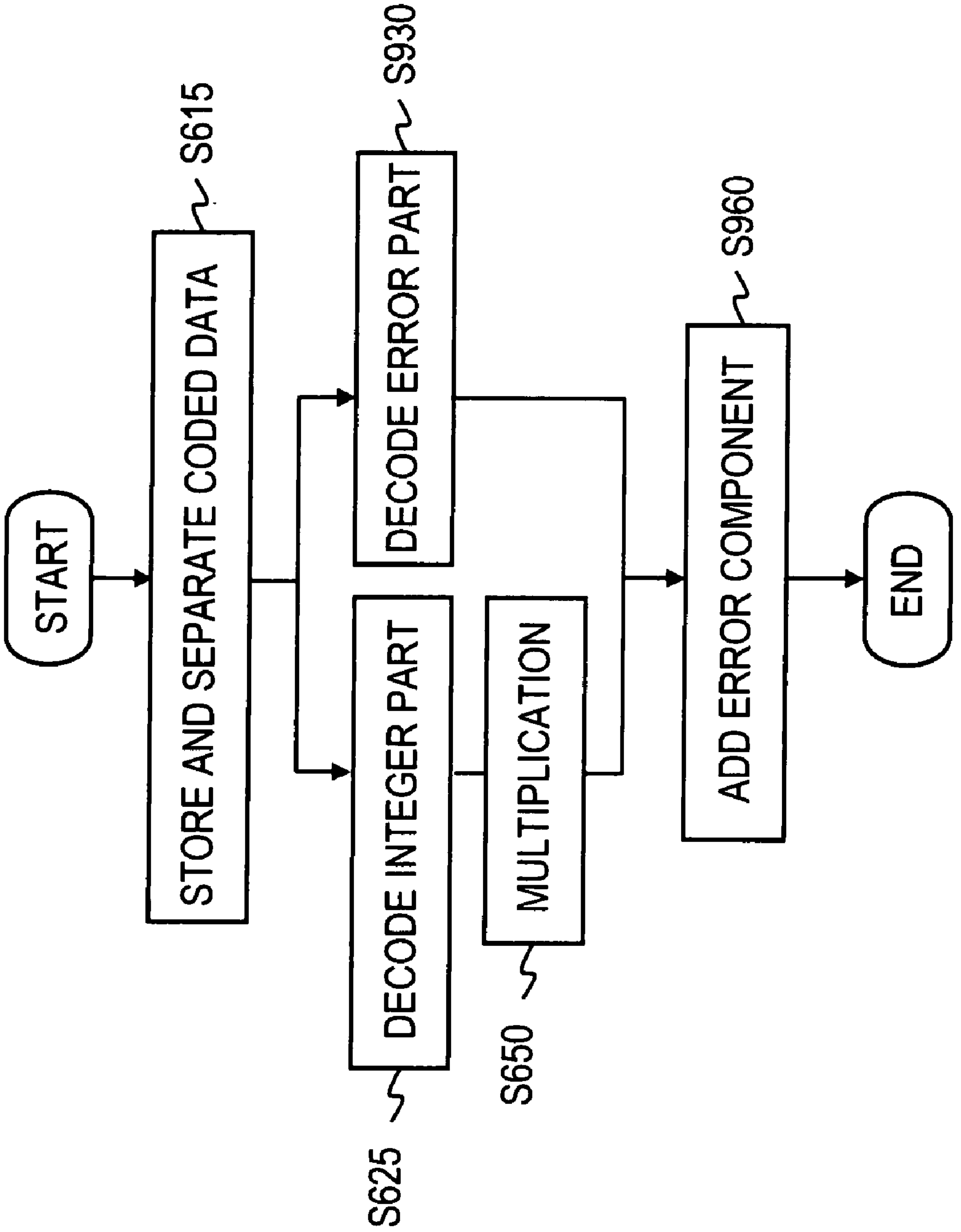
FIG. 22 shows a processing flow in the decoding apparatus 610.

FIG. 21 shows a functional configuration of a decoding apparatus according to the second embodiment. The decoding apparatus 610 differs from the decoding apparatus 600 shown in FIG. 14 in that it includes a demultiplexer 615 that outputs a common multiplier instead of a shift amount, an integer signal decoder 625 that uses the common multiplier to decode an integer signal, and an integer/error signal combiner 640 having a multiplier 650 that performs multiplication instead of reverse shifting. FIG. 22 shows a processing flow in the decoding apparatus 610. The demultiplexer 615 stores coded data and separates it into codes (S615). The integer signal decoder 625 decodes the integer signal (S625). An error signal decoder 930 decodes the error signal $Z_i$ (S930). The multiplier 650 of the integer/error signal combiner 640 multiplies the decoded integer signal $Y_i$ by a common multiplier $A_j$ outputted from the demultiplexer 615 (S650). An error component adder 960 of the integer/error signal combiner 640 combines the integer signal $Y_i$ multiplied by the common multiplier with the error signal $Z_i$ to provide an output $X_i$ (S960).

Figure 23:
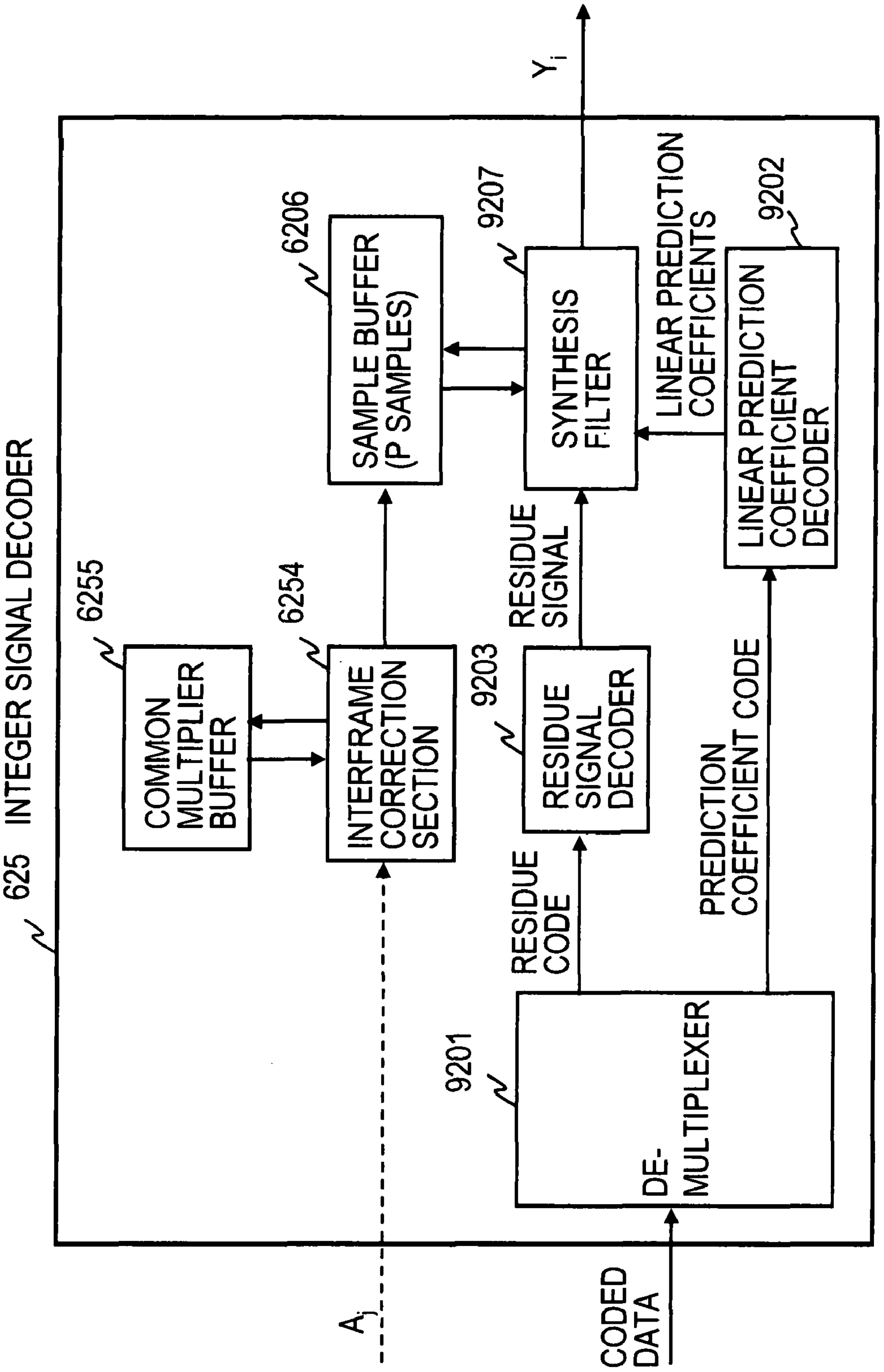
FIG. 23 shows an exemplary functional configuration of an integer signal decoder according to the second embodiment.
Figure 24:
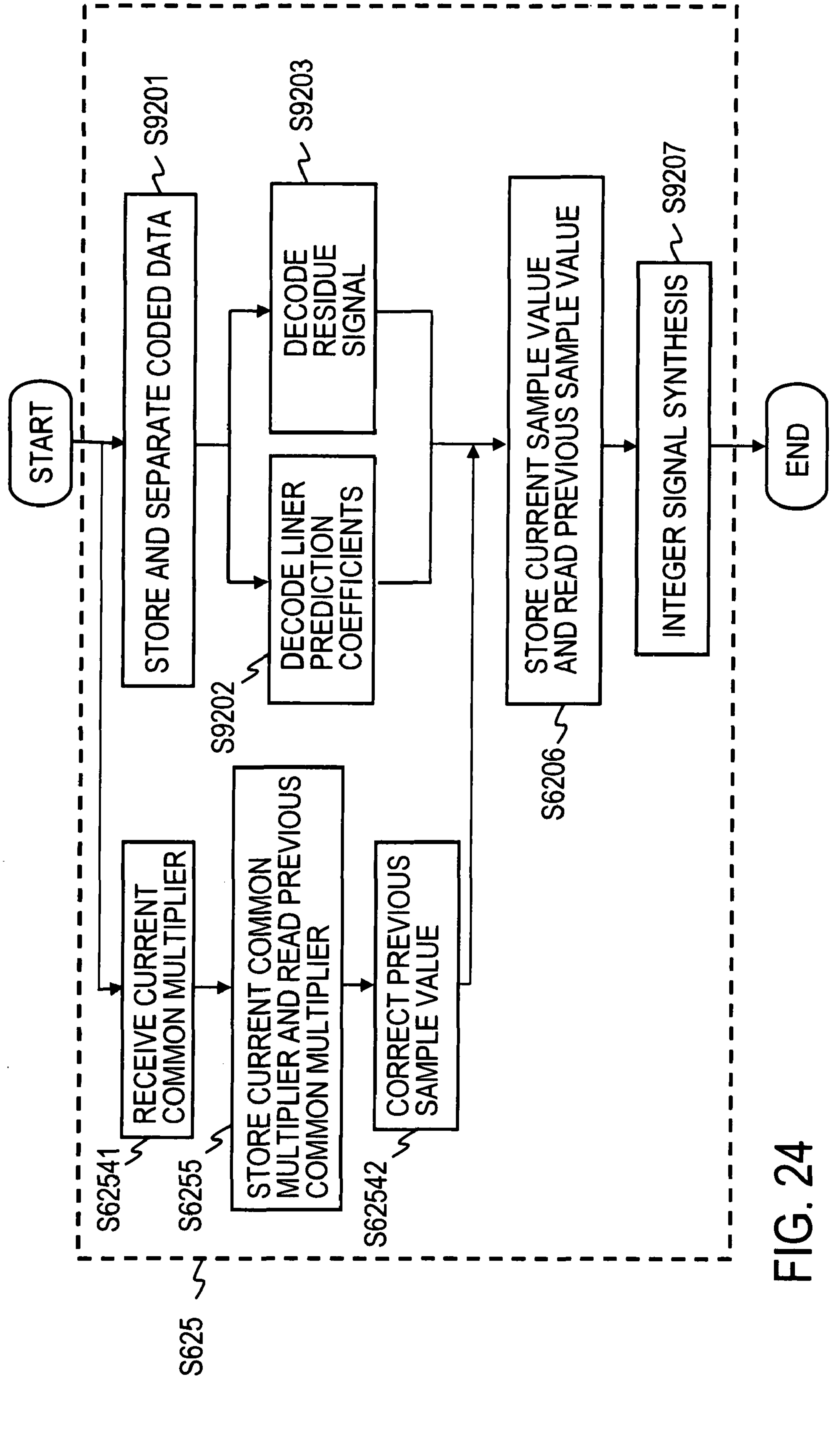
FIG. 24 shows a processing flow in the integer signal decoder 625.

FIG. 23 shows an exemplary functional configuration of the integer signal decoder 625 according to the second embodiment. FIG. 24 shows a processing flow in the integer signal decoder 625 (step S625). The differences between the integer signal decoder 625 and the integer signal decoder 620 shown in FIG. 15 are in an interframe correction section 6254 and a common multiplier buffer 6255. The differences between step S625 and S620 shown in FIG. 16 are in steps S62541, S6255, and S62542. At step S62541, the interframe correction section 6254 receives the common multiplier $A_j$ of the current frame from the demultiplexer 615 (FIG. 21). At step S6255, the interframe correction section 6254 stores the common multiplier $A_j$ of the current frame in the common multiplier buffer 6255 and reads the common multiplier $A_{j-1}$ of the previous frame from the common multiplier buffer 6255. At step S62542, the interframe correction section 6254 calculates the ratio between the common multipliers, $A_{j-1}/A_j$, multiplies (corrects) the last P sample values ($Y_{-1}$, . . . , $Y_{-P}$) of the previous frame held in the sample buffer 6206 by $A_{j-1}/A_j$, and stores the corrected sample values ($Y'_{-1}$, . . . , $Y'_{-P}$). The remaining part of the processing flow is the same as that in FIG. 16.

Because interframe prediction of linear predictive coding is performed by taking into consideration the common multiplier of the previous frame and the common multiplier of the current frame to be coded in this way, the efficiency of the coding can be improved and the amount of codes can be reduced.

Third Embodiment

Figure 25:
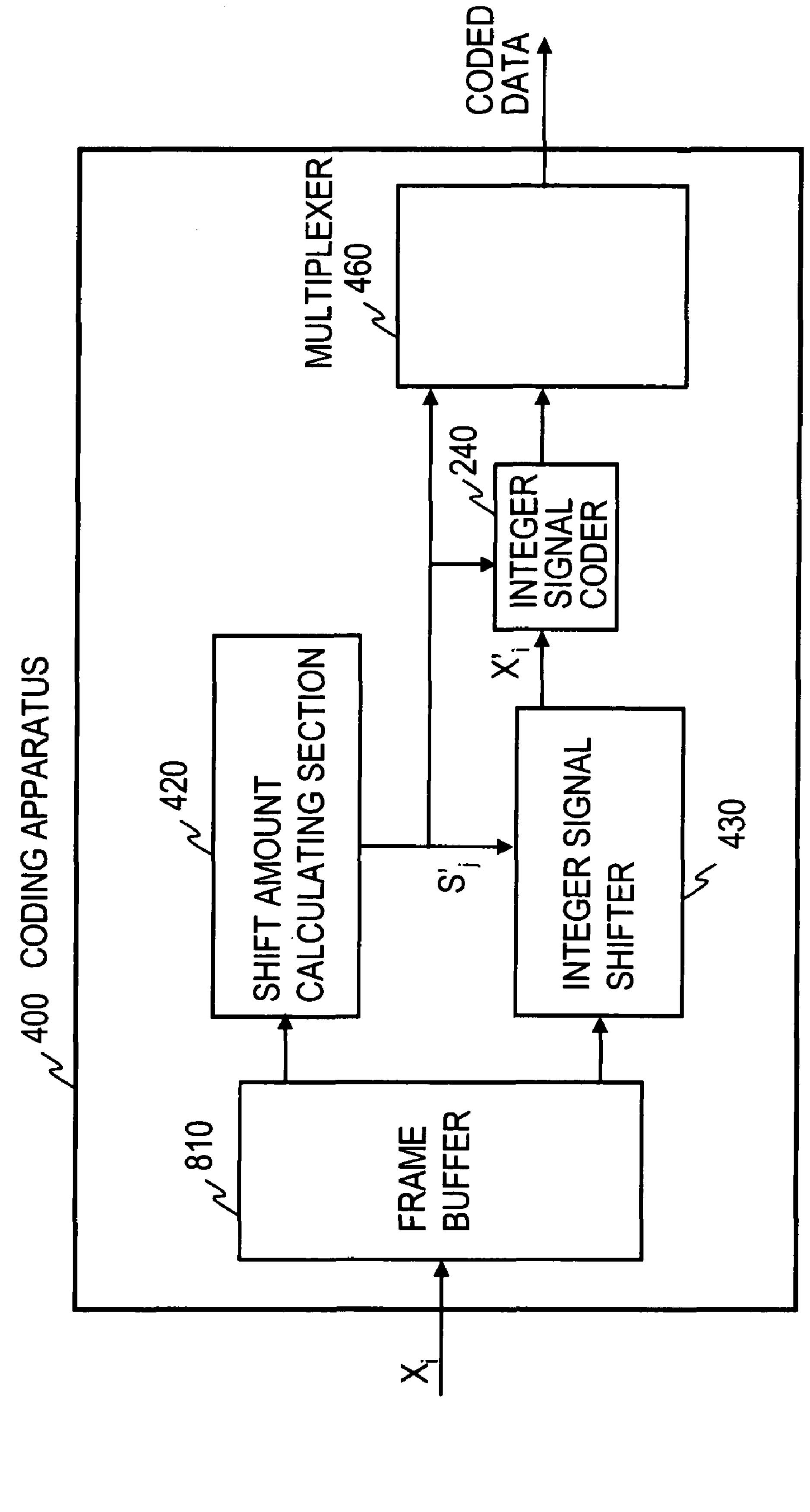
FIG. 25 shows a functional configuration of a coding apparatus according to a third embodiment.
Figure 26:
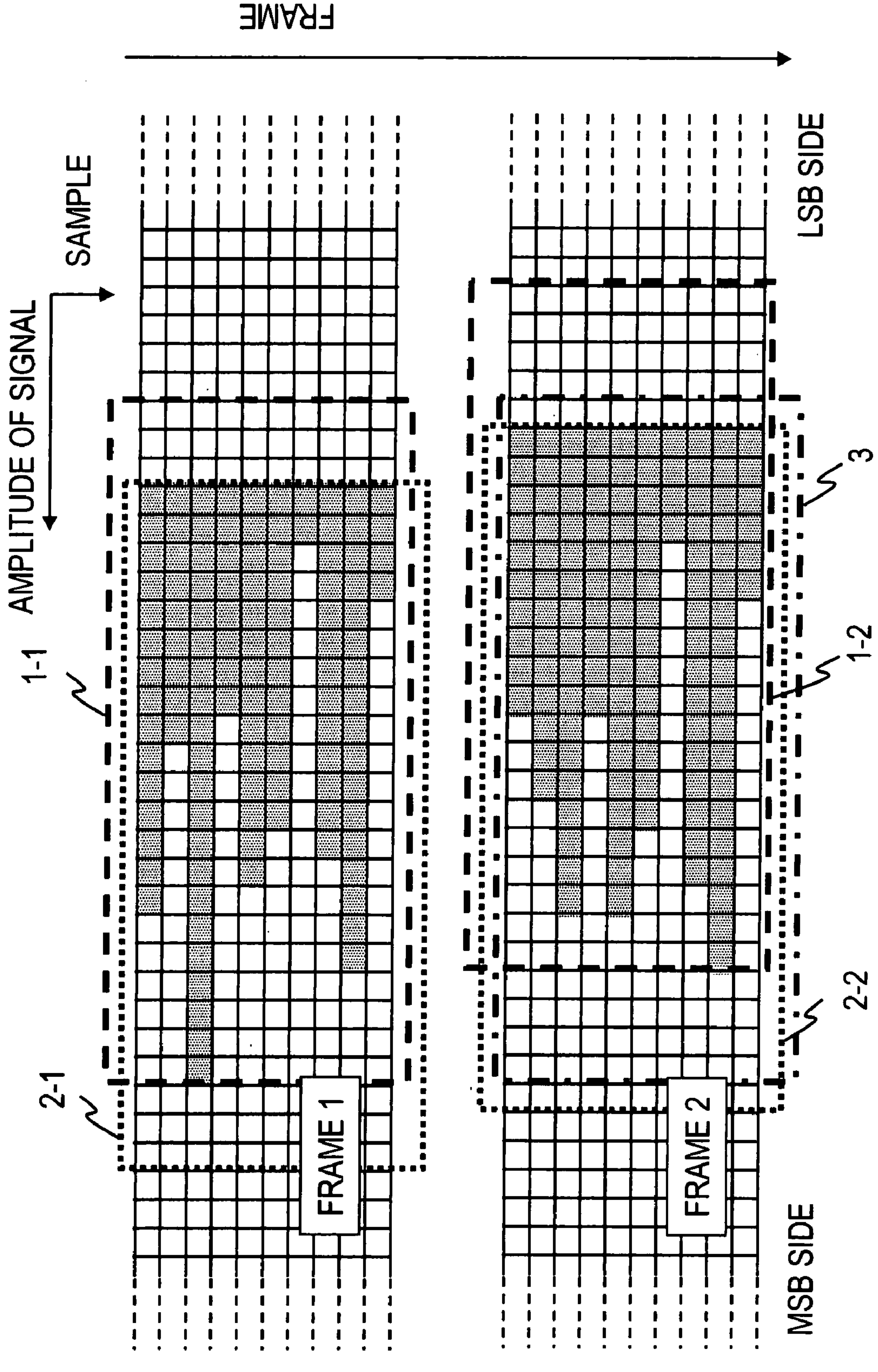
FIG. 26 shows a concept of coding which determines a shift amount according to the third embodiment of the present invention.

FIG. 25 shows an embodiment of a coding apparatus that codes a signal in a format that represents a digital input signal by using an integer part only. In this embodiment, in particular, if one or more contiguous bit positions on the LSB side of all samples in a frame contain "0" as shown in dashed box 1-1 in FIG. 26, all the samples are shifted to the right so that the "0" bit positions are moved toward the LSB and excluded from the frame as shown in dashed box 2-1. In this way, the amplitude of the linear prediction residue signal in an integer signal coder can be reduced compared with the case in which such shifting is not performed and as a result, the efficiency of compression of the residue signal is improved and the amount of the residue code is reduced. Thus, even though information about the number of shifted positions is held as an extra code, the amount of the entire codes is reduced.

Figure 27:
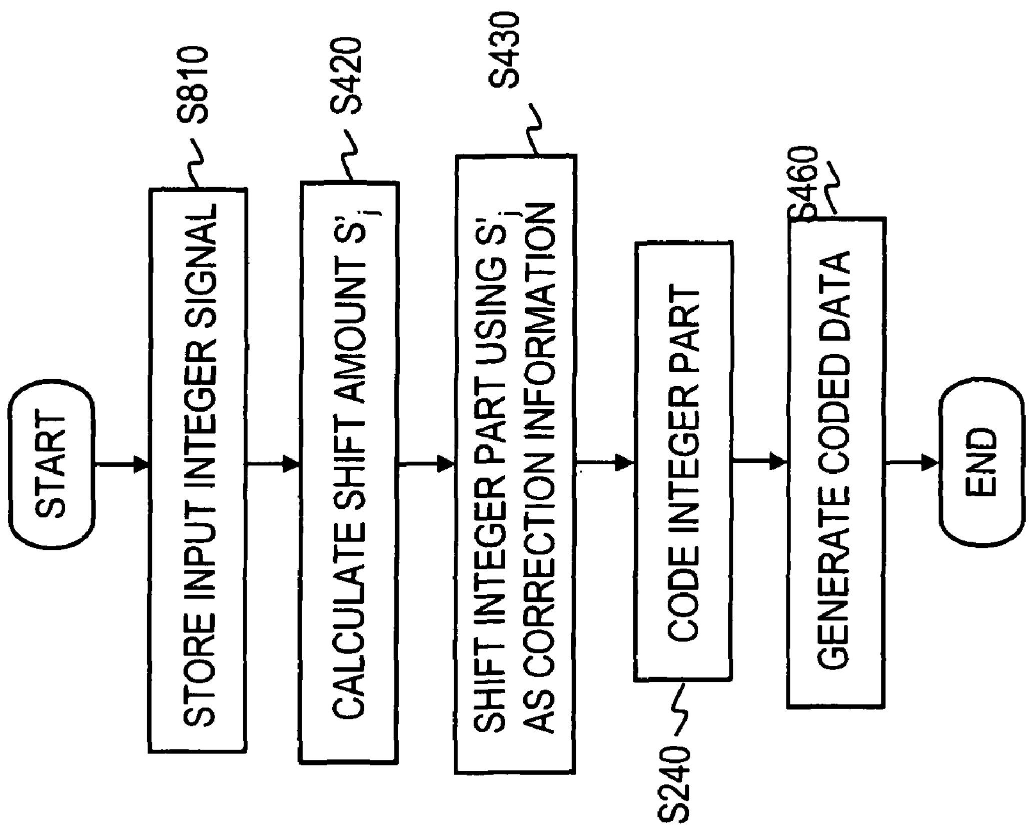
FIG. 27 shows a processing flow in the coding apparatus 400.

The functional configuration of the coding apparatus 400 does not include an error signal coder 850 in FIG. 11 but includes a frame buffer 810, a shift amount calculating section 420, an integer signal shifter 430, an integer signal coder 240, and a multiplexer 460 as shown in FIG. 25. FIG. 27 shows a processing flow in the coding apparatus 400. An input integer signal $X_i$ (i=1 . . . , $N_F$) of one frame is stored in the frame buffer 810 (S810), and a shift amount calculating section 420 obtains as the shift amount $S'_j$ the number of contiguous bit positions of all of the integer signal samples $X_i$ read out from the frame buffer 810 that contain "0 " on the LSB side (S420).

Figure 28:
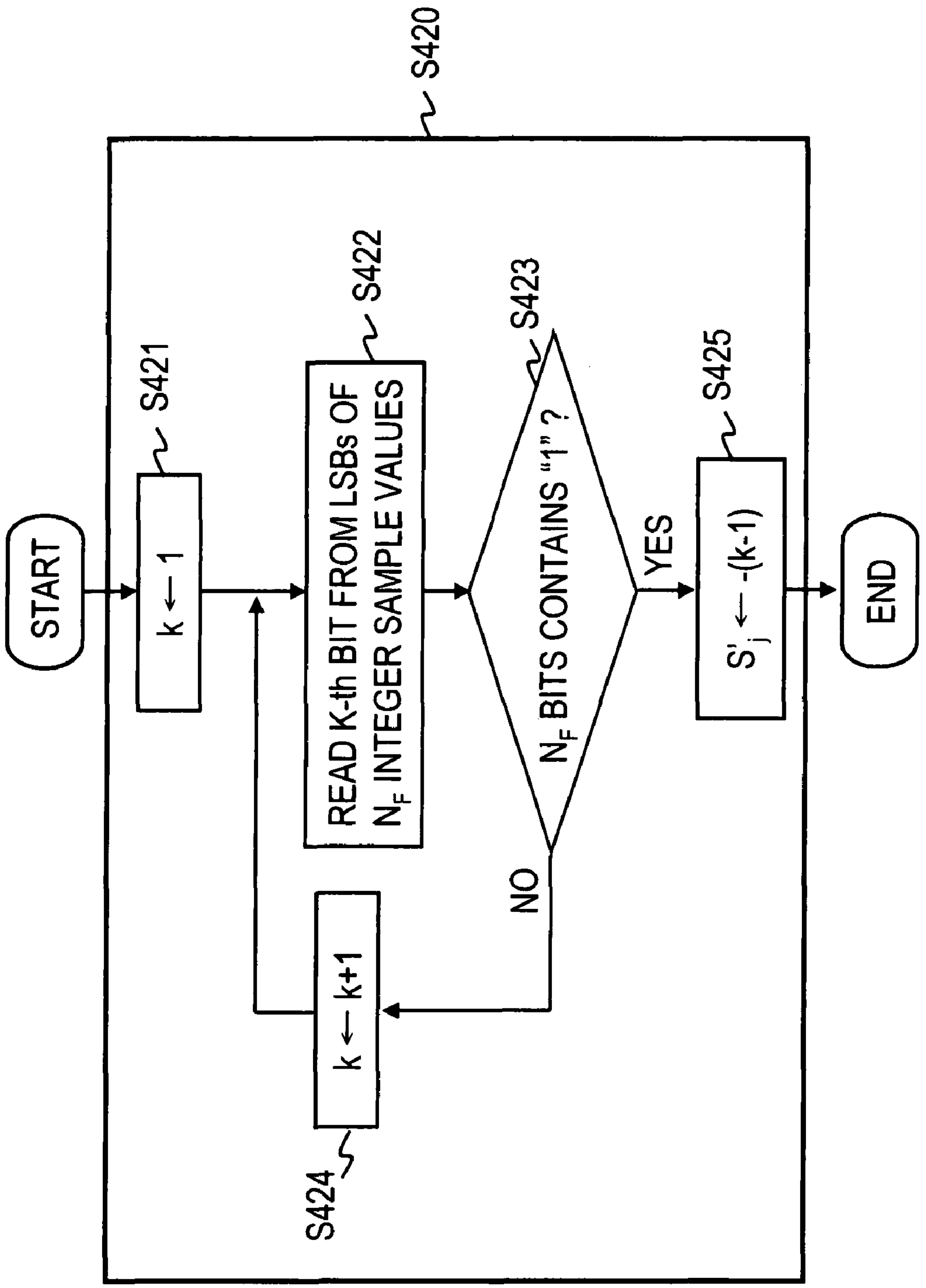
FIG. 28 shows a processing flow in a shift amount calculating section 420.

FIG. 28 shows a detailed processing flow at step S420. A parameter k for counting the number of bit positions is initialized to 1 (S421). The bits in the k-th position from the LSB of $N_F$ integer signal samples $X_i$ in the frame buffer 810 are read out (S422). The read out $N_F$ bits are checked to see if they contain a "1" (S423). If any of the read out $N_F$ bits does not contain a "1", k is incremented by 1 (S424) and the process returns to step S422, then steps S422 and S423 are repeated. If the read $N_F$ bits contain a "1", −(k−1) is obtained as a shift amount $S'_j$ (S425). Because $S'_j$ is negative, the integer signal samples $X_i$ are shifted toward the LSB.

The integer signal shifter 430 shifts all integer signal samples $X_i$ by $S'_j$ bits toward the LSB and provides the shifted integer signal samples $X'_i$ to the integer signal coder 240 (S430). The configuration and processing of the integer signal coder 240 are similar to those of the integer signal coder 240 shown in FIGS. 12 and 13 and therefore the integer signal coder 240 will be described with reference to FIGS. 12 and 13. However, the signal Y and shift amount $S_j$ in FIGS. 12 and 13 will be replaced with X' and $S'_j$, respectively. The shifted integer signal samples $X'_i$ are provided to a linear prediction analyzing section 8402 and also to an inverse filter 8407 through a segmentation section 8401. The linear prediction analyzing section 8402 performs linear prediction analysis of the provided integer signal $X'_i$ to obtain linear prediction coefficients ($a_1$, . . . , $a_P$) (S8402) and a linear prediction coefficient coder 8403 codes the linear prediction coefficients (S8403). The linear prediction coefficient decoder 8404 decodes the code of the linear prediction coefficients to obtain quantized linear prediction coefficients ($a_1$^, . . . , $a_p$^). As described earlier, the linear prediction coefficient decoder 8404 may be omitted and linear prediction coefficients quantized through coding of the linear prediction coefficients in the linear prediction coefficient coder 8403 may be used.

On the other hand, the shift amount $S'_j$ is provided to the interframe correction section 2405 (S24051) and stored in a shift amount buffer 2406. The shift amount $S'_{j-1}$ of the previous frame stored in the shift amount buffer 2406 is read out and the difference $S'_j-S'_{j-1}$ is obtained as a correction amount (S2406). The last P samples of the previous frame held in a sample buffer 2408 are bit-shifted by the correction amount $S'_j-S'_{j-1}$ so that the shift amount becomes equal to the shift amount $S'_j$ of the samples of the current frame (S24052).

An inverse filter 8407 calculates a residue signal $r_i$ of the current sample point i according to Equation (3) by using the decoded residue signal $r_i$, quantized linear prediction coefficients ($a_1$^, . . . , $a_p$^), corrected integer signal samples of the previous frame, and integer signal samples before the current sample point i that are held in the sample buffer 2408 (S2408 and S8407). Here, Y in Equation (3) is replaced with X'. The obtained residue signal r1 is coded by a residue signal coder 8409 (S8409), is combined with the linear prediction coefficient code by a multiplexer 8410 (S8410) and outputted as coded data.

Figure 29:
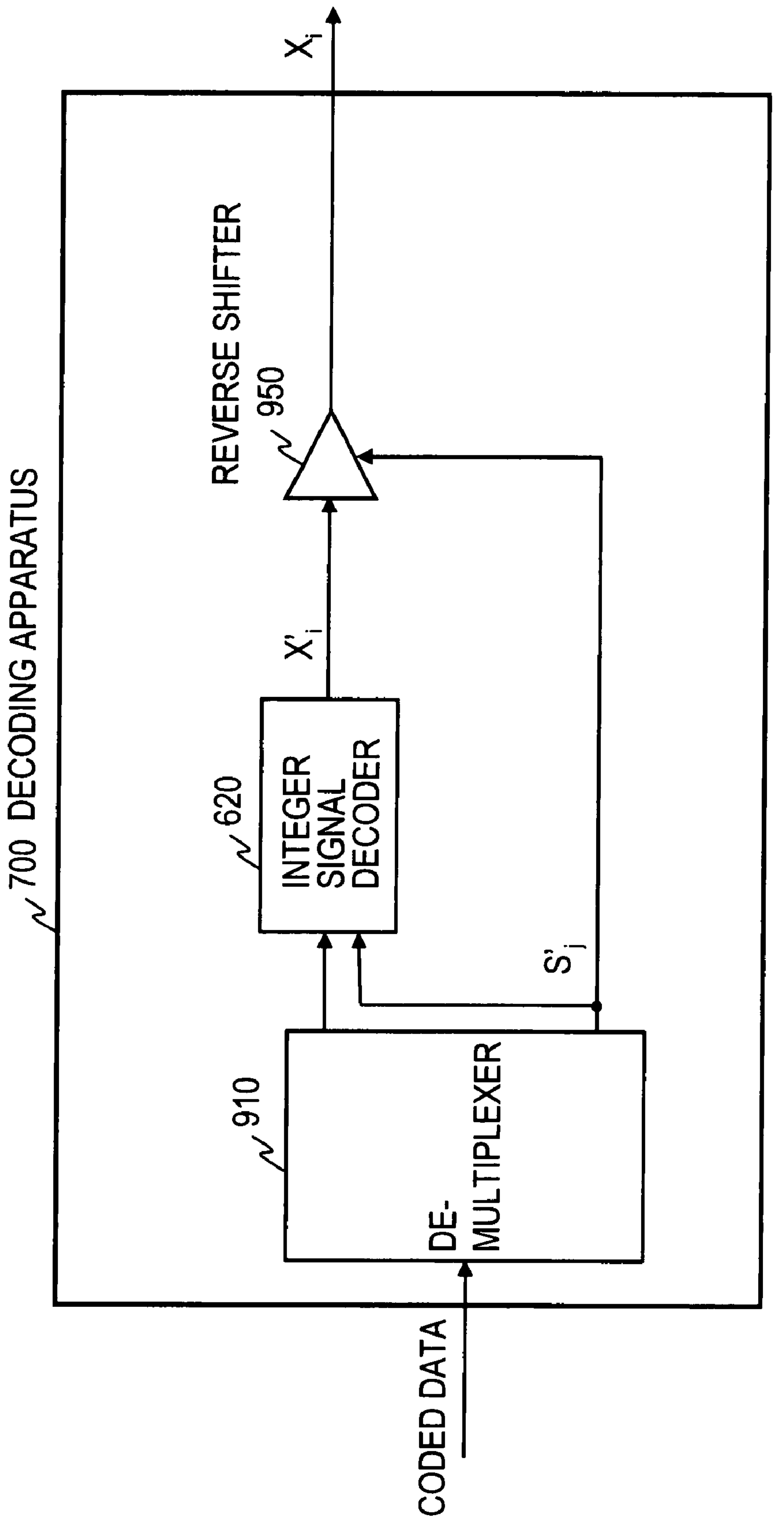
FIG. 29 shows an exemplary functional configuration of a decoding apparatus according to the third embodiment.
Figure 30:
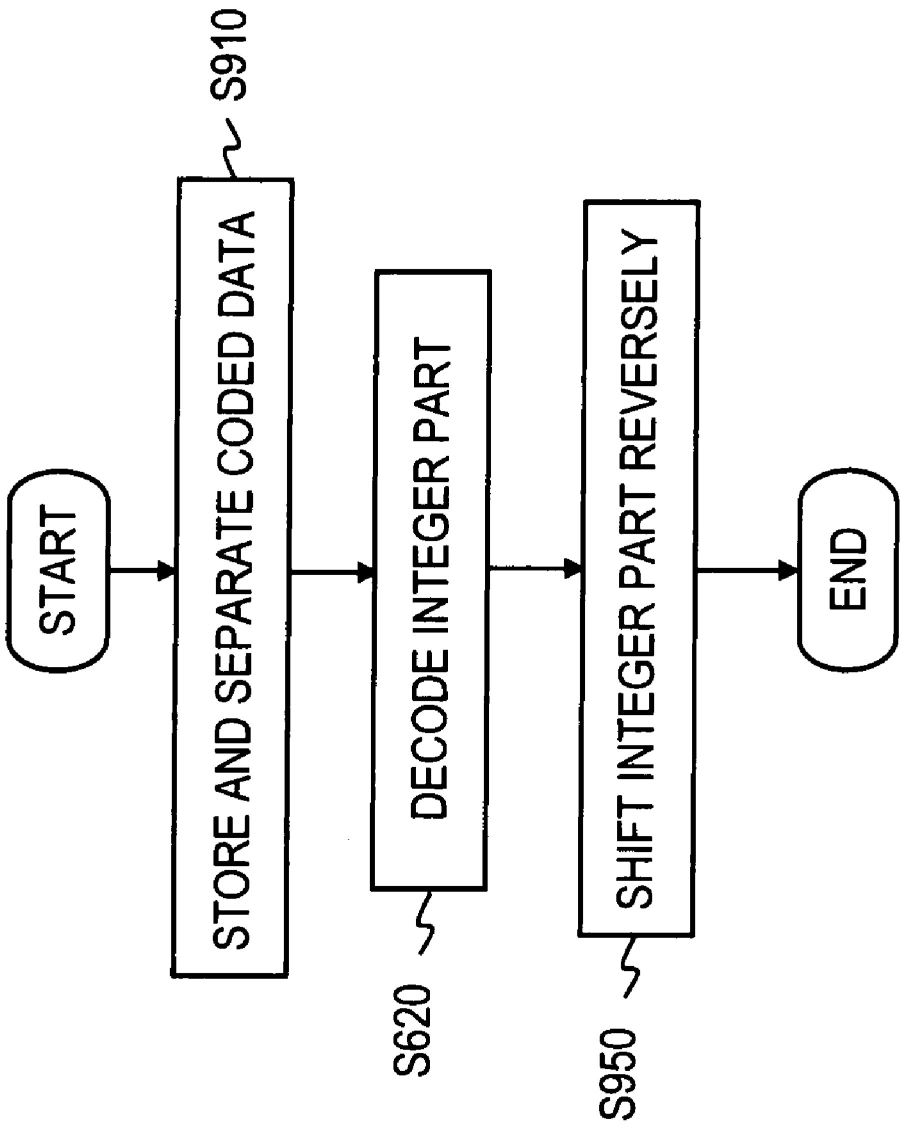
FIG. 30 shows a processing flow in the decoding apparatus 700.

FIG. 29 shows an exemplary functional configuration of a decoding apparatus 700 corresponding to the coding apparatus 400 in FIG. 25. The decoding apparatus 700 differs from the decoding apparatus 600 shown in FIG. 14 in that it does not have an error signal decoder 930 and an error component adder 960. FIG. 30 shows a processing flow in the decoding apparatus 700. A demultiplexer 910 stores coded data and separates it into integer signal codes (linear prediction coefficient code and residue code) and information about a shift amount $S'_j$ (S910). An integer signal decoder 620 decodes the integer signal codes (S620). A reverse shifter 950 performs reverse shift (shift opposite in direction to shift performed during coding) of the decoded integer signal by using the shift amount $S'_j$ outputted from the demultiplexer (S950).

The configuration and processing (step S620) of the integer signal decoder 620 are the same as that of the integer signal decoder 620 in FIG. 15 and the processing flow in FIG. 16, except that the integer signal is $X'_i$ and the shift amount is $S'_j$. The integer signal decoder 620 will be briefly described with reference to FIGS. 15 and 16. The integer signal code is separated into linear prediction coefficient code and residue code in the demultiplexer 9201 (S9201), decoded in a linear prediction coefficient decoder 9102 and a residue signal decoder 9203 into linear prediction coefficients ($a'_1$, . . . , $a'_P$) and a residue signal $r_i$ (i=1, . . . , $N_F$) (S9202 and S9203), and provided to a synthesis filter 9207.

On the other hand, the shift amount $S'_j$ is provided to an interframe correction section 6204 (S62041). The interframe correction section 6204 calculates as a correction amount the difference, $S'_j-S'_{j-1}$, between the shift amount $S'_j$ of the current frame and the shift amount $S'_{j-1}$ of the previous frame stored in a shift amount buffer 6205 (S6205) and shifts the last P decoded signal samples ($X'_{-1}$, . . . , $X'_{-P}$) of the previous frame held in a sample buffer 6206 by the correction amount so that the shift amount becomes equal to the shift amount $S'_j$ of the integer signal samples of the current frame (S62042). The synthesis filter 9207 calculates the integer signal $X'_i$ at the current sample point i according to Equation (4) by using the decoded residue signal $r_i$ and linear prediction coefficients ($a'_1$, . . . , $a'_P$), corrected integer signal samples of the previous frame, that are held in the sample buffer 6206, and decoded integer signal samples sampled prior to the current sample point i (S6206 and S9207). Here, Y in Equation (4) is replaced with X'.

FIG. 25 has been explained as showing the embodiment of the coding apparatus in which an input signal is an integer signal. So long as the apparatus encodes an integer signal, the apparatus may of course be used as the integer signal coder 240 in the coding apparatus 200 in FIG. 11 to encode an integer signal $Y_i$. In that case, sample values $X_i$ are shifted by the integer signal/error signal separator 830 in the coding apparatus 200 by a shift amount $S_j$ (shifts $Q-1-S_j$ bits) and the resulting integer signal $Y_i$ is further bit-shifted by the integer signal coder 240 by the number of bit positions $S'_j$. Coded data outputted from the integer signal coder 240 includes information representing the shift amount $S'_j$ as a code indicating the shift amount S'j.

Similarly, the decoding apparatus 700 shown in FIG. 29 may be used as the integer signal decoder 620 in the decoding apparatus 600 shown in FIG. 14 that decodes an integer signal $Y_i$. In that case, the decoded integer signal is shifted by $S'_j$ bits reversely to restore the integer signal $Y_i$ in the integer signal decoder 620. Then, $Y_i$ is shifted by $S'_j$ bits reversely in the reverse shifter 950 and an error signal $Z_i$ is added to the resulting signal in the error component adder 960 to restore the original digital signal $X_i$. Similarly, the coding apparatus shown in FIG. 25 may be used as the integer coder 340 in the coding apparatus 300 in FIG. 17 and the decoding apparatus shown in FIG. 29 may be used as the integer signal decoder 625 in the coding apparatus in FIG. 21.

Fourth Embodiment

In a fourth embodiment, the method described with respect to the first embodiment is combined with a method in which an shift amount calculating section calculates a possible shift amount such that the amplitude of the sample value having the largest amplitude in a frame will be equal to the maximum amplitude that can be represented by an integer part and corrects the possible shift amount in accordance with a predetermined criterion by using the frequency of 0s or 1s appearing in the bit positions in a predetermined low-order range of an integer part predetermined according to the possible shift amount to determine the shift amount of the frame.

Figure 31:
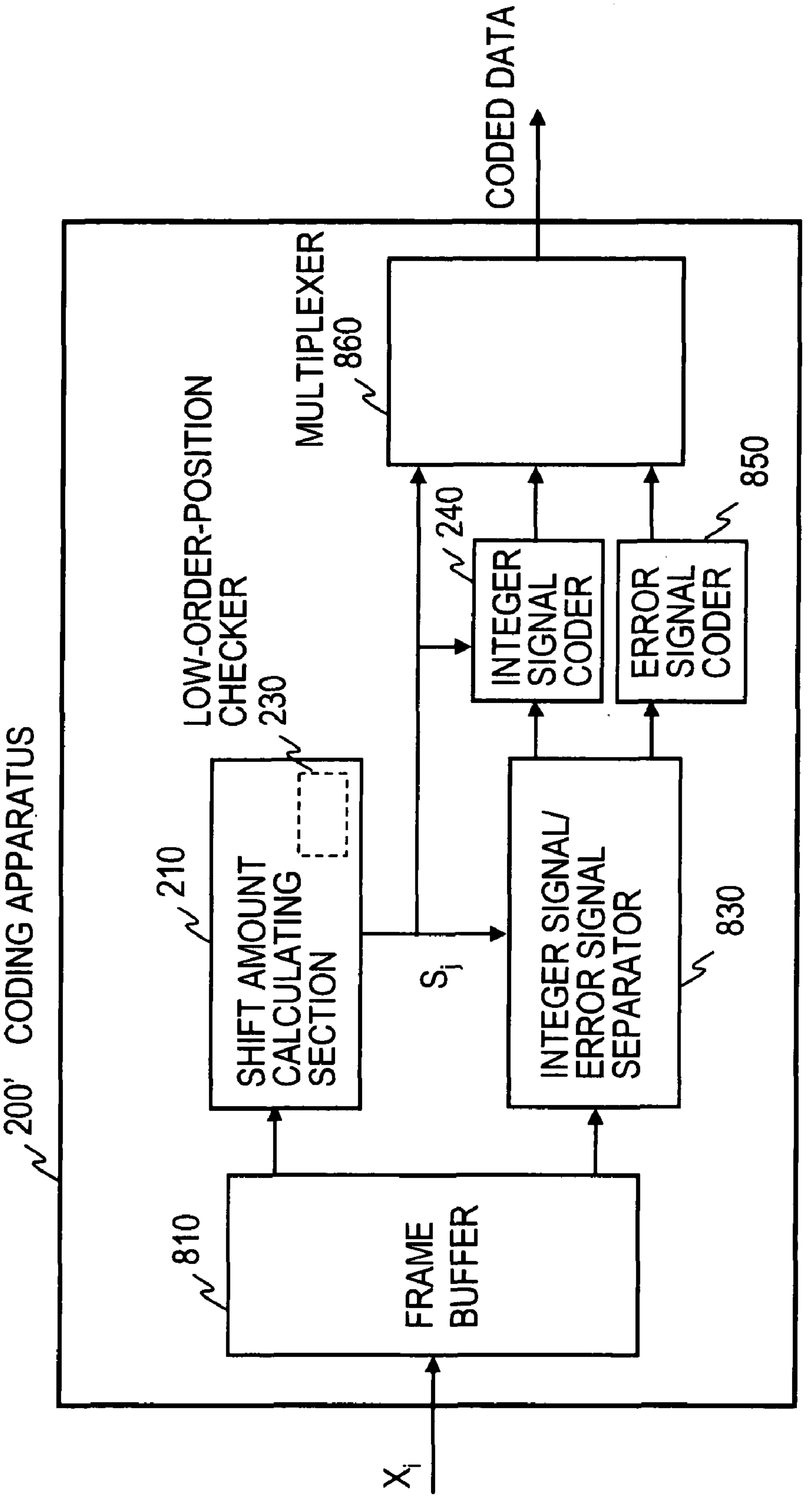
FIG. 31 shows an exemplary functional configuration of a coding apparatus according to a fourth embodiment.

An exemplary functional configuration of a coding apparatus according to the fourth embodiment is shown in FIG. 31. The coding apparatus 200' includes a frame buffer 810, a shift amount calculating section 210 having a low-order-position checker 230, an integer signal/error signal separator 830, an integer signal coder 240, an error signal coder 850, and a multiplexer 860. The coding apparatus differs from the coding apparatus 200 according to the first embodiment of FIG. 11 in the shift amount calculating section 210 which has the low-order-position checker 230.

Figure 3:
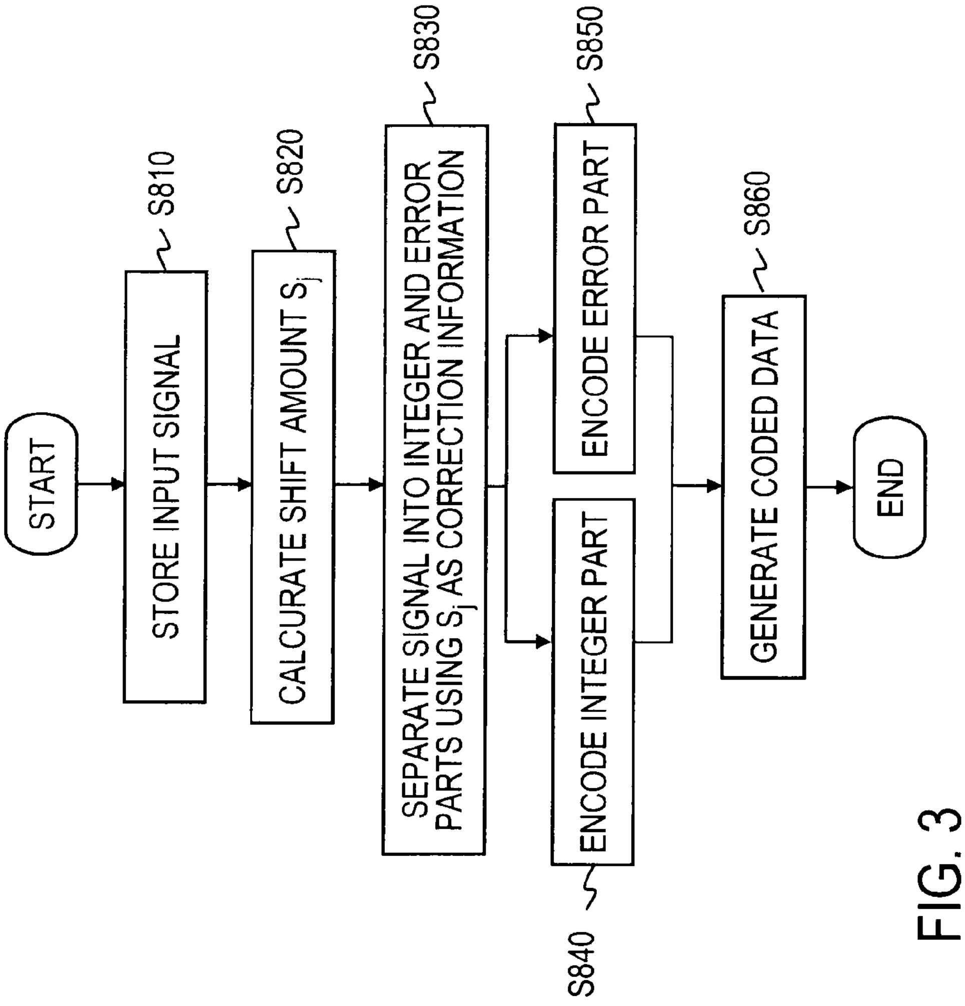
FIG. 3 BACKGROUND ART
FIG. 3 shows a processing flow in the coding apparatus in FIG. 1.
Figure 5:
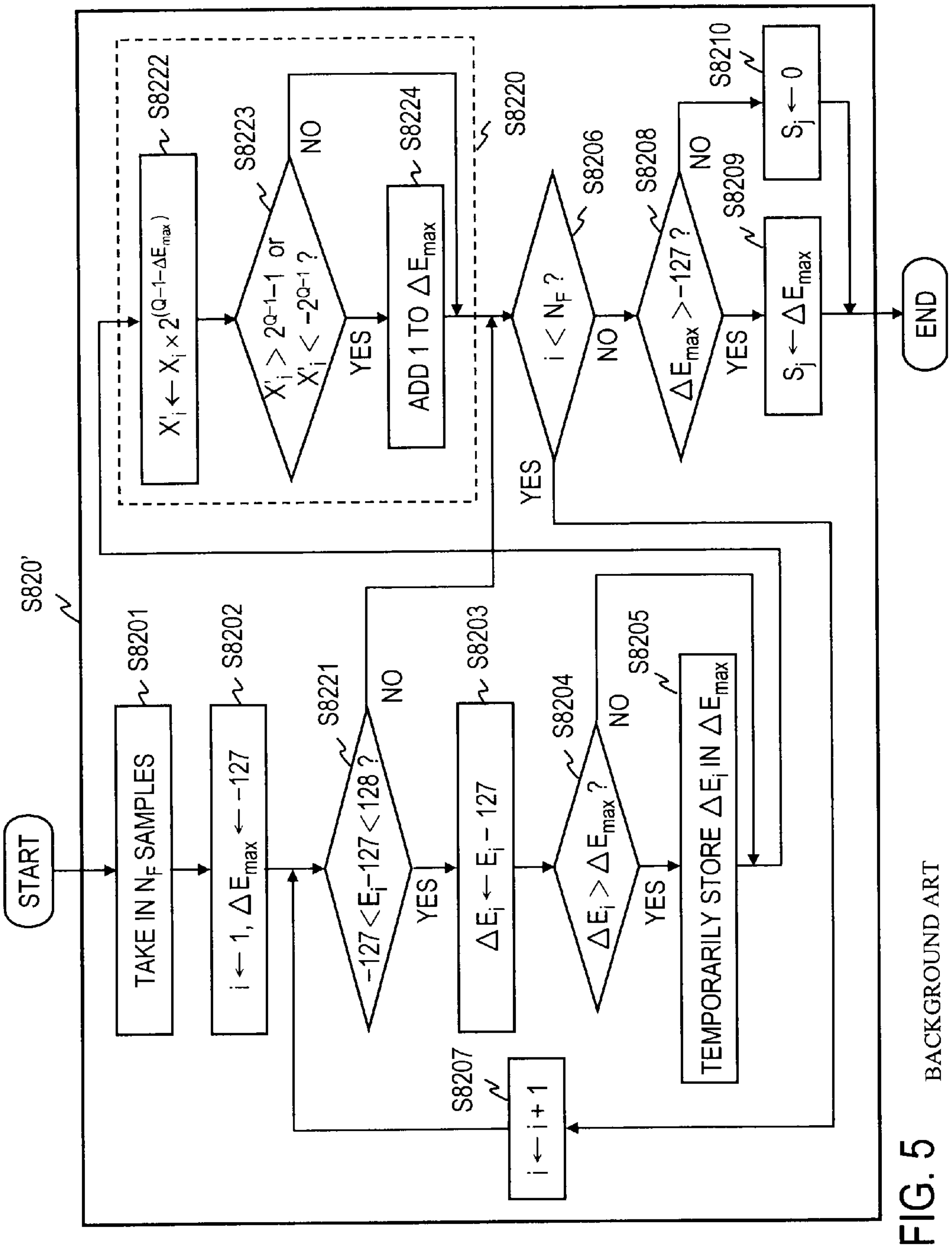
FIG. 5 BACKGROUND ART
FIG. 5 shows a variation of the processing flow in the shift amount calculating section.
Figure 6:
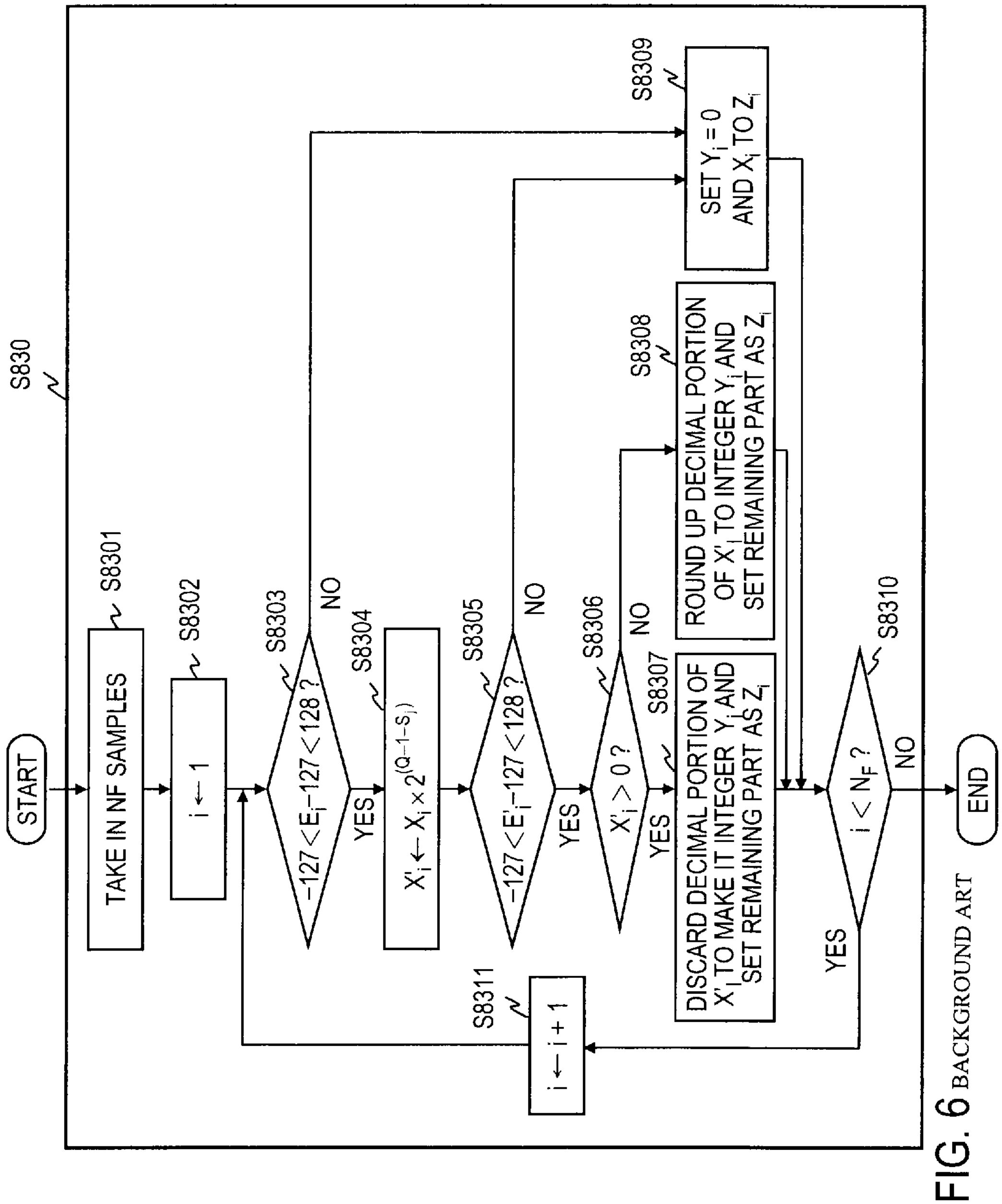
FIG. 6 BACKGROUND ART
FIG. 6 shows a procedure for separating an input signal $X_i$ into an integer signal $Y_i$ and an error signal $Z_i$ using a shift amount $S_j$.
Figure 32:
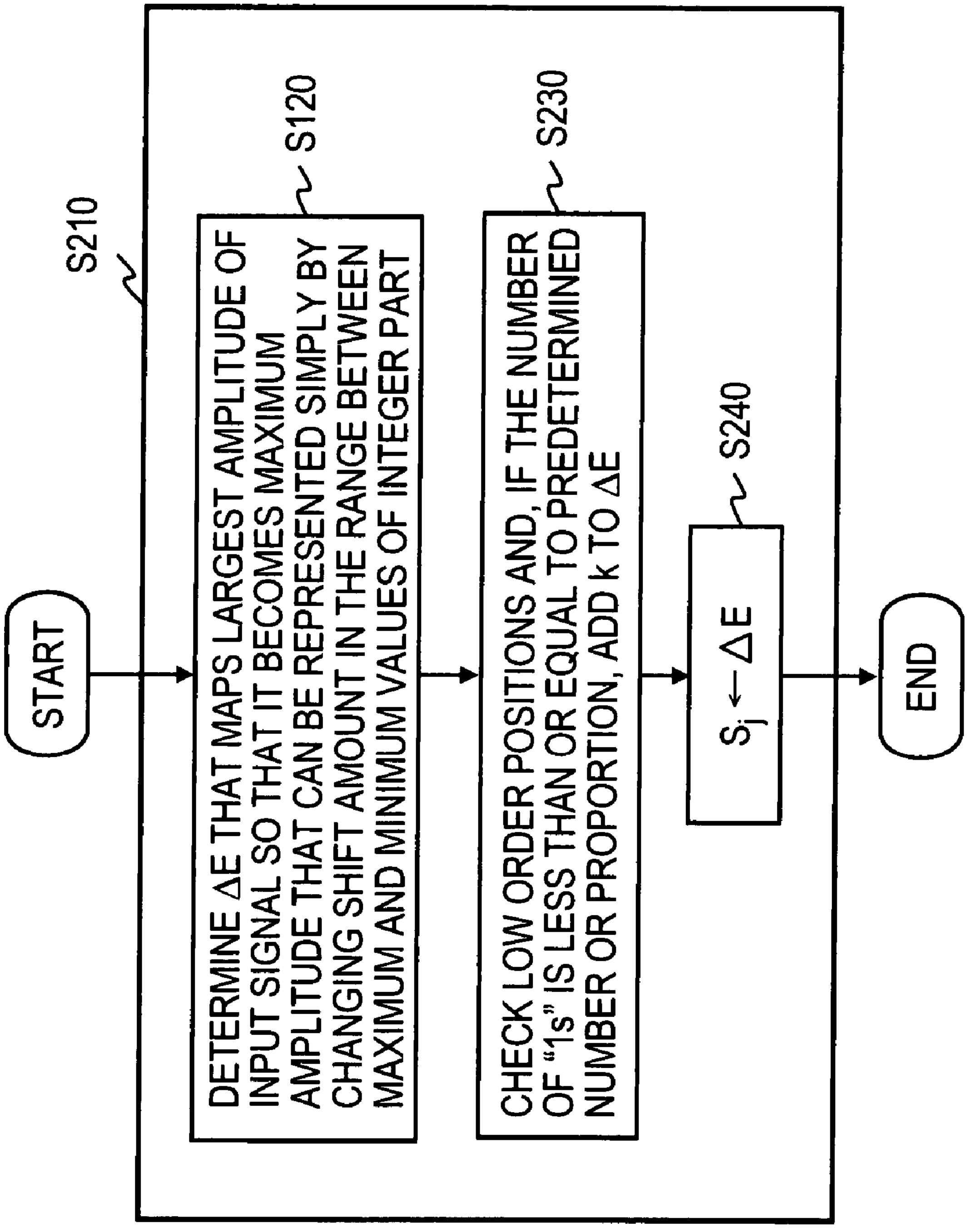
FIG. 32 shows a processing flow in a shift amount calculating section 210.

The processing flow in the coding apparatus 200' is the same as the processing flow of FIG. 3 combined with the processing flow in FIG. 32, except that step S820 in the flow of FIG. 3 is replaced with step S210 in FIG. 32 and step S840 is replaced with step S240 of FIG. 13. FIG. 32 shows a processing flow in the shift amount calculating section 210 (step S210). At step S210, in the shift amount calculating section 210, the largest amplitude of the samples in a frame is mapped to the maximum amplitude that can be represented by the number of bits of an integer part for quantization to obtain a possible shift amount ΔE (S120). The processing at step S120 is substantially the same as step S820 (FIG. 4) or step S820' (FIG. 5). The only difference is that, whereas the value resulting from step S820 (S820') is treated as the final value of the shift amount, the value resulting from step S1120 is only treated as a possible shift amount.

The low-order-position checker 230 of the shift amount calculating section 210 updates ΔE by adding the number of contiguous bit positions k in which the ratio or number of 1s less than or equal to a predetermined value to a possible shift amount ΔE, starting from the lowest-order bit, inclusive, of an integer part determined in accordance with the possible shift amount ΔE (S230). Here, the predetermined ratio or number may be 0 (that is, all bits are 0). The shift amount calculating section 210 chooses the updated possible shift amount ΔE as the shift amount $S_j$ (S240).

Figure 33:
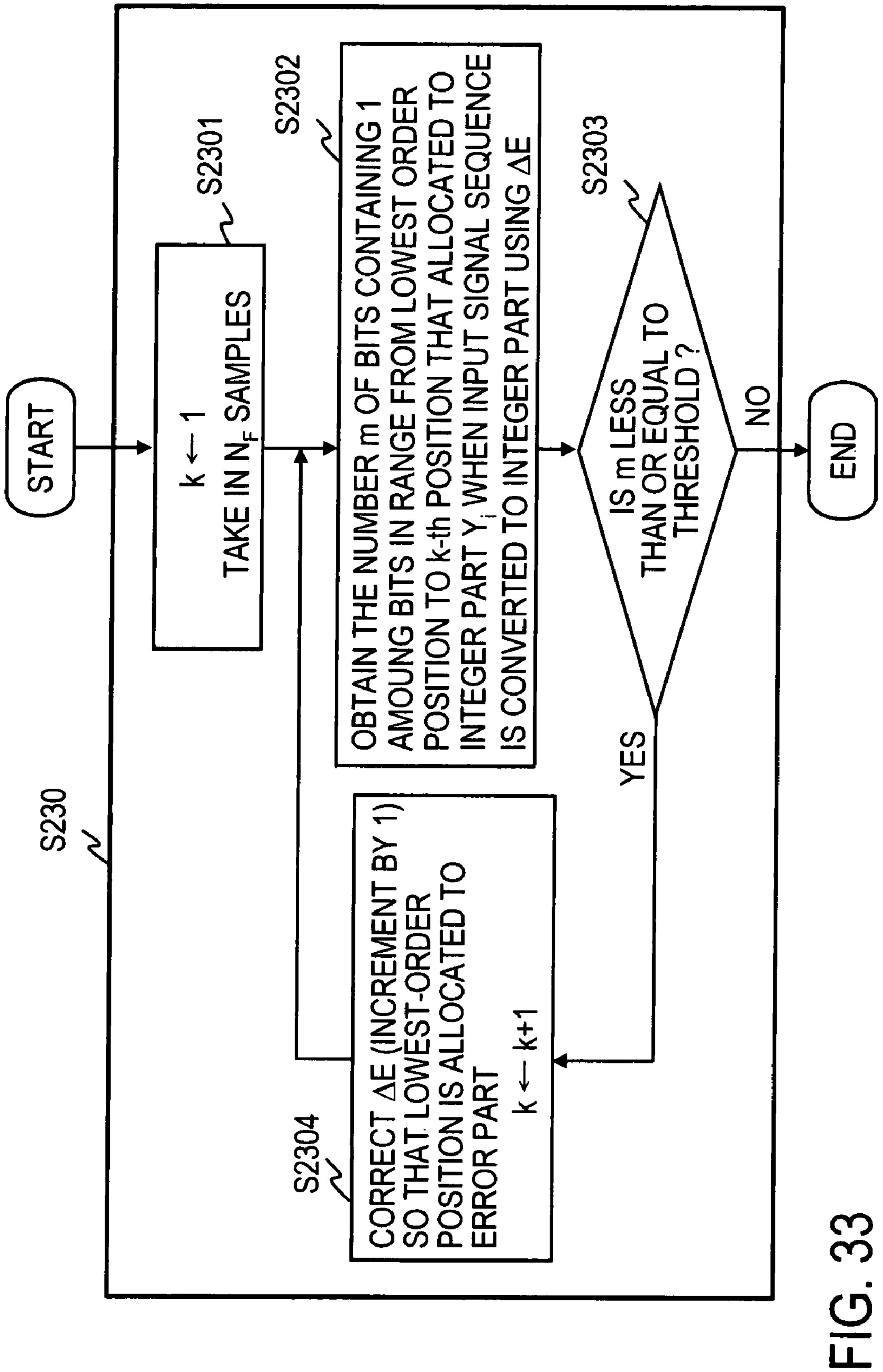
FIG. 33 shows a detailed processing flow (step S230) in a low-order-position checking section 230 of the shift amount calculating section 210.

FIG. 33 shows a detailed processing flow (step S230) in the low-order-position checker 230 of the shift amount calculating section 210. The low-order-position checker 230 initializes a position-number parameter k to 1 and then takes in the $N_F$ sample values constituting a frame (S2301). The low-order-position checker 230 obtains the number m of 1s in all bits in the k-th position from the lowest-order position, inclusive, of an integer part separated from an error part using a possible shift amount ΔE (S2302). Decision is made as to whether the number m of 1s is less than or equal to a predetermined threshold (or whether the ratio of 1 s is less than or equal to a predetermined threshold) (S2303). If step S2303 is true, 1 is added to the possible shift amount ΔE, 1 is added to k (S2304) and then the process returns to step S2302. If step 2303 is not true, step S230 will end.

After completion of step S230, the process proceeds to step S240 as shown in FIG. 32, where the possible shift amount ΔE is chosen as the shift amount $S_j$. In this way, if a range (called a bit plane) from the lowest-order position of an integer part predetermined according to the possible shift amount obtained at step S120 is detected in which k contiguous positions (where k is an integer greater than or equal to 1) contain 1s in a ratio less than or equal to a predetermined value (or contain 1 s less than or equal to a predetermined number), the shift amount $S_j$ can be corrected to the possible shift amount obtained at step S120 plus k. If the threshold is set to 0, the possible shift amount ΔE is increased by k when all bits in a bit plane of k positions are 0.

By making a correction to determine the shift amount $S_j$ in this way so that a bit plane that contains a small number of 1s in low-order-positions is included in an error part by shifting, the amount of codes can be reduced and the compression ratio can be improved accordingly.

While decision is made as to whether the ratio (or number) of 1s is less than or equal to a threshold in this embodiment, determination may be made as to whether the ratio (or number) of 0s is more than or equal to a threshold.

Thus, the method for improving the efficiency of intraframe coding (in which the shift amount is corrected on the basis of the frequency of 0s or 1s appearing in low-order-positions of an integer part with respect to a predetermined criterion) can be used in combination with the method for improving the efficiency of coding using interframe prediction (the first embodiment). That is, the method for improving the efficiency of intraframe coding can be combined with the method for improving the efficiency of coding using interframe prediction.

[First Variation]

Figure 34:
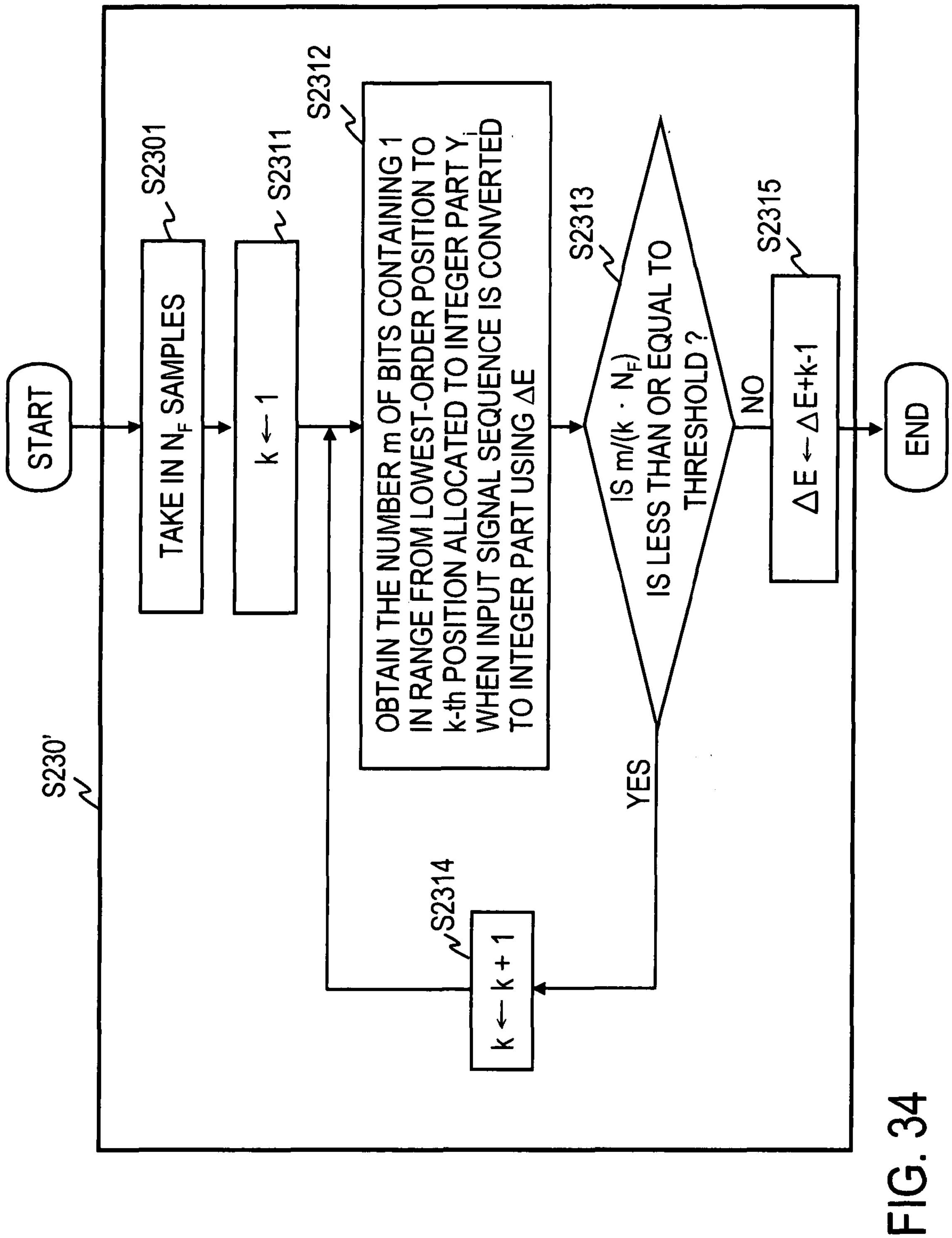
FIG. 34 shows a detailed processing flow (step S230') in the low-order-position checking section 230 of the shift amount calculating section 210.

FIG. 34 shows a first variation of processing by the low-order-position checker 230 in the fourth embodiment shown in FIG. 31. In the fourth embodiment described above, the low-order-position checker 230 of the shift amount calculating section 210 compares the number (or ratio) of 1s in each position with a threshold in order starting from the lowest-order position. In this variation, on the other hand, if the number of 1s in all bits in the range from the lowest-order position to the k-th position (where k is an integer greater than or equal to 1) of an integer part determined in accordance with a possible shift amount is less than or equal to a predetermined ratio (or number), the possible shift amount plus 1 is chosen as the shift amount $S_j$. In this variation, the processing flow (S230') shown in FIG. 34 is performed instead of step S230 shown in FIG. 33.

The low-order-position checker 230 takes in $N_F$ sample values (S2301). It assigns an initial value of 1 to k (S2311). It then acquires the number m of bits that contain "1" in the range from the lowest-order position, inclusive, to the k-th position of the integer part of the signal separated from the error part using a possible shift amount ΔE (S2312). Decision is made as to whether $m/(k \cdot N_F)$ is less than or equal to a predetermined threshold (S2313). If step S2313 is true, 1 is added to k (S2314) and then the process returns to step S2312. If step S2313 is not true, k−1 is added to the possible shift amount ΔE (S2315) and then step S230' will end. After step S230' ends, the process proceeds to step S240 as shown in FIG. 32, where the possible shift amount ΔE is chosen as the shift amount $S_j$.

While it is decided whether the ratio or the number of "1s" is less than or equal to a threshold in this variation, determination may be made as to whether the ratio of "0s" is greater than or equal to a threshold.

[Second Variation]

Figure 35:
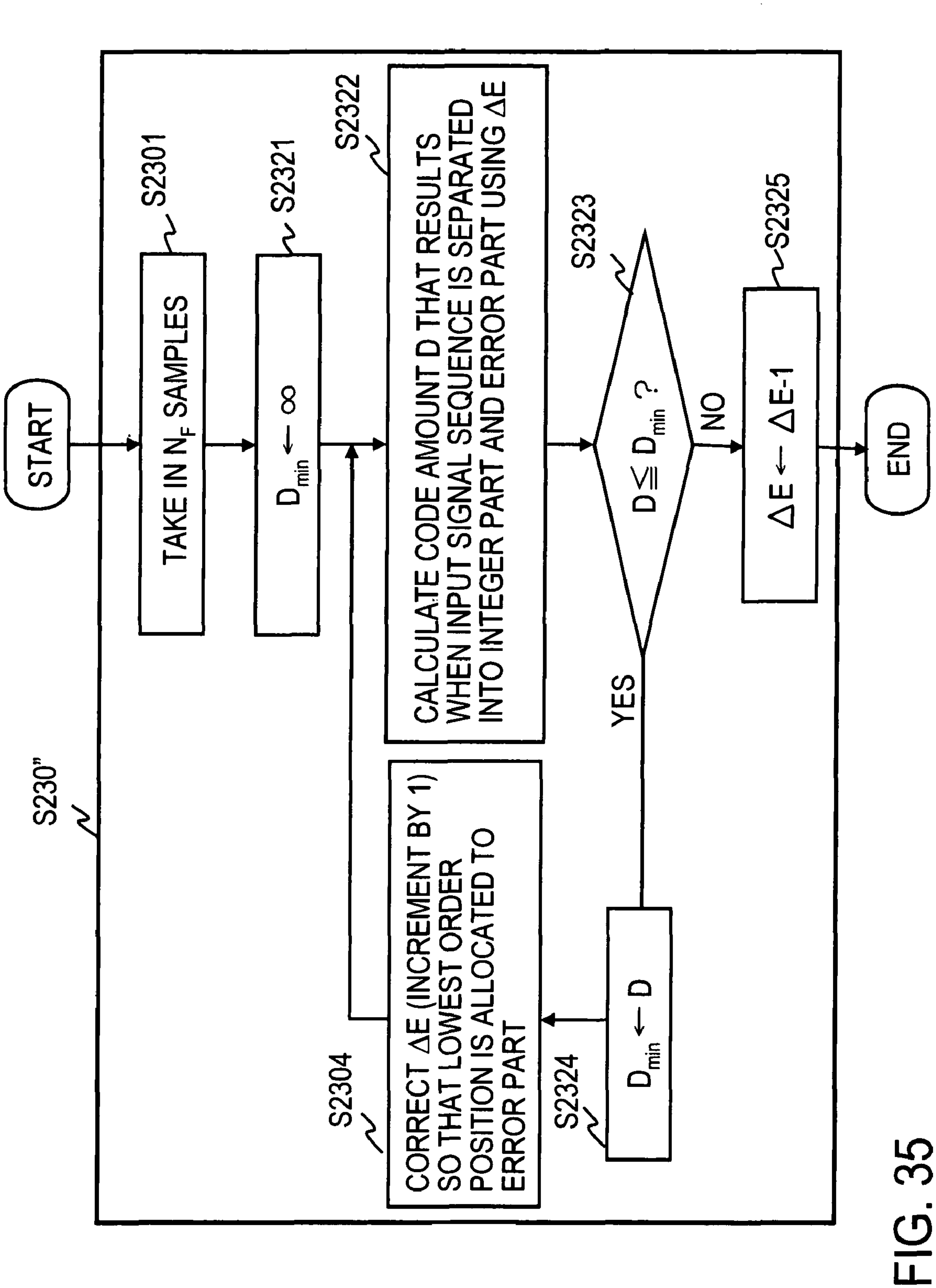
FIG. 35 shows a detailed processing flow (step S230") in the low-order-position checking section 230 of the shift amount calculating section 210.

FIG. 35 shows a second variation of processing by the low-order-position checker 230 shown in FIG. 31. In this variation, the low-order-position checker 230 of the shift amount calculating section 210 increments a shift amount determined according to a possible shift amount by 1 while calculating the amount of codes generated using that shift amount. If the amount of codes increases from the amount of codes generated by using the previous shift amount, the previous shift amount is chosen as the shift amount $S_j$ for the frame. In this variation, the processing flow (step S230") shown in FIG. 35 is performed instead of step S230 shown in FIG. 33.

The low-order-position checker 230 takes in $N_F$ sample values (S2301). Then, $D_{min}$ is set to an infinite value (S2321). In practice, $D_{min}$ may be set to the maximum possible value of the amount of codes. The amount of the codes D generated by separating the signal into an integer part and an error part using a possible shift amount ΔE is calculated (S2322). Decision is made as to whether $D \leqq D_{min}$ (S2323). If step S2323 is true, $D_{min}$ is set as D (S2324), 1 is added to the possible shift amount ΔE (S2304), and then the process returns to step S2322. If step S2323 is not true, 1 is subtracted from the possible shift amount ΔE (S2325), and step S230" will end. After completion of step S230", the process proceeds to step S240 as shown in FIG. 32, where the possible shift amount ΔE is chosen as the shift amount $S_j$.

[Third Variation]

Figure 36:
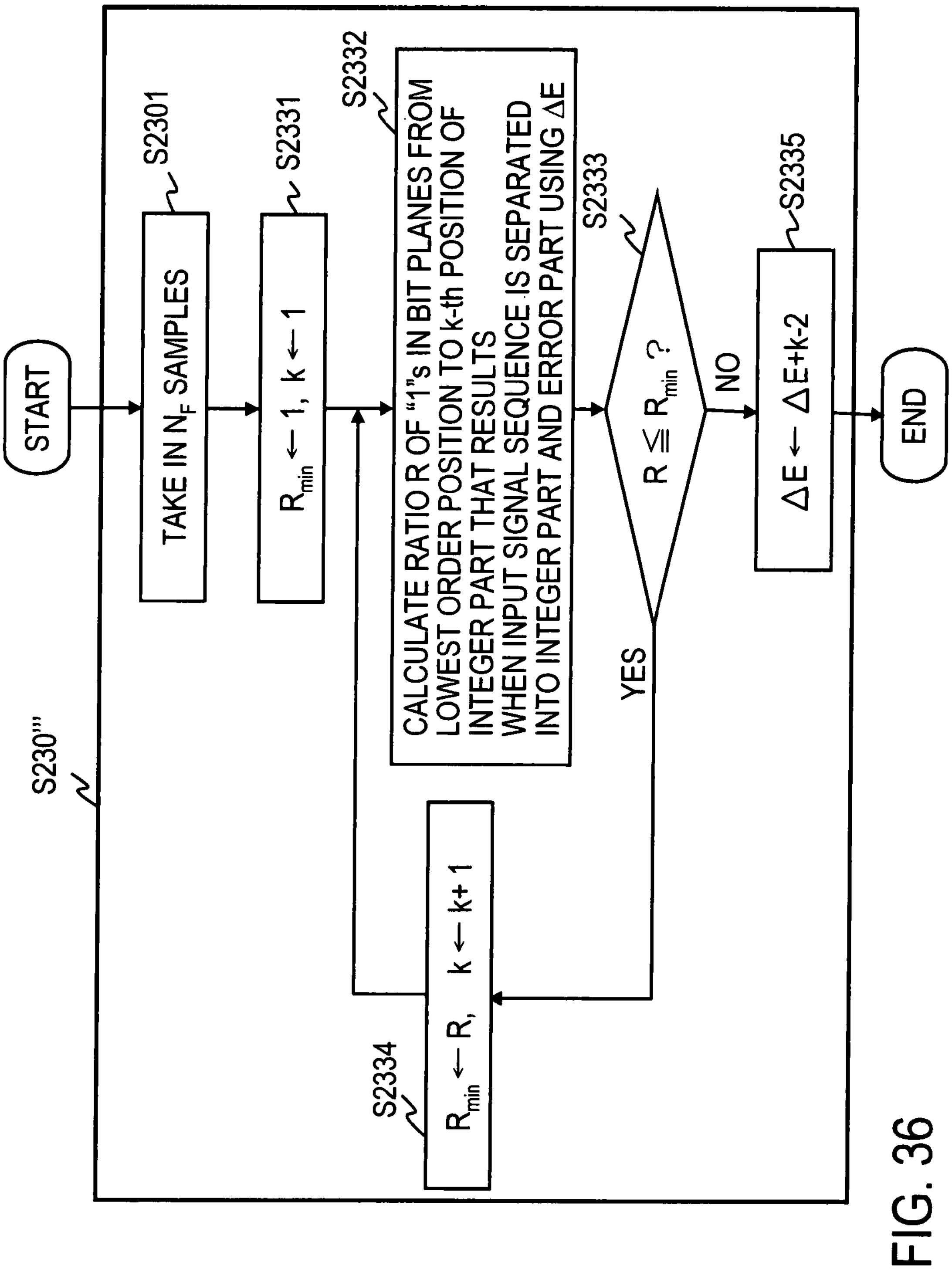
FIG. 36 shows a detailed processing flow (step S230"') in the low-order-position checking section 230 of the shift amount calculating section 210.

FIG. 36 shows a third variation of processing by the low-order-position checker 230 in the coding apparatus shown in FIG. 31. In the third variation, the low-order-position checker 230 of the shift amount calculation section 210 calculates the ratio in number of "1s" in all bits in the range from the lowest position, inclusive, to the k-th position of an integer determined in accordance with a possible shift amount while incrementing k by 1 starting from 1, obtains k when the ratio of 1s increases from the ratio obtained using the previous shift amount, and chooses the possible shift amount plus k−1 as the shift amount $S_j$. In the third variation, the process flow (step S230''') shown in FIG. 36 is performed instead of step S230 shown in FIG. 33.

The low-order-position checker 230 takes in $N_F$ sample values (S2301). It assigns 1 to $R_{min}$ and an initial value of 1 to k (S2331). Then the low-order-position checker 230 calculates the ratio R in number of "1s" in all bits in the range from the lowest order position to the k-th position in an integer part separated from an error part by using a possible shift amount ΔE (S2332). Decision is made as to whether $R \leqq R_{min}$ (S2333). If step S2333 is true, $R_{min}$ is set as R, 1 is added to k (S2334), and the process returns to step S2332. If step S2333 is not true, k−2 is added to the possible shift amount ΔE (S2335), and then step S230''' will end. After step S230''' ends, the process proceeds to step S240 as shown in FIG. 32, where the possible shift amount ΔE is chosen as the shift amount $S_j$.

[Fourth Variation]

Figure 37:
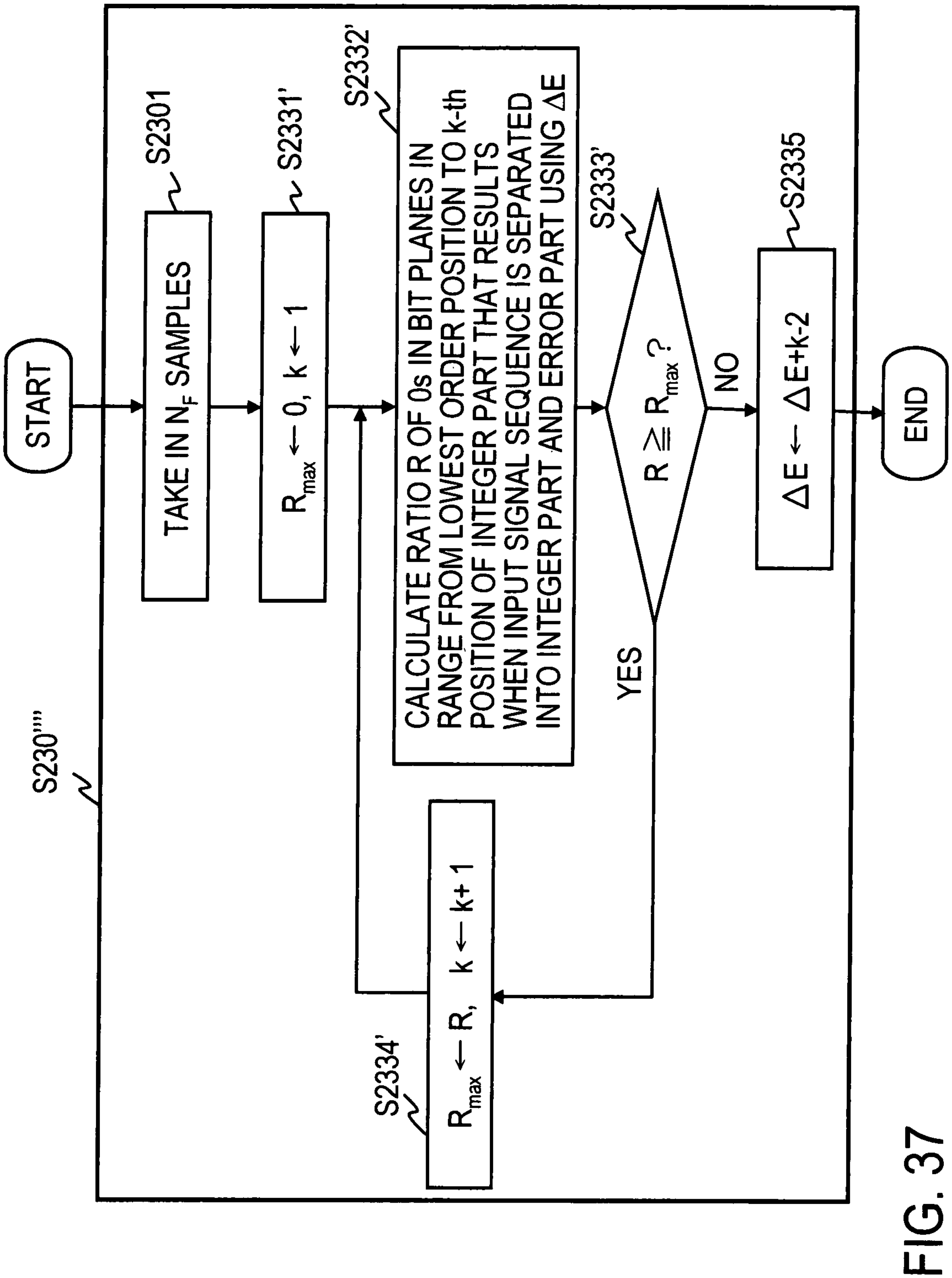
FIG. 37 shows a detailed processing flow (step S230"") in the low-order-position checking section 230 of the shift amount calculating section 210.

FIG. 37 shows a fourth variation of processing by the low-order-position checker 230 in the coding apparatus of FIG. 31. While the shift amount is obtained by using the ratio of the number of "1s" in the third variation, the ratio of the number of "0s" may be used to obtain the shift amount. In the fourth variation, the processing flow (step S230'''') shown in FIG. 37 is performed instead of step S230 shown in FIG. 33.

The low-order-position checker 230 takes in $N_F$ sample values (S2301). It assigns 0 to $R_{max}$ and 1 to k (S2331'). The ratio R of 0s in all bits in the range from the lowest order position to the k-th position of an integer part separated from an error part using a possible shift amount ΔE is calculated (S2332'). Decision is made as to whether $R \geqq R_{max}$ (S2333'). If step S2333' is true, $R_{max}$ is set as R, 1 is added to k (S2334'), and the process returns to step S2332'. If step S2333' is not true, k−2 is added to the possible shift amount ΔE (S2335) and step S230'''' will end. After the end of step S230'''', the process proceeds to step S240 as shown in FIG. 32, where the possible shift amount ΔE is set as the shift amount $S_j$.

The decoding apparatus 600 shown in FIG. 14 can be used as a decoding apparatus corresponding to the coding apparatus 200' in FIG. 31.

[Variation 5]

Figure 38:
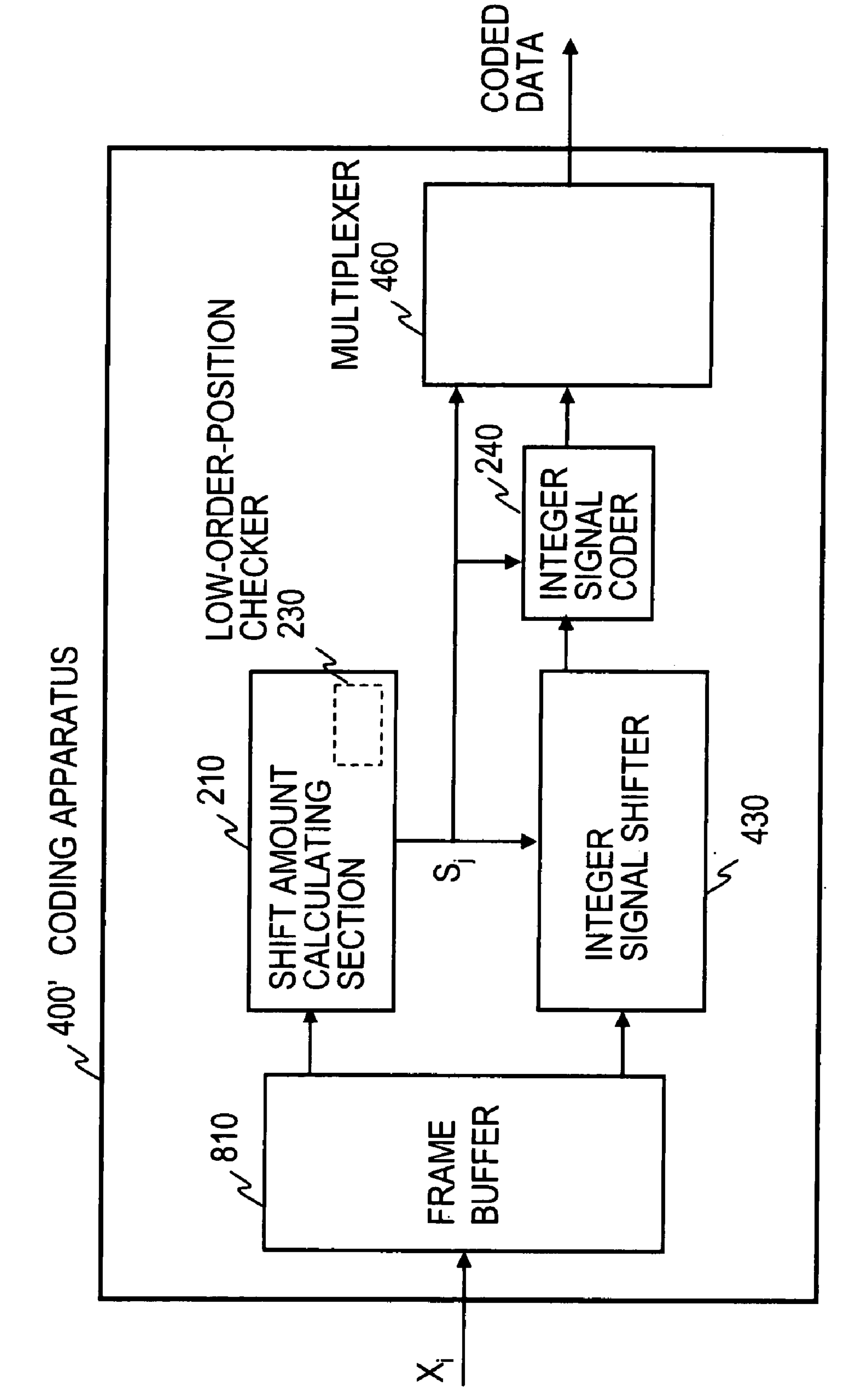
FIG. 38 shows an exemplary functional configuration of a coding apparatus according to variation 5 of the fourth embodiment.

A coding apparatus 400' shown in FIG. 38 is an variation of the fourth embodiment and its first to fourth variations that uses a representation format of a digital input signal represented only by an integer part. Because of the lack of an error part, the coding apparatus 400' has the functional configuration of the coding apparatus 200' of FIG. 31 from which the error signal coder 850 is omitted and in which the integer signal/error signal separator 830 is replaced with an integer signal shifter 430, as shown in FIG. 38. As in the coding apparatus 200' in FIG. 31, in this variation, the shift amount calculating section 210 calculates a possible shift amount such that the sample value in a frame that has the largest amplitude value is the maximum amplitude that can be represented by an integer part. The possible shift amount is corrected using as a correction shift amount a range (bit planes) of contiguous positions that is determined on the basis of a predetermined criterion of the frequency of "0s" or "1s", starting from the lowest order position of an integer part determined in accordance with the possible shift amount. If a bit plane in which "1s", for example, appear with a frequency lower than or equal to a predetermined value is truncated as a result of shifting, information represented by the "1s" in the bit plane will be lost because an error signal coder is not provided. The coding apparatus according to the variation therefore allows lossy coding as well as lossless coding.

The functional configuration of the shift amount calculating section 210 shown in FIG. 31 and the processing flow shown in FIGS. 32 and 33 or any of the first to fourth variations in FIGS. 34 to 37 can be used as the functional configuration and processing flow of the shift amount calculating section 210. A decoding apparatus 700 shown in FIG. 29 can be used as a decoding apparatus corresponding to the coding apparatus shown in FIG. 38.

Fifth Embodiment

A fifth embodiment is a combination of the method of the first embodiment shown in FIG. 11 and the method in which if the difference between the current frame and the previous frame in shift amount is within a predetermined range, the same shift amount that of the previous frame is used as the current shift amount.

Figure 39:
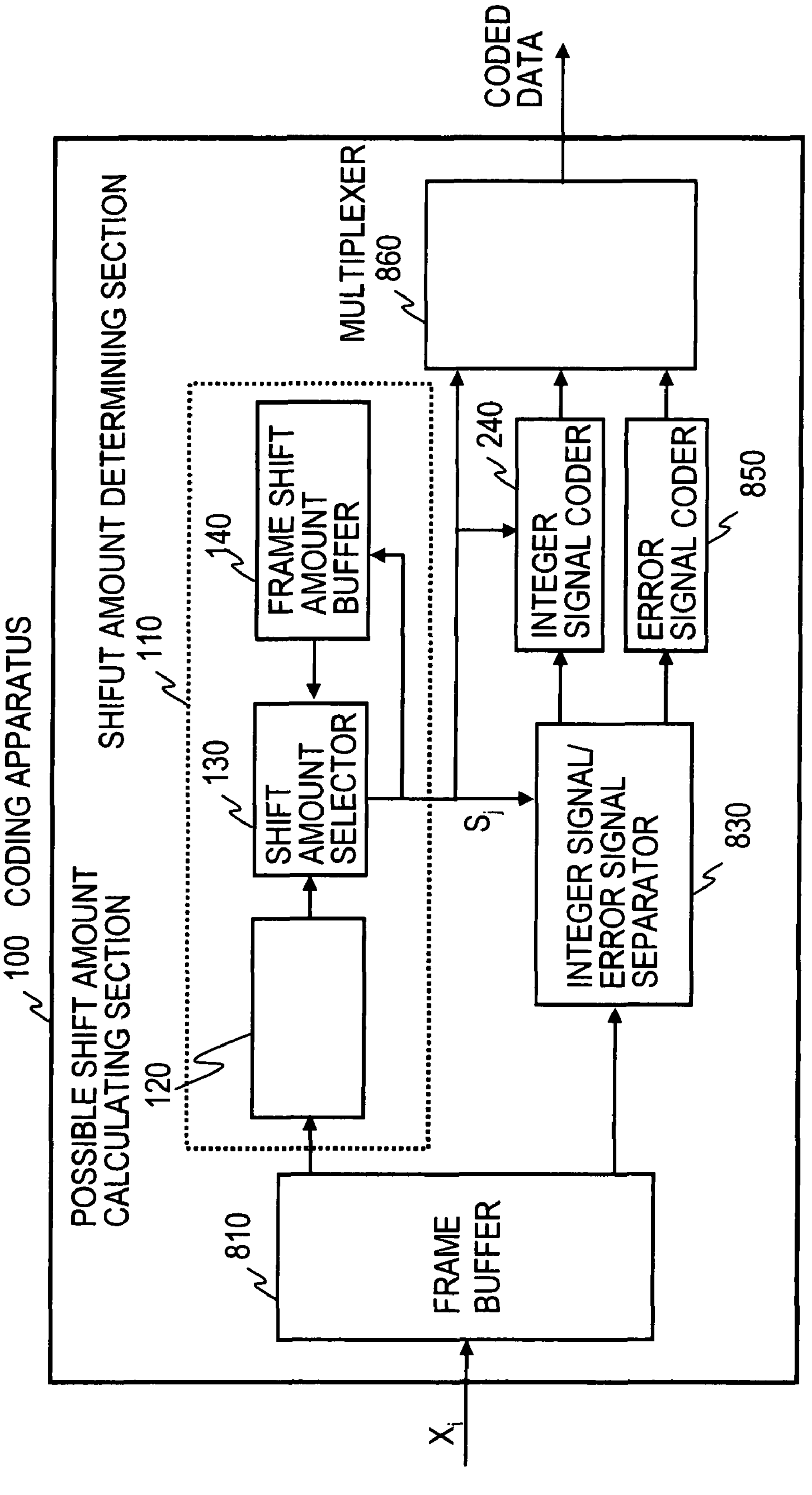
FIG. 39 shows an exemplary functional configuration of a coding apparatus according to a fifth embodiment.

FIG. 39 shows an exemplary functional configuration of a coding apparatus according to the fifth embodiment. The coding apparatus 100 includes a frame buffer 810, a shift amount determining section 110 consisting of a possible shift amount calculating section 120, a shift amount selector 130, and a frame shift amount buffer 140, an integer signal/error signal separator 830, an integer signal coder 240, an error signal coder 850, and a multiplexer 860. The coding apparatus 100 differs from the coding apparatus 200 of FIG. 11 in that it includes the shift amount determining section 110.

Figure 40:
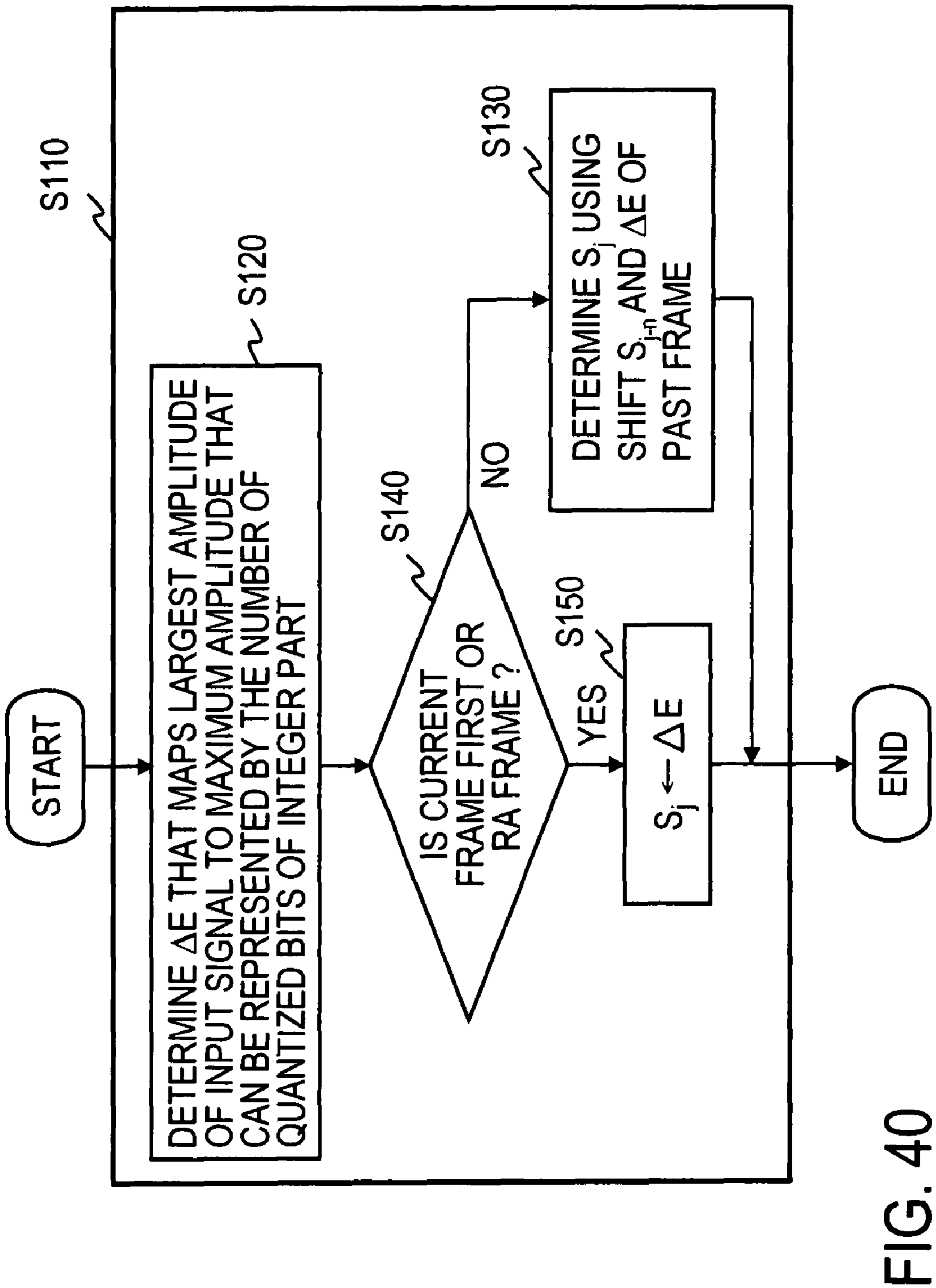
FIG. 40 shows a processing flow (step S110) in a shift amount determining section 110.

A processing flow of the coding apparatus 100 is the same as the processing flow of FIG. 3, except that step S820 is replaced with step S110 (FIG. 40) and step S840 with step S240 (FIG. 13). FIG. 40 shows a processing flow (step S110) in the shift amount determining section 110. In step S10, first the possible shift amount calculating section 120 maps the largest amplitude of the sample values in a frame to the maximum amplitude that can be represented by the number of bits of the integer part for quantization, thereby obtaining a possible shift amount ΔE (S120). The shift amount selector 130 decides whether the current frame is any of the first frame and a random access frame (RA frame: a frame that does not use prediction from a past frame) (S1140). If the frame is the first frame or a random access frame, the shift amount selector 130 selects the possible shift amount ΔE as the shift amount $S_j$ for the current frame (S150). If the frame is neither the first frame nor a random access frame, the shift amount selector 130 reads the shift amounts of one or more past frames $S_{j-1}, \ldots, S_{j-n}$ (where n is an integer greater than or equal to 1) from the frame shift amount buffer 140 and uses the shift amounts of the past frames and the possible shift amount ΔE to determine a shift amount $S_j$ for the current frame (S130).

Figure 41:
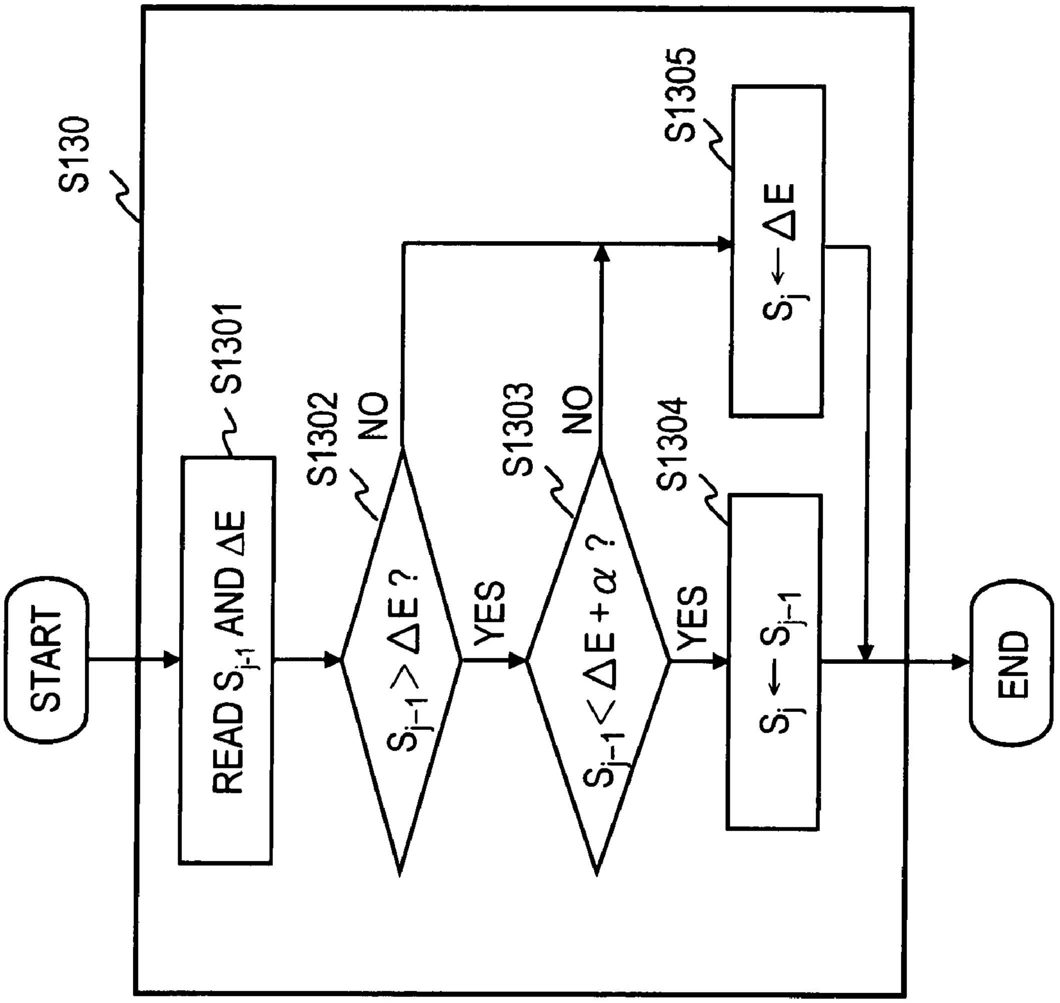
FIG. 41 shows a detailed exemplary processing flow (step S130) in a shift amount selecting section 130.

FIG. 41 shows a detailed processing flow of the process (step S130) performed in the shift amount selector 130 when n=1. The shift amount selector 130 reads the shift amount $S_{j-1}$ of the previous frame from the frame shift amount buffer 140 and the possible shift amount ΔE from the possible shift amount calculating section 120 (S1301). Decision is made as to whether $S_{j-1}>\Delta E$ (S1302). If true, it is decided whether $S_{j-1}<\Delta E+\alpha$ (S1303). Here, α is a predetermined threshold. If both of steps S1302 and S1303 are true, the shift amount $S_{j-1}$ of the previous frame is selected as the shift amount $S_j$ of the current frame (S1304). On the other hand, if one of the steps S1302 and S1303 is not true, the possible shift amount ΔE is selected as the shift amount $S_j$ of the current frame (S1305).

Here, a is a threshold used for changing a shift amount only if a variation in the shift amount is greater than or equal to a predetermined value and may be preset to 5, for example. If α=5, the shift amount is changed only if the possible shift amount ΔE obtained by analyzing the largest amplitude of the frame is greater than the shift amount $S_{j-1}$ of the previous frame or smaller than $S_{j-1}-5$.

By determining the shift amount $S_j$ of a frame in this way, frequent variations in shift amount can be avoided and the compression ratio of compressive coding using interframe prediction can be improved.

The decoding apparatus 600 shown in FIG. 14 can be used as a decoding apparatus corresponding to the coding apparatus 100 in FIG. 39.

[First Variation]

In the fifth embodiment, the shift amount selector 130 of the shift amount determining section 110 sets the shift amount of the current frame to the same value as the shift amount of the previous frame if the difference between the shift amount of the previous frame and the possible shift amount of the current frame is less than a predetermined threshold α, as shown in FIG. 41. In this variation, the shift amount selector 130 of the shift amount determining section 110 calculates the amount of data coded using each of the shift amount values in the range from the shift amount value of the previous frame to a possible shift amount value of the current frame and chooses the shift amount that provides the least data amount as the shift amount of the current frame.

Figure 42:
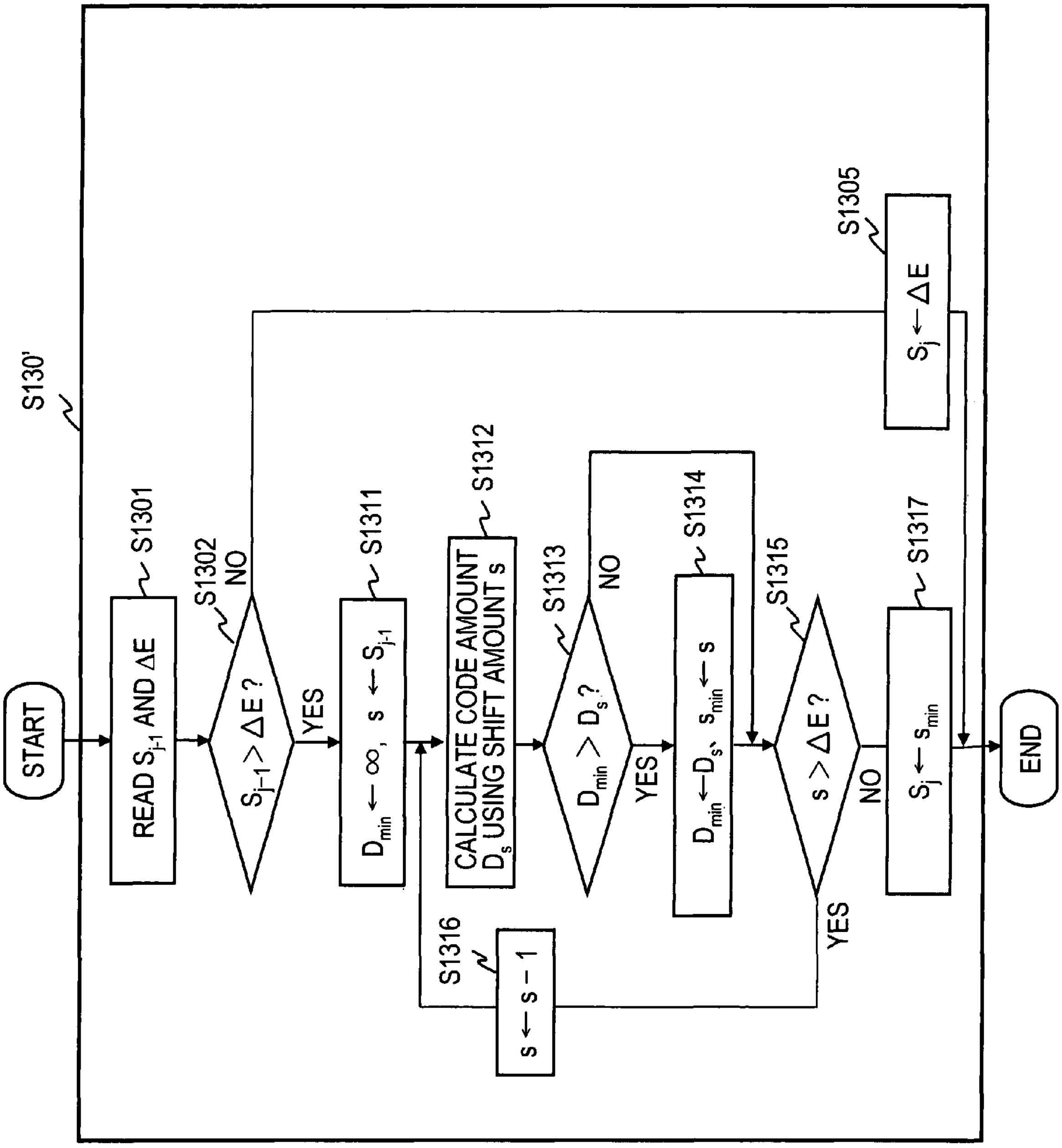
FIG. 42 shows a detailed exemplary processing flow (step S130') in the shift amount selecting section 130.

FIG. 42 shows a processing flow (step S130') of the shift amount selector 130 performed instead of step S130. The shift amount selector 130 reads out the shift amount $S_{j-1}$ of the previous frame from the frame shift amount buffer 140 and a possible shift amount ΔE from the possible shift amount calculating section 120 (S1301). Decision is made as to whether $S_{j-1}>\Delta E$ (S1302). If step S1302 is true, $D_{min}$ is set to an infinite value and the initial value of the shift amount parameter s to the shift amount $S_{j-1}$ of the previous frame (S1311). Here, the infinite value may be the maximum possible value of the amount of codes. The code amount of an integer signal and the code amount of an error signal when the shift amount s is used are obtained and the code amount $D_s$ of multiplexed coded data is obtained (S1312). Decision is made as to whether $D_{min}$ is greater than $D_s$ (S1313). If $D_{min}$ is greater than $D_s$, $D_s$ is set to $D_{min}$ and the current s is stored as $s_{min}$ (S1314) and then the process proceeds to step S1315. If $D_{min}$ is less than or equal to $D_s$, the process proceeds to step S1315, where decision is made as to whether s>ΔE (S1315). If step S1315 is true, s−1 is assigned to S (S1316). If step S1315 is not true, $s_{min}$ is selected as the shift amount $S_j$ (S1317). If step S1302 is not true, the possible shift amount ΔE is selected as the shift amount $S_j$ (S1305).

While this process requires more processing time, the process can ensure that a shift amount that provides a less code amount is selected.

[Second Variation]

In a second variation, the shift amount selector 130 of the shift amount determining section 110 records the shift amounts of past N frames (where N is an integer greater than or equal to 2). If a possible shift amount is greater than the n-th smallest shift amount (where n is an integer greater than or equal to 1 and less than N) among the shift amounts of past N frames and less than the shift amount of the previous frame, the shift amount of the previous frame is selected as the shift amount of the current frame. If the possible shift amount is less than or equal to the h-th smallest shift amount (where h is an integer greater than or equal to 1 and less than N) among the shift amounts of past N frames, or is greater than or equal to the shift amount of the previous frame, the possible shift amount is selected as the shift amount of the current frame.

Figure 43:
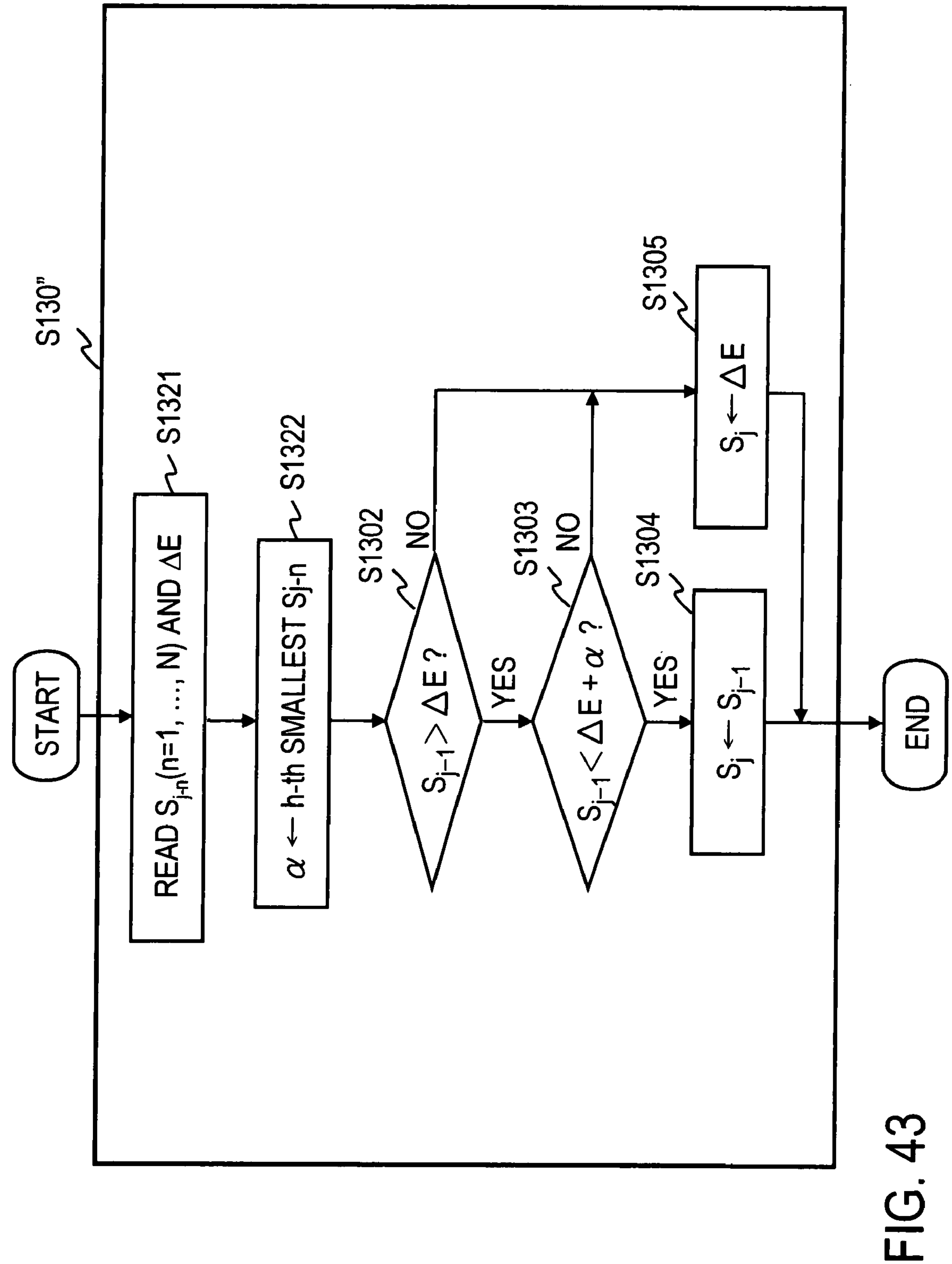
FIG. 43 shows a detailed exemplary processing flow (step S130") in the shift amount selecting section 130.

FIG. 43 shows a processing flow (step S130") of the shift amount selector 130 that is performed instead of step S130. The shift amount selector 130 reads out the shifts amount $S_{j-n}$ (where n=1, . . . , N) of past frames from the frame shift amount buffer 140 and a possible shift amount ΔE from the possible shift amount calculating section 120 (S1321). Here, N is an integer greater than or equal to 2. A threshold α is set that is equal to the h-th smallest shift amount among the shift amounts of past N frames (S1322). Step S1302 and the subsequent steps are the same as those of FIG. 41 in the fifth embodiment.

In this variation, a threshold is not predetermined but instead is obtained from shift values in the past. Therefore, the threshold can be changed by taking into consideration characteristics of the input signal.

[Third Variation]

In a third variation, the shift amount selector 130 of the shift amount determining section 110 selects the shift amount of the previous frame as the shift amount for the current frame if a possible shift amount is less than the shift amount of the previous frame. If a possible shift amount is greater than or equal to the shift amount of the previous frame, the shift amount selector 130 selects the possible shift amount as the shift amount for the current frame.

Figure 44:
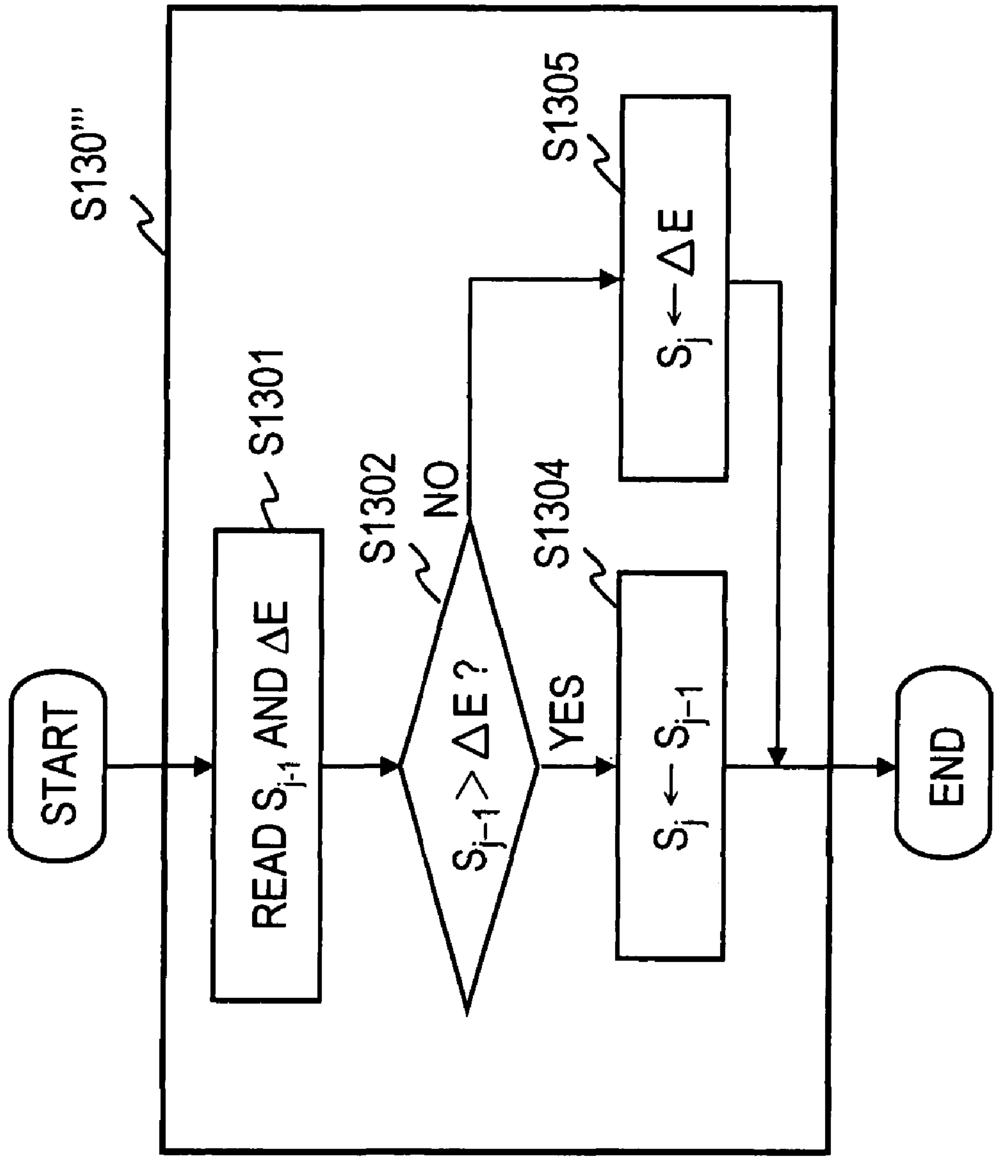
FIG. 44 shows a detailed exemplary processing flow (step S130''') in the shift amount selecting section 130.

FIG. 44 shows a processing flow (step S130''') of the shift amount selector 130 that is performed instead of step S130. The process flow differs from the flow of FIG. 41 in that step S1303 is eliminated. Accordingly, the shift amount may increase but does not decrease in this variation. The processing is the simplest.

[Fourth Variation]

Figure 45:
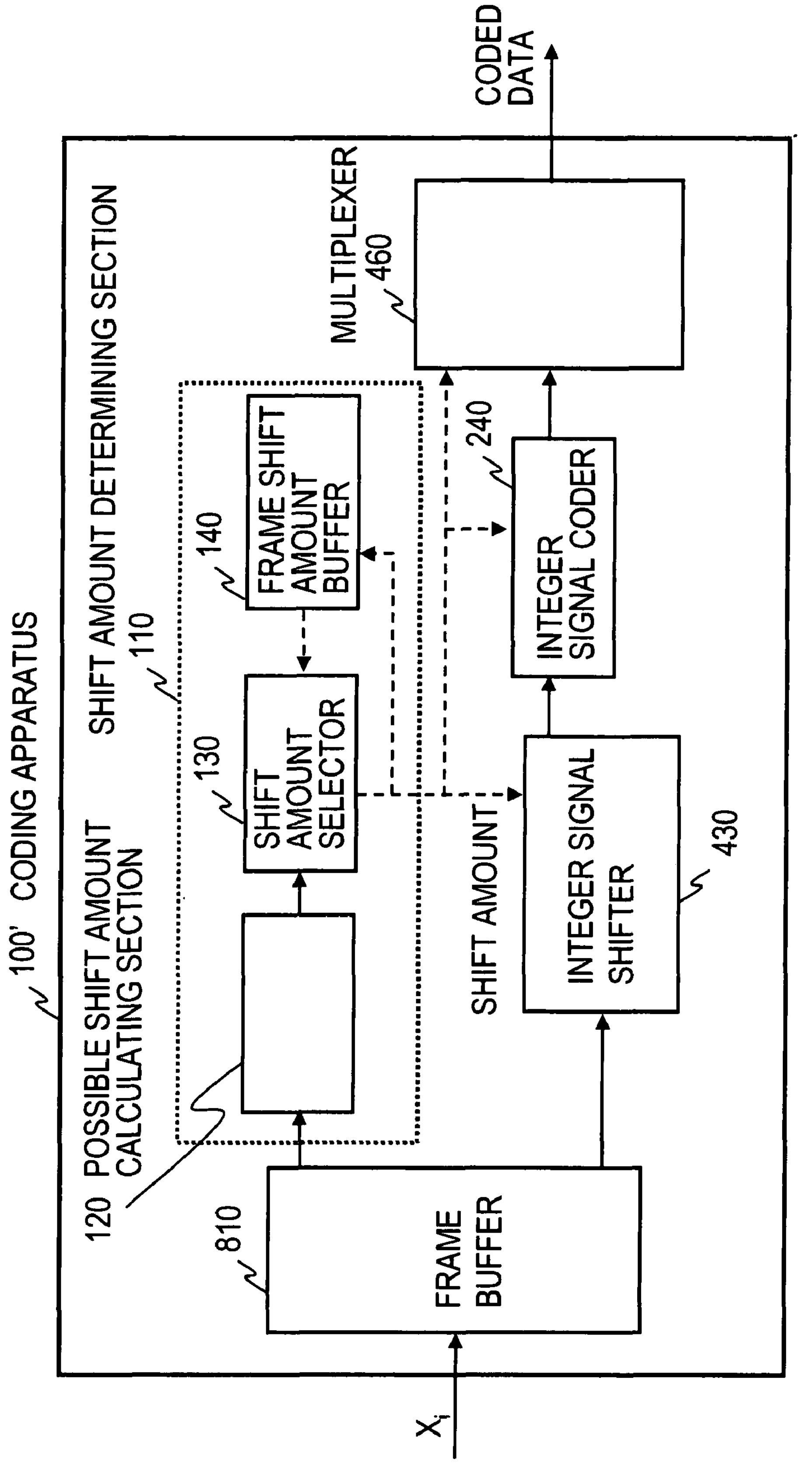
FIG. 45 shows an exemplary functional configuration of a coding apparatus according to variation 4 of the fifth embodiment.

FIG. 45 shows a variation of the coding apparatus according to any of the fifth embodiment and its first to third variations that uses a representation format of a digital input signal represented by an integer part alone. In this variation, an error signal coder is omitted from the functional configuration of the coding apparatus, as shown in FIG. 45. This variation is a combination of the method of the third embodiment and the method in which the current shift amount is made equal to the previous shift amount if the difference from the shift amount of the previous frame is within a predetermined range.

The difference of the coding apparatus 100' (FIG. 45) from the coding apparatus 400 (FIG. 25) is exactly the same as the difference between the coding apparatus 100 (FIG. 39) and the coding apparatus 200 (FIG. 11) described with respect to the fifth embodiment. That is, only the shift amount determining section 110 differs from that of the third embodiment. The specific functional configuration and processing flow of the shift amount determining section 110 are the same as those described with respect to the fifth embodiment and its first to third variations described with reference to FIGS. 40 to 44. The decoding apparatus 700 in FIG. 29 can be used as a decoding apparatus corresponding to this coding apparatus.

Sixth Embodiment

Figure 46:
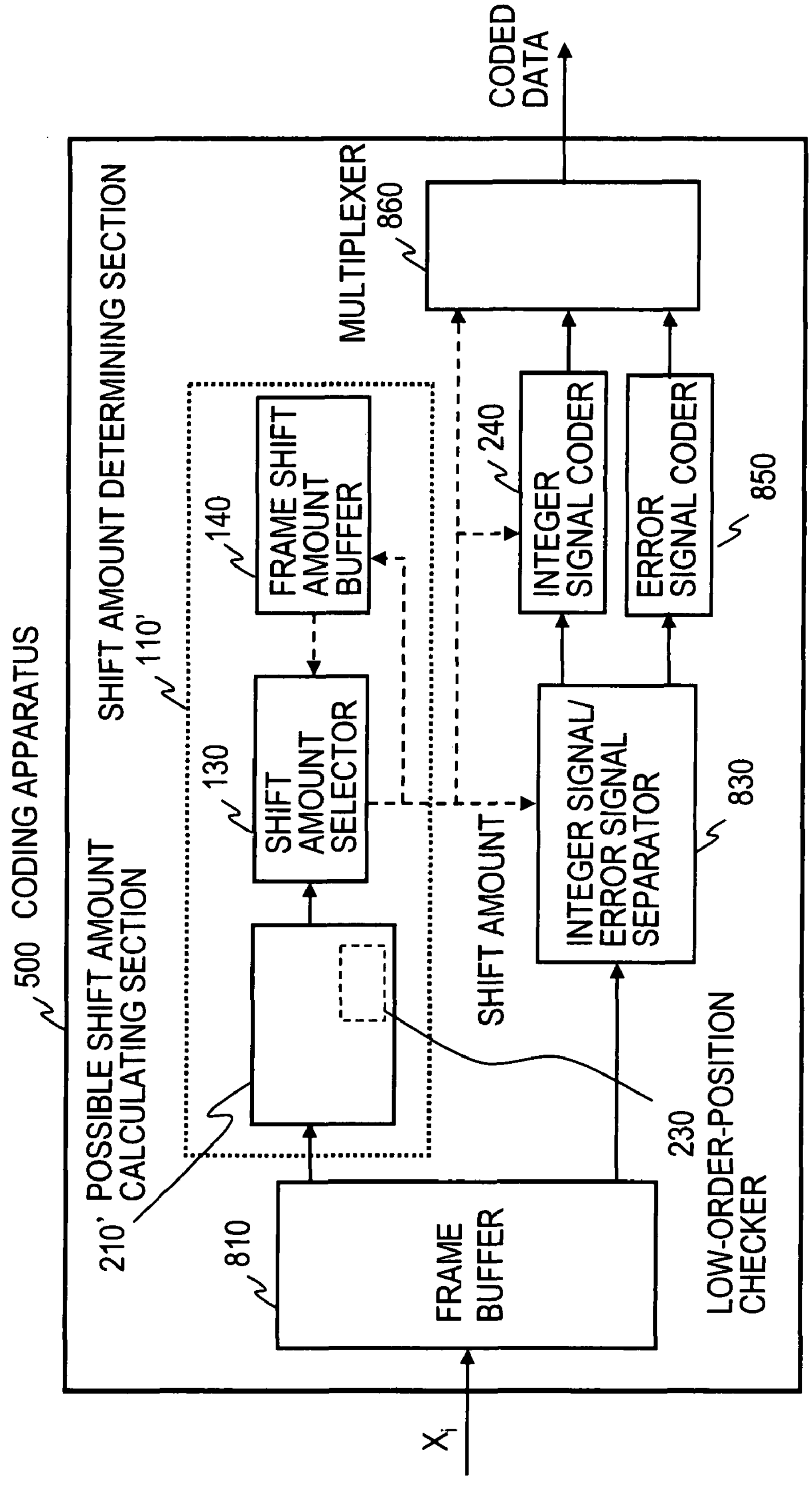
FIG. 46 shows an exemplary functional configuration of a coding apparatus according to a sixth embodiment.

FIG. 46 shows a coding apparatus of a sixth embodiment, which is a combination of the methods: the method in which a shift amount calculating section calculates a possible shift amount such that the amplitude of the sample value with the largest amplitude value among the sample values in a frame is the maximum amplitude that can be represented by an integer part, and the frequency of 0s or 1s in the bits in a predetermined range of low-order-positions of an integer part predetermined in accordance with the possible shift amount is used to correct the possible shift amount to determine the shift amount of a frame according to a predetermined, criterion, and the method described in the fifth embodiment (which is a combination of the method of the first embodiment and the method in which if the difference from the shift amount of the previous frame is within a predetermined range, the current shift amount is made equal to the previous shift amount).

As shown in FIG. 46, the coding apparatus 500 according to the sixth embodiment includes a frame buffer 810, a possible shift amount calculating section 210', a shift amount determining section 110' having a shift amount selector 130 and a frame shift amount buffer 140, an integer signal/error signal separator 830, an integer signal coder 240, an error signal coder 850, and a multiplexer 860. The difference between the coding apparatus 500 and the coding apparatus 100 of FIG. 39 is in the possible shift amount calculating section 210'.

The processing flow (step S110') in the shift amount determining section 110' is the same as the process flow of the shift amount determining section 110 shown in FIG. 40, except that step S120 is replaced with the process flow of step S210 shown in FIG. 32. The process flow in the coding apparatus 500 is the same as the process flow of FIG. 3, except that step S820 is replaced with step S 10' described above, and step S840 is replaced with step S240 (FIG. 13). The step S130 in step S110' can be replaced with any of steps S130', S130'', and S130''' shown in FIGS. 42 to 44, as in the variations of the fifth embodiment. Also, step S230 in Step S210 (FIG. 32) can be replaced with any of steps S230', 230'', 230''', and S230'''' shown in FIGS. 34 to 37, as in the variations of the fourth embodiment.

By combining different methods as in the sixth embodiment, the amount of codes can be further reduced. The decoding apparatus 600 in FIG. 14 can be used as a decoding apparatus corresponding to the coding apparatus in FIG. 46.

[Variation]

Figure 47:
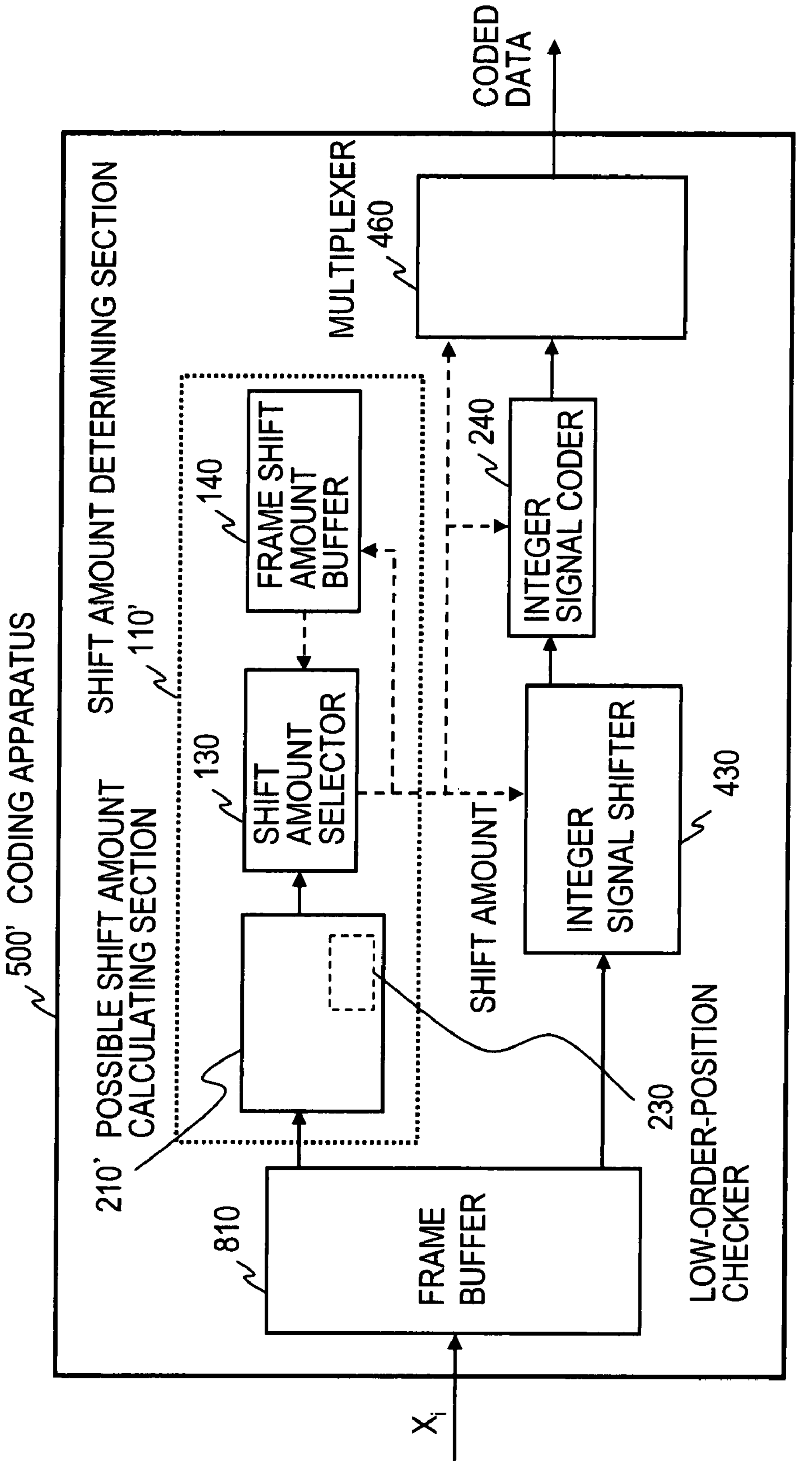
FIG. 47 shows an exemplary functional configuration of a coding apparatus according to a variation of the sixth embodiment.

A variation of the sixth embodiment is applicable to cases where a representation format of a digital input signal represented by an integer part alone is used. Because of the lack of an error part, the functional configuration of the coding apparatus is as shown in FIG. 47. The variation is a combination of the three methods: the method of the third embodiment, the method in which the frequency of "0s" or "1s" in the bits in a predetermined range of low-order-positions of an integer part determined in accordance with a possible shift amount is used to correct the possible shift amount according to a predetermined criterion to determine the shift amount of a frame, and the method in which if the difference from the shift amount of the previous frame is within a predetermined range, the current shift amount is made equal to the previous shift amount.

The difference of coding apparatus 500' (FIG. 47) from the coding apparatus 100' (FIG. 45) is exactly the same as the difference between the coding apparatus 500 (FIG. 46) and the coding apparatus 100 (FIG. 39) described with respect to the sixth embodiment. That is, the only difference from the fifth embodiment is in the possible shift amount calculating section 210'. The specific functional configuration and processing flow of the shift amount determining section 110' are the same as those described with respect to the sixth embodiment.

It should be noted that any of the embodiments described above can be implemented by causing a computer to read a program that causes the computer to perform the steps of any of the methods described above. The program may be recorded on a computer-readable recording medium and may be read by the computer, or the program may be stored in a server or the like and read by the computer over an electric communication line or the like.

As will be understood from the forgoing description of the embodiments, the essence of coding according to the present invention is that if the amplitude of a frame of a digital signal is to be adjusted before linear predictive coding, the amount of adjustment of the amplitude of the samples in the previous frame required for linear predictive coding is corrected so that the amount is equal to the amount of adjustment of the amplitude of the current frame before the amount of adjustment is used. Similarly, the essence of decoding is that the amplitude adjustment amount of the decoded samples in the previous frame required for linear predictive decoding is corrected so that the amount is equal to the amount of amplitude adjustment made to the samples in the current frame to be decoded before using the amount of adjustment. The amplitude of each frame may be adjusted by bit shifting of an integer signal or by dividing an integer signal by a common multiplier.

Figure 48:
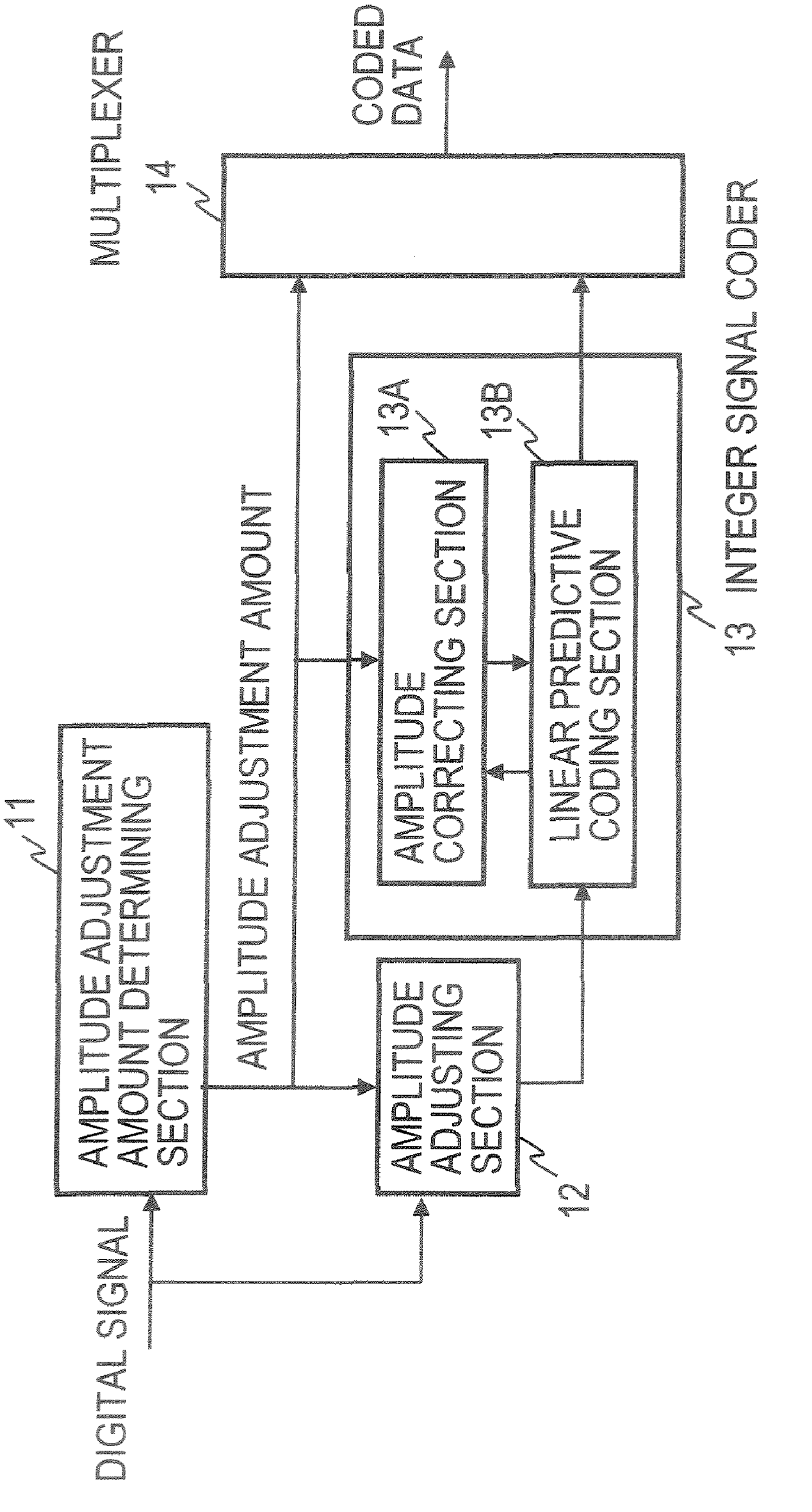
FIG. 48 is a conceptual block diagram of a coding apparatus according to the present invention.
Figure 49:
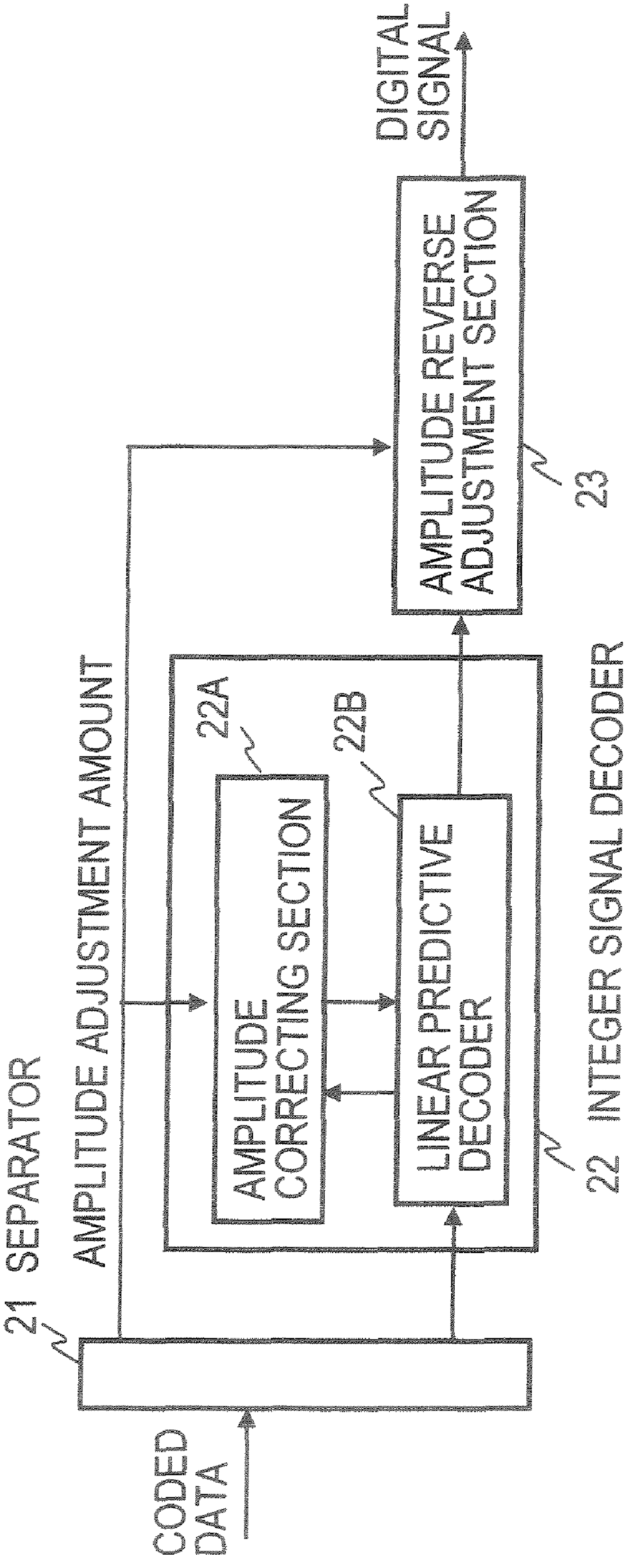
FIG. 49 is a conceptual block diagram of a decoding apparatus according to the present invention.

FIGS. 48 and 49 schematically shows main components of a coding apparatus and decoding apparatus according to the present invention.

As shown in FIG. 48, in the coding apparatus of the present invention, an amplitude adjustment amount determining section 11 determines a desirable amplitude adjustment amount for each frame of an input digital signal and an amplitude adjusting section 12 adjusts the amplitude of the input digital signal. A linear predictive coding section 13B of an integer signal coder 13 performs linear predictive coding of the amplitude-adjusted digital signal. In the linear predictive coding, linear prediction analysis is performed on the basis of information about a predetermined number of past samples and therefore information about the samples in the previous frame is used as needed. According to the present invention, an amplitude correcting section 13A of the integer signal coder 13 uses the amplitude adjustment amount of the previous frame and that of the current frame to correct the amplitude of the amplitude-adjusted samples in the previous frame to make it equal to the amplitude adjustment amount for the current frame. The integer signal code obtained as a result of the linear predictive coding and information about the amplitude adjustment amount is combined in a multiplexer 14 and outputted as coded data. The integer signal coder 13 corresponds to the integer signal coder 240 in FIGS. 11, 12, 25, 31, 38, 39, 45, 46, and 47 and the integer signal coder 340 in FIG. 17. The integer signal code includes a linear prediction coefficient code and a residue code described with reference to FIGS. 12 and 13, for example.

Similarly, in decoding, coded data inputted into a separator 21 is separated into an amplitude adjustment amount and an integer signal code. The integer signal code is decoded by a linear predictive decoding section 22B of an integer signal decoder 22. During the decoding, an amplitude correcting section 22A of the integer signal decoder 22 corrects, on the basis of the amplitude adjustment amounts of the previous and current frames, the amplitude of the decoded samples in the previous frame to make it equal to the amplitude adjustment amount of the decoded samples in the current frame as in the case of coding. The samples decoded by the integer signal decoder 22 are subjected to amplitude adjustment by an amplitude reverse adjusting section 23 that is the reverse of the amplitude adjustment made by the amplitude adjusting section 12 of the coding apparatus, thereby reproducing the digital signal. The integer signal decoder 22 corresponds to the integer signal decoder 620 in FIGS. 14 and 15 and the integer signal decoder 625 in FIG. 21.

What is claimed is:

1. A coding apparatus comprising:

an amplitude adjustment amount determining section which determines an amplitude adjustment amount for adjusting the amplitude of sample values of a digital signal on a frame-by-frame basis, each frame including a plurality of sample values;

an amplitude adjusting section which adjusts the amplitude of the digital signal in accordance with the amplitude adjustment amount determined by the amplitude adjustment amount determining section and outputs an integer signal;

an integer signal coder which encodes the integer signal by using linear predictive coding to generate an integer signal code; and a multiplexer which outputs coded data including at least the integer signal code and information representing the amplitude adjustment amount; wherein the integer signal coder comprises:

an adjustment amount buffer which holds an amplitude adjustment amount of a previous frame;

a sample buffer which holds at least as many last samples in the previous frame as a number equal to an order P used in linear predictive analysis; and an interframe correction section which corrects an amplitude of at least last P sample values in the previous frame held in the sample buffer on the basis of the amplitude adjustment amount of a current frame and the amplitude adjustment amount of the previous frame that are determined by the amplitude adjustment amount determining section.

2. The coding apparatus according to claim 1, wherein the amplitude adjusting section separates the digital signal into the integer signal and an error signal in accordance with the amplitude adjustment amount and outputs them; the coding apparatus further comprises an error signal coder which encodes the error signal and outputs an error signal code; and the multiplexer outputs coded data including the integer signal code, the error signal code, and a code representing the amplitude adjustment amount.

3. The coding apparatus according to claim 1, further comprising:

a common multiplier determining section which calculates a common multiplier for each frame;

a residue separator which outputs a provisional integer signal obtained by dividing an input signal in floating-point form by the common multiplier and making the result an integer and an error signal that is the difference between the input floating-point signal and the provisional integer signal multiplied by said common multiplier; and an error signal coder which encodes the error signal and outputs an error signal code;

wherein the amplitude adjustment amount determining section, the amplitude adjusting section, and the integer signal coder operate the provisional integer signal as the digital signal; and the multiplexer outputs coded data including the integer signal code, information representing the amplitude adjustment amount, information representing the common multiplier, and the error signal code.

4. The coding apparatus according to any one of claims 1, 2, and 3, wherein the amplitude adjustment amount is a shift amount; the amplitude adjusting section shifts the digital signal by the shift amount to generate the integer signal; and the interframe correction section makes a correction to said at least P sample values by the difference in shift amount between the current frame and the previous frame.

5. The coding apparatus according to claim 1 or 2, wherein the amplitude adjustment amount is a common multiplier; the amplitude adjusting section divides the digital signal by the common multiplier to generate the integer signal; and the interframe correction section corrects said at least P sample values by using the ratio between the common multiplier of the current frame and the common multiplier of the previous frame.

6. The coding apparatus according to claim 4, wherein the amplitude adjustment amount determining section determines a shift amount such that the amplitude of the sample value that is the largest in amplitude in each frame falls within a range that can be represented by the maximum and minimum values of an integer part simply by changing the shift amount.

7. The coding apparatus according to claim 4, wherein:

the amplitude adjustment amount determining section calculates a possible shift amount such that the amplitude of the sample value that is the largest in amplitude in each frame is the maximum amplitude that can be represented in the range between the maximum and minimum values of an integer part simply by changing the shift amount; and the amplitude adjustment amount determining section includes a low-order-position checking section which determines the shift amount by correcting the possible shift amount by using the number of contiguous positions in which the frequency of 0s or 1s satisfies a predetermined criterion, the contiguous positions starting from the lowest order position of an integer part determined in accordance with the possible shift amount.

8. The coding apparatus according to claim 4, wherein the amplitude adjustment amount determining section chooses the possible shift amount plus k to be the shift amount if all bits in a range of k positions from the lowest order position, including the lowest order position, of an integer part determined in accordance with the possible shift amount are 0, where k is an integer greater than or equal to 1.

9. The coding apparatus according to claim 4, wherein the amplitude adjustment amount determining section comprises:

a possible shift amount calculating section which calculates a possible shift amount such that the amplitude of the sample value that is the largest in amplitude in the current frame is the maximum amplitude that can be represented in the range between the minimum and maximum values of an integer part simply by changing the shift amount; and a frame shift amount buffer which records the shift amount of at least one past frame; and the shift amount of the current frame is determined in accordance with a predetermined criterion by using the possible shift amount and the shift amount recorded in the frame shift amount buffer.

10. The coding apparatus according to claim 4, wherein the amplitude adjustment amount determining section comprises:

a possible shift amount calculating section which calculates a possible shift amount such that the amplitude of the sample value that is the largest in amplitude in the current frame is the maximum amplitude that can be represented in a range between the minimum and maximum values of an integer part simply by changing the shift amount; and a frame shift amount buffer which records the shift amount of at least one past frame; and the shift amount of the current frame is determined in accordance with the possible shift amount, the shift amount recorded in the frame shift amount buffer, and the number of contiguous positions in which the frequency of 0s or 1s satisfies a predetermined criterion, the contiguous positions starting from the lowest order position of an integer part determined in accordance with the possible shift amount.

11. The coding apparatus according to claim 4, wherein the amplitude adjustment amount determining section comprises:

a possible shift amount calculating section which calculates a possible shift amount such that the amplitude of the sample value that is the largest in amplitude in a frame is the maximum amplitude that can be represented in the range between the maximum and minimum values of an integer part simply by changing the shift amount and determines the shift amount by correcting the possible shift amount by using the number of contiguous positions in which the frequency of 0s or 1s satisfies a predetermined criterion, the contiguous positions starting from the lowest order position of an integer part determined in accordance with the possible shift amount; and a frame shift amount buffer which records the shift amount of at least one past frame; and the shift amount of the current frame is determined in accordance with a predetermined criterion by using the possible shift amount and the shift amount recorded in the frame shift amount buffer.

12. The coding apparatus according to claim 11, wherein the possible shift amount calculating section changes the possible shift amount plus k to the possible shift amount if all bits in the range of k positions starting from the lowest order position, including the lowest order position, of an integer part determined in accordance with the possible shift amount are 0, where k is an integer greater than or equal to 1.

13. The coding apparatus according to claim 4, wherein the amplitude adjustment amount determining section determines a shift amount such that the amplitude of the sample value that is the largest in amplitude in each frame is the maximum amplitude that can be represented in the range between the maximum and minimum values of an integer part simply by changing the shift amount; the integer signal coder includes a shift amount calculating section which decides whether all bits in a range of k positions from the lowest order position, including the lowest order position, of the integer signal are 0, where k is an integer greater than or equal to 1, and if so, outputs a shift correction amount of k bits, and an integer signal shifter which receives the shift correction amount of k bits and correctively shifts the integer signal by k bits toward the lowest order position, and the integer signal coder encodes the integer signal correctively shifted by k bits by using linear predictive coding and provides the integer signal code and information representing the k bits of correction shift to the multiplexer.

14. A non-transitory computer-readable recording medium on which a program for implementing a coding apparatus according to any one of claims 1 to 3 is recorded.

15. A decoding apparatus comprising:

an integer signal decoder which decodes an integer signal code included in coded data in each frame by using linear predictive decoding and outputs an integer signal; and an amplitude reverse adjusting section which makes amplitude adjustment to the integer signal by using an amplitude adjustment amount contained in the coded data and outputs an amplitude-reverse-adjusted signal;

wherein the integer signal decoder comprises:

an adjustment amount buffer which holds the amplitude adjustment amount of a previous frame;

a sample buffer which holds at least as many last sample values in the previous frame as a number equal to an order P used in linear prediction; and an interframe correction section which corrects an amplitude of at least last P sample values in the previous frame held in the sample buffer on the basis of an amplitude adjustment amount of a current frame and an amplitude adjustment amount of the previous frame.

16. The decoding apparatus according to claim 15, further comprising: an error signal decoder which decodes an error code included in the coded data to generate an error signal; and an error component adder which adds the signal whose amplitude has been reversely adjusted and the error signal together and outputs digital data.

17. The decoding apparatus according to claim 15, further comprising:

an error signal decoder which decodes an error code included in the coded data to generate an error signal; and a multiplier which generates a signal in floating point form that results from the addition of the error signal to the integer signal multiplied by a common multiplier based on information representing the common multiplier contained in the coded data.

18. The decoding apparatus according to any one of claims 15, 16, and 17, wherein the amplitude adjustment amount is a shift amount; the amplitude reverse adjusting section shifts an output from the integer signal decoder by the shift amount to generate an integer signal as said signal whose amplitude has been reversely adjusted; and the interframe correction section makes a correction to said at least P sample values by the difference between the shift amount of the current frame and the shift amount of the previous frame.

19. The decoding apparatus according to claim 15 or 16, wherein the amplitude adjustment amount is a common multiplier; the amplitude reverse adjusting section multiples an output from the integer signal decoder by the common multiplier to generate said signal whose amplitude has been reversely adjusted; and the interframe correction section corrects said at least P sample values by using the ratio between the common multiplier of the current frame and the common multiplier of the previous frame.

20. A non-transitory computer-readable recording medium on which a program for implementing a decoding apparatus according to any one of claims 15-17 is recorded.

21. A coding method, comprising the steps of:

(a) determining an amplitude adjustment amount for adjusting the amplitude of sample values of a digital signal on a frame-by-frame basis, each frame including a plurality of sample values;

(b) adjusting the amplitude of the digital signal in accordance with the amplitude adjustment amount and outputting an integer signal;

(c) encoding the integer signal by using linear predictive coding to generate an integer signal code; and (d) outputting coded data including at least the integer signal code and information representing the amplitude adjustment amount;

wherein step (c) comprises:

(c-1) holding an amplitude adjustment amount of the previous frame;

(c-2) holding at least as many last samples in a previous frame as a number equal to an order P used in linear prediction analysis; and (c-3) correcting an amplitude of said at least last P sample values in the held previous frame on the basis of the amplitude adjustment amount of a current frame and the amplitude adjustment amount of the previous frame determined at step (a).

22. The coding method according to claim 21, wherein step (b) comprises the step of separating the digital signal into the integer signal and an error signal in accordance with the amplitude adjustment amount and outputting them; the coding method further comprises the step of (e) encoding the error signal and outputting an error signal code;

and step (d) outputs coded data including the integer signal code, the error signal code, and a code representing the amplitude adjustment amount.

23. The coding method according to claim 21, further comprising the steps of:

(f) calculating a common multiplier for each frame;

(g) outputting a provisional integer signal obtained by dividing an input signal in floating-point form by the common multiplier and making the result an integer and an error signal that is the difference between the input floating-point signal and the provisional integer signal multiplied by said common multiplier; and (h) encoding the error signal and outputting an error signal code;

wherein amplitude adjustment amount determining steps (a), (b), and (c) operate the provisional integer signal as the digital signal; and step (d) outputs coded data including the integer signal code, information representing the amplitude adjustment amount, information representing the common multiplier, and the error signal code.

24. The coding method according to any of claims 21, 22, and 23, wherein the amplitude adjustment amount is a shift amount; step (b) shifts the digital signal by the shift amount to generate the integer signal; and step (c-3) makes a correction to said at least P sample values by the difference in shift amount between the current frame and the previous frame.

25. The coding method according to claim 21 or 22, wherein the amplitude adjustment value is a common multiplier, step (b) divides the digital signal by the common multiplier to generate the integer signal; and step (c-3) makes a correction to said at least P sample values by using the ratio between the common multiplier of the current frame and the common multiplier of the previous frame.

26. The coding method according to claim 24, wherein step (a) determines a shift amount such that the amplitude of the sample value that is the largest in amplitude in each frame falls within a range that can be represented by the maximum and minimum values of an integer part simply by changing the shift amount.

27. The coding method according to claim 24, wherein step (a) comprises the steps of:

(a-1) calculating a possible shift amount such that the amplitude of the sample value that is the largest in amplitude in each frame is the maximum amplitude that can be represented in the range between the maximum and minimum values of an integer part simply by changing the shift amount; and (a-2) determining the shift amount by correcting the possible shift amount by using the number of contiguous positions in which the frequency of 0s or 1s satisfies a predetermined criterion, the contiguous positions starting from the lowest order position of the integer part determined in accordance with the possible shift amount.

28. The coding method according to claim 24, wherein step (a) chooses the possible shift amount plus k as the shift amount if all bits in a range of k positions from the lowest order position, including the lowest order position, of an integer part determined in accordance with the possible shift amount are 0, where k is an integer greater than or equal to 1.

29. The coding method according to claim 24, wherein step (a) comprises the steps of:

(a-1) calculating a possible shift amount such that the amplitude of the sample value that is the largest in amplitude in the current frame is the maximum amplitude that can be represented in the range between the minimum and maximum values of an integer part simply by changing the shift amount;

(a-2) holding the shift amount of at least one past frame; and (a-3) determining the shift amount of the current frame in accordance with a predetermined criterion by using the possible shift amount and the held shift amount.

30. The coding method according to claim 24, wherein step (a) comprises the steps of:

(a-1) calculating a possible shift amount such that the amplitude of the sample value that is the largest in amplitude in the current frame is the maximum amplitude that can be represented in a range between the minimum and maximum values of an integer part simply by changing the shift amount;

(a-2) holding the shift amount of at least one past frame; and (a-3) determining the shift amount of the current frame in accordance with the possible shift amount, the held shift amount, and the number of contiguous positions in which the frequency of 0s or 1s satisfies a predetermined criterion, the contiguous positions starting from the lowest order position of an integer part determined in accordance with the possible shift amount.

31. The coding method according to claim 24, wherein step (a) comprises the steps of:

(a-1) calculating a possible shift amount such that the amplitude of the sample value that is the largest in amplitude in a frame is the maximum amplitude that can be represented in the range between the maximum and minimum values of an integer part simply by changing the shift amount;

(a-2) determining the shift amount by correcting the possible shift amount by using the number of contiguous positions in which the frequency of 0s or 1s satisfy a predetermined criterion, the contiguous positions starting from the lowest order position of an integer part determined in accordance with the possible shift amount;

(a-3) storing the shift amount of at least one past frame; and (a-4) determining the shift amount of the current frame in accordance with a predetermined criterion by using the possible shift amount and the held shift amount.

32. A decoding method comprising the steps of:

(a) receiving an input of coded data and an input of an amplitude adjustment amount of a current frame, and decoding an integer signal code included in the coded data by using linear prediction and outputting an integer signal, wherein the step (a) includes step (a-1) of correcting amplitudes of at least last P sample values in a previous frame for linear prediction of the current frame based on the amplitude adjustment amount of the current frame, P being an order of the linear prediction;

(b) receiving an input of the integer signal outputted in step (a) and an input of the amplitude adjustment amount of the current frame, and making amplitude adjustment to the integer signal by using the amplitude adjustment amount of the current frame and outputting an amplitude-adjusted signal;

(c) decoding an error code included in the coded data to generate an error signal; and (d) generating a signal in floating point form by adding the error signal generated at step (c) to the amplitude-adjusted signal outputted at step (b) multiplied by a common multiplier based on information representing the common multiplier contained in the coded data.

33. A decoding method comprising the steps of:

(a) receiving an input of coded data and an input of a shift amount of a current frame, and decoding an integer signal code included in the coded data by using linear prediction and outputting an integer signal, wherein the step (a) includes step (a-1) of shifting at least last P sample values of a previous frame for linear prediction of the current frame based on the shift amount of the current frame, P being an order of the linear prediction; and (b) receiving an input of the integer signal outputted in step (a) and an input of the shift amount of the current frame, and adjusting amplitude of the integer signal by shifting the integer signal by the shift amount of the current frame to generate a shifted integer signal.

34. A decoding method comprising the steps of:

(a) receiving an input of coded data and an input of a common multiplier of a current frame, and decoding an integer signal code included in the coded data by using linear prediction and outputting an integer signal, wherein the step (a) includes step (a-1) of making a correction to at least last P sample values of a previous frame for linear prediction of the current frame by using a ratio between the common multiplier of the current frame and a common multiplier of a previous frame, P being an order of the linear prediction; and (b) receiving an input of the integer signal outputted in step (a) and an input of the common multiplier of the current frame, and adjusting amplitude of the integer signal by multiplying the integer signal by the common multiplier to generate a multiplied signal.

35. The decoding method according to claim 33 or 34, further comprising the steps of:

(c) decoding an error code included in the coded data to generate an error signal; and (d) adding said signal whose amplitude has been adjusted in step (b) and the error signal together and outputting digital data.

36. A signal codec method, wherein signal coding comprises:

a frame buffer step of separating a digital signal into frames including a plurality of sample values;

a shift amount determining step of determining, frame by frame, a shift amount that determines a range of amplitudes of a signal to be encoded as an integer part of the digital signal;

a separating step of separating the digital signal into an integer signal and an error signal in accordance with the shift amount;

an interframe correction step of correcting at least P last sample values in a previous frame of the integer signal by $S_j$-$S_{j-1}$ bits on the basis of a shift amount $S_j$ of a current frame and a shift amount $S_{j-1}$ of the previous frame determined at the shift amount determining step;

an integer signal coding step of coding the integer signal by using linear predictive coding on the basis of said at least P corrected sample values in the previous frame and sample values in the current frame to generate an integer signal code;

an error signal coding step of coding an error signal to generate an error signal code; and a multiplexing step of outputting coded data including the integer signal code, the error signal code, and information representing the shift amount; and signal decoding comprises:

a linear predictive decoding step of decoding an integer signal code included in the coded data using linear predictive decoding and outputting an integer signal;

an error signal decoding step of decoding an error signal code included in the coded data to generate an error signal;

an interframe reverse correcting step of reversely correcting at least last P sample values in the previous frame of a reproduced integer signal by $S_j$-$S_{j_}$bits on the basis of a shift amount $S_j$ of the current frame and a shift amount $S_{j-1}$ of the previous frame;

a linear predictive synthesis step of performing linear predictive synthesis based on said at least P sample values in the previous frame reversely corrected, sample values in the current frame, and liner prediction information;

a reverse shifting step of reversely shifting the integer signal by the shift amount; and a combining step of combining the reversely shifted integer signal with the error signal to output a digital signal.

37. A signal codec method, wherein signal coding comprises:

a frame buffer step of separating a digital signal consisting of only an integer part into frames;

a shift amount determining step of determining a shift amount of each frame, the shift amount determining a range of amplitudes of a signal to be coded;

a shifting step of shifting the digital signal in accordance with the shift amount;

an interframe correcting step of correcting at least P last sample values in a previous frame by $S_j$-$S_{j-1}$ bits on the basis of a shift amount $S_j$ of a current frame and a shift amount $S_{j-1}$ of the previous frame determined at the shift amount determining step;

an integer signal coding step of coding the integer signal using linear predictive coding based on said at least P corrected sample values in the previous frame and sample values in the current frame to generate an integer signal code; and a multiplexing step of outputting coded data including the integer signal code and information representing the shift amount;

signal decoding comprises:

a linear predictive decoding step of decoding an integer signal code included in the coded data by using linear predictive decoding to output an integer signal;

an interframe reverse correcting step of reversely correcting at least P last sample values in the previous frame of a reproduced integer signal by $S_j$-$S_{j-1}$ bits on the basis of a shift amount $S_j$ of the current frame and a shift amount $S_{j-1}$ of the previous frame included in the coded data;

a linear predictive synthesis step of performing linear predictive synthesis based on said at least P sample values in the previous frame reversely corrected, the sample values in the current frame, and linear prediction information; and a reverse shifting step of reversely shifting the integer signal by the shift amount and outputting the reversely shifted integer signal as a digital signal.

* * * * *

UNITED STATES PATENT AND TRADEMARK OFFICE

CERTIFICATE OF CORRECTION

PATENT NO. : 8,050,334 B2
APPLICATION NO. : 11/666493
DATED : November 1, 2011
INVENTOR(S) : Noboru Harada et al.

It is certified that error appears in the above-identified patent and that said Letters Patent is hereby corrected as shown below:

On the title page, Item (86), PCT No.: should read:

--(86) PCT No.: PCT/JP2006/313581--.

Signed and Sealed this
Thirty-first Day of January, 2012

David J. Kappos
*Director of the United States Patent and Trademark Office*